United States Patent
Vega et al.

(10) Patent No.: US 11,410,219 B2
(45) Date of Patent: Aug. 9, 2022

(54) METHODS, SYSTEMS, APPARATUSES AND DEVICES FOR MATCHING AT LEAST ONE UTILITY CONSUMER TO AT LEAST ONE UTILITY PROVIDER

(71) Applicants: Martha Patricia Vega, Houston, TX (US); Paul Solano, The Woodlands, TX (US); Ed Marotta, Houston, TX (US); Alberto Rivas, Spring, TX (US); Yavuz Kadioglu, The Woodlands, TX (US); Vishwas Bongirwar, Alpharetta, GA (US)

(72) Inventors: Martha Patricia Vega, Houston, TX (US); Paul Solano, The Woodlands, TX (US); Ed Marotta, Houston, TX (US); Alberto Rivas, Spring, TX (US); Yavuz Kadioglu, The Woodlands, TX (US); Vishwas Bongirwar, Alpharetta, GA (US)

(*) Notice: Subject to any disclaimer, the term of this patent is extended or adjusted under 35 U.S.C. 154(b) by 0 days.

(21) Appl. No.: 17/084,603

(22) Filed: Oct. 29, 2020

(65) Prior Publication Data
US 2021/0125253 A1    Apr. 29, 2021

Related U.S. Application Data

(60) Provisional application No. 62/927,381, filed on Oct. 29, 2019.

(51) Int. Cl.
*G06Q 30/00* (2012.01)
*G06Q 30/06* (2012.01)
(Continued)

(52) U.S. Cl.
CPC ........ *G06Q 30/0629* (2013.01); *G06Q 50/06* (2013.01); *H04L 67/26* (2013.01)

(58) Field of Classification Search
None
See application file for complete search history.

(56) References Cited

U.S. PATENT DOCUMENTS

| 2014/0114724 A1* | 4/2014 | Coene ............. G06Q 30/0203 705/7.31 |
| 2016/0266594 A1* | 9/2016 | Kauffman .............. G06Q 50/06 |

(Continued)

*Primary Examiner* — Mila Airapetian

(57) ABSTRACT

A system for matching at least one utility consumer to at least one utility provider is provided. The system may include a communication device, a processing device and a storage device. The communication device may be configured for receiving utility consumption information from a utility consumption information source, receiving environmental information from an environmental information source, receiving premises information from a premises information source, receiving utility provider information from utility provider information source and transmitting a utility recommendation to an electronic device. Further, the processing device may be configured for analyzing each of the utility consumption information, the environmental information and the premises information and the utility provider information, and generating the utility recommendation based on the analyzing. Further, the storage device may be configured for storing each of the utility consumption information, the environmental information, the premises information, the utility provider information and the utility recommendation.

20 Claims, 49 Drawing Sheets

(51) Int. Cl.
    *G06Q 50/06*     (2012.01)
    *H04L 67/55*     (2022.01)

(56) References Cited

U.S. PATENT DOCUMENTS

| | | | | |
|---|---|---|---|---|
| 2016/0364646 | A1* | 12/2016 | Fischer | B60L 53/30 |
| 2018/0374276 | A1* | 12/2018 | Powers | G06T 17/205 |
| 2019/0372345 | A1* | 12/2019 | Bain | H02J 3/381 |
| 2020/0412565 | A1* | 12/2020 | Sanders | H04W 4/38 |

* cited by examiner

Logo   Welcome ABC   Logout   English ▾

YOUR LIFESTYLE & PREFERENCES

Unleash Your Data ✓ — View Your Trends ✓ — See Your Impact ○ — Know Your Efficiency ○ — Find Your Match ○

Your lifestyle and preferences influence your electricity usage – tell us about them.

3310 Do you normally work days or nights? [00:00 AM ▾]

3320 your weekday Schedule

Wake Up [08:00 AM ▾] | Leave Home [01:00 AM ▾]

Go to Sleep [10:00 PM ▾] | Return Home [04:00 PM ▾]

your weekend Schedule 3330

Wake Up [08:00 AM ▾] | Leave Home [11:00 AM ▾]

Go to Sleep [10:00 PM ▾] | Return Home [05:00 PM ▾]

your Household Information

3340 Thermostat Cooling (F') [F2 ▾] | Thermostat Heating (F') [F5 ▾] 3350

3360 Number of Occupants [0 ▾] | Current Energy Plan ⓘ [Select an option ▾] 3370

[ ◁ ]   [ SHOW ME MY LEAK & IMPACT ]

FIG. 10

ABOUT YOUR HOME

Welcome ABC | Logout | English ▽

Unleash Your Data ✓ — View Your Trends ✓ — See Your Impact ✓ — Know Your Efficiency ○ — Find Your Match ○

Your energy is as unique as your home. Tell us a little bit about it and we will find more efficiency and saving opportunities enter your home features

3410 — Age — Age in years [10-25 ▽]

3480 — Size in Sqft [ ◊ ] Sqft

3420 — Heating System [Electric ▽]

Water Heating [Electric ▽] — 3490

3430 — Air Conditioning Age [10-25 ▽] Age

Water Heater Age [ ◊ ] Age — 3510

3440 — Primary Type of Lighting [Electric ▽]

Smart Thermostat [Electric ▽] (72°) — 3520

3450 — Pool [10-25 ▽]

Number of Refrigerators [ ◊ ] — 3530

3470 — Solar Panel [Electric ▽]

Electrical Vehicle [Electric ▽] — 3540

[ SHOW ME MY EFFICIENCY ]

FIG. 11

YOUR ELECTRICITY CONSUMPTION TRENDS

Unleash Your Data ✓ — View Your Trends ✓ — See Your Impact ✓ — Know Your Efficiency ○ — Find Your Match ○

Understanding your consumption Trends is key to finding an electricity plan that best fits you

410

Baseline Historical Consumption

Select View

[Line chart: Consumption(s) from 0 to 500 across months Sep, Oct, Nov, Dec, Jan, Feb, Mar, Apr, May, Jun, Jul, Aug]

Using your current plan Average Kwh Rate, you consume $267 per month. Your maximum consumption is in Aug. and your minimum in Nov.

You can select the period to review.

Monthly    Seasonal    Weekly

420

Day vs. night Consumption

Day Consumption        Night Consumption

58%                    42%

If you're a night out, a free nights energy plan could be right for you!

430

Weekdays vs. Weekend Consumption

Weekday Consumption    Weekend Consumption

71%                    29%

Do you consume more on the weekends? Perhaps consider a free weekend plan!

FIG. 13

Baseline Historical Consumption
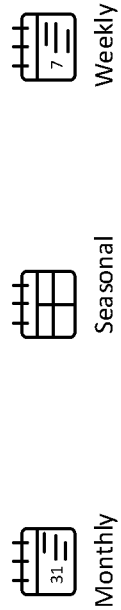
Select View
Using your current plan Average Kwh Rate, you consume $267 per month. Your maximum consumption is in Aug. and your minimum in Nov.
You can select the period to review.
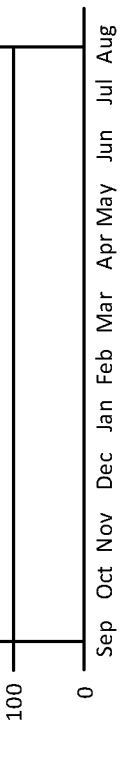
Monthly   Seasonal   Weekly
FIG. 18

YOUR ELECTRICITY CONSUMPTION TRENDS

Unleash Your Data → View Your Trends → See Your Impact → Know Your Efficiency → Find Your Match Understanding your consumption Trends is key to finding an electricity plan that best fits you

1405

Baseline Historical Consumption

Select View

Using your current plan Average Kwh Rate, you consume $267 per month. Your maximum consumption is in Aug. and your minimum in Nov.

You can select the period to review.

Monthly    Seasonal    Weekly

1415

Day vs. night Consumption

Day Consumption: 58%

Night Consumption: 42%

If you're a night owl, a free nights energy plan could be right for you!

1425

Weekdays vs. Weekend Consumption

Weekday Consumption: 71%

Weekend Consumption: 29%

Do you consume more on the weekends? Perhaps consider a free weekend plan!

FIG. 30

Lone Star Classic 6

| | |
|---|---|
| LOGO | ¢11.43/kWh<br>(All inclusive cost) |

| | |
|---|---|
| Matching Score | 177.49% |
| Average Monthly Bill | $263.93 |
| Renewable Content | 14.40% |
| Provider Rating | 5 |
| Contract Length | 6 Months |
| Plan Type | Fixed Rate |

SELECT & ORDER

Current Plan vs. This Plan

—— Current Plan Cost  ··· This Plan Cost  --- Consumption

Terms of Service          Fact Sheet

Compared Environmental Impact

| This Plan | Current Plan Costs |
|---|---|
| Trees to Offset | Trees to Offset |
| 48 | 51 |
| Car Miles Equivalent | Car Miles Equivalent |
| 30984 | 32704 |

New Plan Cost Estimates

| | |
|---|---|
| Lowest Bill: | $167.53 |
| Highest Bill | $379.88 |
| Annualized Cost | $3167.12 |
| Saving vs. TX average rate | $34.89 |

Current Plan Costs

| | |
|---|---|
| Current Annual Cost | $53336.92 |
| Cancellation Fee | $0 |
| New Plan Net Saving vs Current Plan | $169.80 |

*Hide Details*

FIG. 37

SmarTricity Secure Saver 12

LOGO        ¢11.60/kWh
(All inclusive cost)

| | |
|---|---|
| Matching Score | 176.08% |
| Average Monthly Bill | $267.87 |
| Renewable Content | 16.40% |
| Provider Rating | 5 |
| Contract Length | 12 Months |
| Plan Type | Fixed Rate |

SELECT & ORDER

Current Plan vs. This Plan

— Current Plan Cost    ··· This Plan Cost    --- Consumption

Terms of Service        Fact Sheet

Compared Environmental Impact

| This Plan | Current Plan Costs |
|---|---|
| Trees to Offset | Trees to Offset |
| 48 | 51 |
| Car Miles Equivalent | Car Miles Equivalent |
| 30984 | 32704 |

New Plan Cost Estimates

| | |
|---|---|
| Lowest Bill: | $152.69 |
| Highest Bill | $406.33 |
| Annualized Cost | $3214.39 |
| Saving vs. TX average rate | $32.15 |

Current Plan Costs

| | |
|---|---|
| Current Annual Cost | $3336.92 |
| Cancellation Fee | $0 |
| New Plan Net Saving vs Current Plan | $122.53 |

*Hide Details*

FIG. 38

Reliant Electric Vehicle 12 Plan

| | |
|---|---|
| LOGO | ¢12.67/kWh |
| | (All inclusive cost) |

| | |
|---|---|
| Matching Score | 174.88% |
| Average Monthly Bill | $292.73 |
| Renewable Content | 100.00% |
| Provider Rating | 5 |
| Contract Length | 12 Months |
| Plan Type | Indexed Rate |

SELECT & ORDER

Current Plan vs. This Plan

— Current Plan Cost   ⋯ This Plan Cost   — — Consumption

Terms of Service                    Fact Sheet

Compared Environmental Impact

| This Plan | Current Plan Costs |
|---|---|
| Trees to Offset | Trees to Offset |
| 0 | 51 |
| Car Miles Equivalent | Car Miles Equivalent |
| 0 | 32704 |

New Plan Cost Estimates

| | |
|---|---|
| Lowest Bill: | $183.15 |
| Highest Bill | $424.85 |
| Annualized Cost | $3512.75 |
| Saving vs. TX average rate | $380.51 |

Current Plan Costs

| | |
|---|---|
| Current Annual Cost | $3336.92 |
| Cancellation Fee | $0 |
| New Plan Net Saving vs Current Plan | $175.83 |

*Hide Details*

FIG. 39

YOUR RECOMMENDED PLANS

Matching Order [▼]    Filter    Sort By [Matching Score ▼]

Plan Type ⓘ
[Select an option... ▼]

Contract Lenght ⓘ
[Select an option... ▼]

Electricity Provider ⓘ
[Select an option... ▼]

Renewable energy desired content ⓘ
[Select an option... ▼]

Prepaid ⓘ
[Select an option... ▼]

Early Termination Fee ⓘ
[Select an option... ▼]

Lone Star Classic 6

[LOGO]    ¢11.43/kWh
(All inclusive cost)

| | |
|---|---|
| Matching Score | 177.49% |
| Average Monthly Bill | $263.93 |
| Renewable Content | 14.40% |
| Provider Rating | 5 |
| Contract Length | 6 Months |
| Plan Type | Fixed Rate |

[SELECT & ORDER]
*Show Details*

SmarTricity Secure Saver 12

[LOGO]    ¢11.60/kWh
(All inclusive cost)

| | |
|---|---|
| Matching Score | 176.08% |
| Average Monthly Bill | $267.87 |
| Renewable Content | 16.40% |
| Provider Rating | 5 |
| Contract Length | 12 Months |
| Plan Type | Fixed Rate |

[SELECT & ORDER]
*Show Details*

Reliant Electric Vehicle 12 Plan

[LOGO]    ¢12.67/kWh
(All inclusive cost)

| | |
|---|---|
| Matching Score | 174.88% |
| Average Monthly Bill | $292.73 |
| Renewable Content | 100.00% |
| Provider Rating | 5 |
| Contract Length | 12 Months |
| Plan Type | Indexed Rate |

[SELECT & ORDER]
*Show Details*

Ambit Green Texas - Flex

[LOGO]    ¢12.95/kWh
(All inclusive cost)

| | |
|---|---|
| Matching Score | 173.47% |
| Average Monthly Bill | $299.12 |
| Renewable Content | 100.00% |
| Provider Rating | 5 |
| Contract Length | Month to Month |
| Plan Type | Variable Rate |

[SELECT & ORDER]
*Show Details*

Reliant Secure Advantage® 20Plan

[LOGO]    ¢11.54/kWh
(All inclusive cost)

| | |
|---|---|
| Matching Score | 170.87% |
| Average Monthly Bill | $266.56 |
| Renewable Content | 11.00% |
| Provider Rating | 5 |
| Contract Length | 20 Months |
| Plan Type | Fixed Rate |

[SELECT & ORDER]
*Show Details*

Ambit Green Texas - 12

[LOGO]    ¢13.30/kWh
(All inclusive cost)

| | |
|---|---|
| Matching Score | 170.66% |
| Average Monthly Bill | $307.12 |
| Renewable Content | 100.00% |
| Provider Rating | 5 |
| Contract Length | 12 Months |
| Plan Type | Fixed Rate |

[SELECT & ORDER]
*Show Details*

FIG. 40

Reliant Electric Vehicle 12 Plan

LOGO  ¢12.67/kWh
(All inclusive cost)

| | |
|---|---|
| Matching Score | 174.88% |
| Average Monthly Bill | $292.73 |
| Renewable Content | 100.00% |
| Provider Rating | 5 |
| Contract Length | 12 Months |
| Plan Type | Indexed Rate |

SELECT & ORDER

*Show Details*

FIG. 41

YOUR RECOMMENDED PLANS

Logo           Welcome ABC   Logout   English▼

Matching Order

| Total Cost | Renewable Content | Provider Rating | Sort By Matching Score |
|---|---|---|---|
| ◉◉◉○○ | ◉◉◉◉○ | ◉◉◉◉◉ | |

Filter      RECALCULATE MATCHES

Our calculation engine is 100% unbiased and data-driven. The higher the matching score, the better the plan fits with your personalized historical electricity consumption, lifestyle and preferences.

Lone Star Classic 6
LOGO      ¢11.43/kWh (All inclusive cost)

| | |
|---|---|
| Matching Score | 177.49% |
| Average Monthly Bill | $263.93 |
| Renewable Content | 14.40% |
| Provider Rating | 5 |
| Contract Length | 6 Months |
| Plan Type | Fixed Rate |

SELECT & ORDER
*Show Details*

SmarTricity Secure Saver 12
LOGO      ¢11.60/kWh (All inclusive cost)

| | |
|---|---|
| Matching Score | 176.08% |
| Average Monthly Bill | $267.87 |
| Renewable Content | 16.40% |
| Provider Rating | 5 |
| Contract Length | 12 Months |
| Plan Type | Fixed Rate |

SELECT & ORDER
*Show Details*

Reliant Electric Vehicle 12 Plan
LOGO      ¢12.67/kWh (All inclusive cost)

| | |
|---|---|
| Matching Score | 174.88% |
| Average Monthly Bill | $292.73 |
| Renewable Content | 100.00% |
| Provider Rating | 5 |
| Contract Length | 12 Months |
| Plan Type | Indexed Rate |

SELECT & ORDER
*Show Details*

METHODS, SYSTEMS, APPARATUSES AND DEVICES FOR MATCHING AT LEAST ONE UTILITY CONSUMER TO AT LEAST ONE UTILITY PROVIDER

The current application claims a priority to the U.S. provisional patent application Ser. No. 62/927,381 filed on Oct. 29, 2019.

FIELD OF THE INVENTION

Generally, the present disclosure relates to the field of data processing. More specifically, the present disclosure relates to methods, systems, apparatuses and devices matching at least one utility consumer to at least one utility provider.

BACKGROUND OF THE INVENTION

Monitoring, minimizing and managing energy consumption are needed in order to provide for a sustainable, eco-friendly energy infrastructure currently and in the future. Energy security and independence depends not only on finding and securing new sources of energy but also on finding more efficient ways to utilize existing resources, and providing the tools for the civil society, including end-users of energy, to understand and optimize their usage and its impact.

The energy landscape is undergoing a complete transformation. Over the next few years, consumers will have immediate access to more energy choices than ever before. Innovations in technology combined with the emergence of a truly distributed, renewably-powered grid and the electrification of vehicles will put increasingly more choices, power and challenges into consumers' hands.

Advances in cognitive computing and predictive intelligence are giving systems the ability to learn using data to adapt from experience without being explicitly programmed. This is leading to endless possibilities to extract knowledge and actionable insights from previously underutilized data, helping improve productivity, reliability and longevity. However, conventional utilities often find themselves ill-equipped to harvest the full potential that Artificial Intelligence (AI) systems present, including the opportunity to deepen and evolve relationships with consumers, optimize integration of distributed resources, and be responsive to business model transformations.

Therefore, there is a need for improved methods, systems, apparatuses and devices for matching at least one utility consumer to at least one utility provider that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed is a system for matching at least one utility consumer to at least one utility provider. The system may include a communication device, a processing device and a storage device. The communication device may be configured for receiving at least one utility consumption information from at least one utility consumption information source. Further, the at least one utility consumption information may be associated with at least one premises associated with the at least one utility consumer. Further, the communication device may be configured for receiving at least one environmental information from at least one environmental information source. Further, the at least one environmental information may be associated with the at least one premises. Further, the communication device may be configured for receiving at least one premises information from at least one premises information source. Further, the at least one premises information may be associated with the at least one premises. Further, the communication device may be configured for receiving a plurality of utility provider information from at least one utility provider information source. Further, the communication device may be configured for transmitting at least one utility recommendation to at least one electronic device. Further, the processing device may be configured for analyzing each of the at least one utility consumption information, the at least one environmental information and the at least one premises information and the plurality of utility provider information. Further, the processing device may be configured for generating the at least one utility recommendation based on the analyzing. Further, the storage device may be configured for storing each of the at least one utility consumption information, the at least one environmental information, the at least one premises information, the plurality of utility provider information and the at least one utility recommendation.

According to some embodiments, a method of matching at least one utility consumer to at least one utility provider is disclosed. The method may include receiving, using a communication device, at least one utility consumption information from at least one utility consumption information source. Further, the at least one utility consumption information may be associated with at least one premises associated with the at least one utility consumer. Further, the method may include receiving, using the communication device, at least one environmental information from at least one environmental information source. Further, the at least one environmental information may be associated with the at least one premises. Further, the method may include receiving, using the communication device, at least one premises information from at least one premises information source. Further, the at least one premises information may be associated with the at least one premises. Further, the method may include receiving, using the communication device, a plurality of utility provider information from at least one utility provider information source. Further, the method may include analyzing, using a processing device, each of the at least one utility consumption information, the at least one environmental information and the at least one premises information and the plurality of utility provider information. Further, the method may include generating, using the processing device, at least one utility recommendation based on the analyzing. Further, the method may include transmitting, using the communication device, the at least one utility recommendation to at least one electronic device. Further, the method may include storing, using a storage device, each of the at least one utility consumption information, the at least one environmental information, the at least one premises information, the plurality of utility provider information and the at least one utility recommendation.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 10 is representative GUI for user communications with the system, in accordance with some embodiments.

FIG. 11 is representative GUI for user communications with the system, in accordance with some embodiments.

FIG. 13 is representative GUI for system communications with the user, in accordance with some embodiments.

FIG. 18 is representative GUI for system communications with the user, in accordance with some embodiments.

FIG. 30 is representative GUI for system communications with the user regarding a selected portion of results from the system, in accordance with some embodiments.

FIG. 37 is a representative example GUI display of top plan matches, in accordance with some embodiments.

FIG. 38 is a representative example GUI display of top plan matches, in accordance with some embodiments.

FIG. 39 is a representative example GUI display of top plan matches, in accordance with some embodiments.

FIG. 40 is a representative example GUI display of ranked plan recommendations, in accordance with some embodiments.

FIG. 41 is a representative example GUI display showing matching score and highlights for a given recommended plan, in accordance with some embodiments.

FIG. 42 is a representative example GUI showing interactive interface that allows customers to adjust selection criteria and recalculate matching scores, in accordance with some embodiments.

FIG. 46 is a representative example GUI display of an Order Summary Dashboard, in accordance with some embodiments.

DETAIL DESCRIPTIONS OF THE INVENTION

Figure 1:
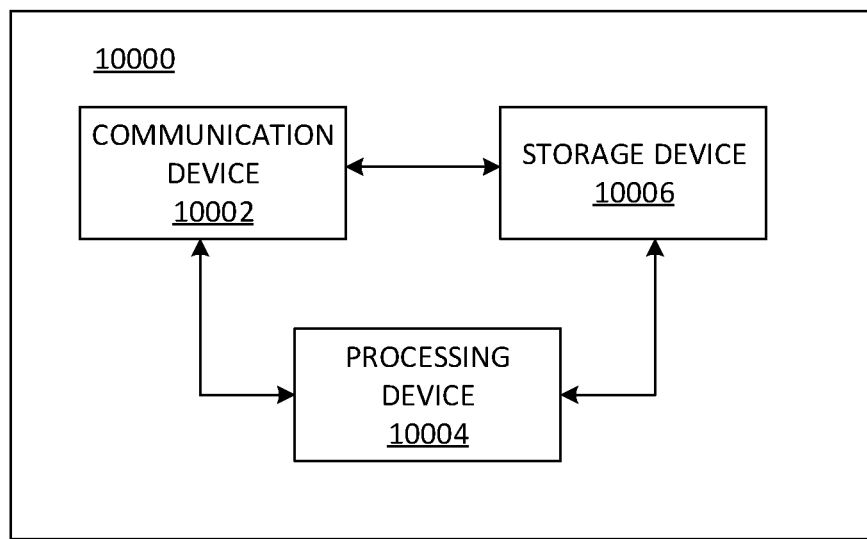
FIG. 1 is a block diagram of a system for matching at least one utility consumer to at least one utility provider, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of matching at least one utility consumer to at least one utility provider, embodiments of the present disclosure are not limited to use only in this context.

Overview

According to some embodiments, data-driven and behavioral-driven analytics for smart matching of energy consumer and supplier is disclosed.

Further, the present disclosure provides systems and methods for statistically analyzing and optimizing power consumption by a customer or user (e.g., both consumers and businesses) for use in selecting a utility supplier by obtaining and analyzing power consumption, and also relates to using the results of that analysis for reducing and optimizing energy use and its associated carbon footprint and using that analysis for selecting an energy supplier.

According to some embodiments, the present disclosure teaches of matching an energy supplier to an energy consumer based on analysis of location of the consumer's premises, consumer behavior, electricity usage patterns, lifestyle, local weather data, consumer preferences and energy goals.

According to some embodiments, the present disclosure teaches an easy to use, user friendly system for analyzing and selecting energy suppliers.

While most people want to save energy and money, no two consumers are the same. Personal preferences, lifestyles and energy aspirations are unique. Individual energy consumption depends on multiple factors that change constantly over time. The present disclosure provides a system and platform that enables an easy, Uber-like experience for selecting an electricity plan supplier for consumers and businesses that are in energy markets allowing consumers to select electricity providers, or amongst the multiple electricity plans available from one supplier. That is, the present disclosure provides a data-driven and behavioral-driven analytical system for matching of an energy consumer' residential (or business, commercial, industrial) consumption with an energy supplier that best matches that consumption.

The present disclosure provides a system using technology to integrate personalized, historical energy consumption data with locational information, building characteristics, lifestyle behaviors, and preferences to create a unique Energy Fingerprint for each customer. This system allows consumers to truly understand their energy habits for the first time ever and provides a more accurate digital representation (Building Digital Twin) for energy providers to utilize in analytics, energy optimization, systems planning and energy arbitrage.

The method described in this disclosure provides a distinctive, holistic approach. The method uses cross-pollinating lessons learned across energy sectors and integrating digital and energy technology with behavioral science. The present disclosure also addresses these issues to help energy providers and consumers alike to realize the full potential of the transition towards more decentralized, decarbonized and increasingly digital energy systems. The present disclosure allows customers and providers to identify the electricity plans and energy products best aligned with their usage and needs. Based on this they can create, evaluate, and fulfill scenarios for their personal energy journey including actionable renewable energy options, such as using solar, wind, electrical vehicles (EV), EV charging, and storage of energy in battery.

Demand for energy is driven by consumption. Individuals have the capacity to change, if they have the knowledge and impetus to act. Providing actionable knowledge and working with every stakeholder in the energy ecosystem to create a future of sustainable energy abundance should be a long-term goal. Energy is integral to modern life and economic development. Everything in our daily lives, from lighting to transportation to accessing the Internet, depends on the availability of a secure and resilient energy grid. Providing robust options for consumers to choose based on their needs is a priority and a main objective of the Energy matchmaker systems and methods of the present disclosure.

The present disclosure provides a method and system (Energy matchmaker) that is a consumer-focused technology platform connecting energy consumers with retail electric providers, utilities and energy technology companies. Energy matchmaker helps customers cut through the clutter of competitive rate structures, making it easier to make smarter more informed energy decisions that save money, improve efficiency and advance sustainability.

The data driven calculation engine of the present disclosure integrates each consumer's unique energy fingerprint with a comprehensive utility rates database for their location to identify the optimal plans for each customer based on their behavior and usage patterns, lifestyle, preferences and energy aspirations. Optimization of energy consumption and selection of an energy supplier is based on statistical usage patterns, consumer behavior on premises, occupant lifestyle, and conscious and unconscious preferences (e.g., quantifiable and non-quantifiable) by a consumer.

The present disclosure provides people and businesses access to actionable insight about their own energy habits—something not available in a consumable form today, with simple alerts and reports that highlight unusual consumption, reminders to renew plans, and visibility when options better aligned with consumer preferences and objectives become available.

An energy analysis system is provided using a processor, a communication interface coupled to the processor, and a memory coupled to the processor. The memory may contain energy analysis logic that is executed by the processor to create an energy analysis system that communicates to obtain energy usage data for a consumer, other dynamic data related to energy usage, dynamic user information related to the user's consumption of energy, and available electric utility or supplier plans. The results of the analysis may be displayed and ranked for further review and action by a user.

The energy analysis system of the present disclosure provides direct integration and linkage of customer historical energy usage data, lifestyle schedules, preferences, and settings through analysis and simplified pragmatic methods to identify non-intrusive ways to save energy, in some cases, without requiring efforts by the customer to change the regular activities in which electricity is actively consumed in a household. This integration of a plurality of customer inputs, data and behavioral science also brings visibility to previously unknown wasted electricity, quantify its associated cost and environmental impact, and equally importantly provides a non-intrusive way to save energy.

The energy analysis system of the present disclosure uses a multidimensional model comprised of the integration of a plurality of different functions that varying over time, that include electricity consumption variations over time, lifestyle behavior variations over time (e.g., schedules, occupants), preferences variations over time (e.g., space cooling and heating set points, water heater temperature, cost reduction, environmental footprint reduction, etc.), building feature efficiency variations over time (e.g., new A/C, new led lights, aging appliance, broken air sealing barriers, maintenance, etc.), and outdoor temperature variations over time that are location specific. This model may then be used to calculate and rank available electric utility or supplier plans using an end-user's selection criteria for choosing a supplier.

The present disclosure provides an energy analytics and optimization control system embodiment for use by an end-user for selection of a utility supplier, consisting of a processor, a first memory for storing programming instructions for the processor, wherein a first set of programming instructions when executed by the processor cause the processor to receive, convert and store in a single common interoperable data format preselected data from multiple sources regarding a plurality of customer premises, and wherein a second set of programming instructions when executed by the processor cause the processor to partition historical data, aggregate, compare and analyze said data using at least common time period and time slice information for each premises of the plurality of premises, calculate a matching score using cost, risk factors, environmental footprint, and customer satisfaction ratings for each utility supplier plan using historical usage data, and recommend a utility supplier plan that best fits the historical usage and user supplied criteria, a second memory for separately storing the preselected data from multiple sources that comprises historical energy usage data for preselected locations for the premises, historical weather data for preselected locations, descriptive information and characteristics data for a plurality of customer premises at the preselected locations, user preference, behavioral and schedule data for respective premises in the plurality of customer premises, utility supplier plans and supporting billing rules for preselected locations, and user criteria preferences regarding plan selection, and a user interface for at least displaying results in a plurality of preselected formats from said processor processing said preselected data and analysis of the preselected data stored in said memories and from comparisons and combinations of those sets of data in common time periods, wherein the results comprise at least one of the following: comparisons of actual and historical energy usage in the same time period during different times, comparisons of energy usage in adjacent time periods, alternative representations of energy consumption for a preselected time period, energy consumption for preselected energy consumption devices for a preselected time period, determination of unintended energy consumption, efficiency of energy consumption, comparisons of energy usage for similar reference premises at the preselected locations for preselected time periods, recommendations for reduction in energy consumption, recommendations for adjustment in preference and schedule data for a user to control and reduce energy consumption and environmental impact, scoring and ranking of utility suppliers based on at least user criteria, and calculation of costs for each plan using historical usage data and displaying a utility supplier plan that best fits the historical usage and user supplier criteria for selection by a user.

Referring now to figures, FIG. 1 is a block diagram of a system 10000 for matching at least one utility consumer to at least one utility provider, in accordance with some embodiments. The system may 10000 include a communication device 10002, a processing device 10004 and a storage device 10006.

The communication device 10002 may be configured for receiving at least one utility consumption information from at least one utility consumption information source. Further, the at least one utility consumption information may be associated with at least one premises associated with the at least one utility consumer.

Further, the at least one utility consumption information source may include a utility consumption meter associated with the at least one premises, a consumer device communicatively coupled to the utility consumption meter, a utility consuming appliance comprising the utility consumption meter and a utility provider database comprising the at least one utility consumption information.

In general, the utility consumption information may represent any information regarding consumption of the at least one utility. Further, the at least one utility consumption information source may be any source capable of supplying the at least one utility consumption information. In some embodiments, the at least utility consumption information source may include a smart utility meter configured to capture the at least one utility consumption information and transmit the at least one utility consumption information. For example, in some embodiments, the at least utility consumption information source may include a smart meter configured to measure consumption of the at least one utility (E.g. electricity, fuel, water etc.) by the at least one premises. In some embodiments, the at least one utility consumption information source may be a utility consuming appliance capable of measuring and transmitting consumption of the utility. For instance, the at least one utility consumption information source may be an IoT appliance configured to provide a corresponding functionality, while also configured to measure and transmit consumption of the utility. In some embodiments, the at least one utility consumption information source may be a database server configured to collect and provision the at least one utility consumption information. For instance, the database server may be operated by a utility provider. Further, in some embodiments, the at least one utility consumption information source may include a user device (e.g. a desktop computer, a tablet computer, a smartphone, a mobile phone, a wearable computer, etc.) configured to receive the at least one utility consumption information manually entered by a user (e.g. by way of touch inputs, voice commands, gestures etc.) and transmit the at least one utility consumption information over a network (e.g. the Internet).

Further, the communication device 10002 may be configured for receiving at least one environmental information from at least one environmental information source. Further, the at least one environmental information may be associated with the at least one premises. Further, the at least one environmental information may include at least one an indoor environmental information and an outdoor environmental information. Further, the at least one environmental information source may include at least one sensor disposed in the at least one premises. Further, the at least one sensor may be configured to generate at least one sensor data corresponding to at least one environmental variable. Further, the at least one environmental information source may include a weather database. Further, the at least one environmental variable may include at least one of temperature, humidity, pressure, wind, motion, sound, light, vibration, mechanical stress and pollution.

Further, the communication device 10002 may be configured for receiving at least one premises information from at least one premises information source. Further, the at least one premises information may be associated with the at least one premises.

Further, the at least one premises information may include at least one of a location of the at least one premises, at least one environmental characteristic associated with the at least one premises, at least one structural characteristic associated with the at least one premises, at least one utility consuming appliance information associated with the at least one premises and at least one appliance information associated with the at least one premises.

In some embodiments, the at least one premises information source may include a premises management system configured to manage the at least one premises. In an instance, the premises management system may be operated by one or more of a resident of the at least one premises, a manager of the at least one premises and an owner of the at least one premises. In some embodiments, the at least one premises information source may include a maintenance management system configured to facilitate maintenance of the at least one premises. In some embodiments, the at least one premises information source may include a user device (e.g. a desktop computer, a tablet computer, a smartphone, a mobile phone, a wearable computer, etc.) configured to receive the at least one at least one premises information manually entered by a user (e.g. by way of touch inputs, voice commands, gestures etc.) and transmit the at least one premises information over a network (e.g. the Internet). In some embodiments, the at least one premises information source may be a utility consuming appliance capable of capturing and transmitting the at least one premises information. For instance, the at least the at least one premises information source may be an IoT appliance (e.g. CCTV cameras) configured to provide a corresponding functionality (e.g. surveillance), while also configured to capture and transmit the at least one premises information. In some embodiments, the at least one premises information source may be a database server configured to collect and provision the at least one at least one premises information.

Further, the communication device 10002 may be configured for receiving a plurality of utility provider information from at least one utility provider information source. Further, the plurality of utility provider information may include pricing information comprising a plurality of rates corresponding to at least one of a plurality of locations, a plurality of utility providers and a plurality of utility plans. Further, in some embodiments, in addition to the pricing information, the plurality of utility provider information may include a plurality of quantities of renewable content and customer satisfaction ratings corresponding to the plurality of utility providers.

Further, the communication device 10002 may be configured for transmitting at least one utility recommendation to at least one electronic device.

In general, the at least one electronic device may be any electronic device configured to communicate with the system 10000. In some embodiments, the at least lone electronic device may include a personal user device (E.g. smartphone, desktop computer, tablet computer, wearable computer etc.) associated with one or more users such as, for example, an occupant of the at least one premises, an administrative user corresponding to the at least one premises, a manager of the at least one premises, an owner of the at least one premises and a utility administrator/manager associated with the at least one utility provider.

Further, the processing device 10004 may be configured for analyzing each of the at least one utility consumption information, the at least one environmental information and the at least one premises information and the plurality of utility provider information.

In some embodiments, the plurality of utility provider information may include at least one contract. Further, the analyzing may include analyzing the at least one contract and determining at least one of a billing rule and a termination fee corresponding to the plurality of utility provider information. Further, the at least one utility recommendation may include at least one of the billing rule and the termination fee.

Further, the plurality of utility provider information may include a current utility provider information associated with a current utility consumption of the at least one premises and at least one alternative utility provider information associated with a potential utility consumption of the at least one premises.

Further, the current utility provider information may include indication of at least one of a current utility provider and a current utility plan associated with the current utility consumption. Further, the at least one alternative utility provider information may include indication of at least one of at least one alternative utility provider and at least one alternative utility plan.

Further, the processing device 10004 may be configured for generating the at least one utility recommendation based on the analyzing.

Further, the at least one utility recommendation may include indication of a plurality of utility plans and a plurality of ranks associated with the plurality of utility plans. Further, the generating of the at least one utility recommendation may include determining the plurality of ranks based on the at least one consumer criteria.

Further, the at least one consumer criteria may include a plurality of consumer criteria and a plurality of importance levels associated with the plurality of consumer criteria. Further, the generating of the at least one utility recommendation may include determining a plurality of scores for each utility plan of the plurality of utility plans. Further, the plurality of scores is based on the plurality of consumer criteria and determining a plurality of weighted scores corresponding to the plurality of utility plans based on the plurality of scores and the plurality of importance levels, wherein the plurality of ranks is based on the plurality of weighted scores.

Further, the at least one utility recommendation may include at least one of a utility provider and a utility plan. Further, the at least one electronic device may be associated with the at least one utility consumer.

Further, the at least one utility recommendation comprises indication of a plurality of alternative environmental impacts corresponding to at least one of the plurality of utility providers and the plurality of utility plans. Further, the generating of the at least one utility recommendation further comprises determining the plurality of alternative environmental impacts.

Further, the storage device 10006 may be configured for storing each of the at least one utility consumption information, the at least one environmental information, the at least one premises information, the plurality of utility provider information and the at least one utility recommendation.

In further embodiments, the communication device 10002 may be configured for receiving at least one lifestyle information from at least one lifestyle information source. Further, the at least one lifestyle information may be associated with at least one occupant of the at least one premises. Further, the generating of the at least one utility recommendation may be based further on the at least one lifestyle information.

In some embodiments, the at least one lifestyle information source may include a user device (e.g. a desktop computer, a tablet computer, a smartphone, a mobile phone, a wearable computer, etc.) configured to receive the at least one at least one lifestyle information manually entered by a user (e.g. by way of touch inputs, voice commands, gestures etc.) and transmit the at least one lifestyle information over a network (e.g. the Internet). In some embodiments, the at least one lifestyle information source may be an appliance capable of capturing and transmitting the at least one lifestyle information. For instance, the at least the at least one lifestyle information source may be an IoT appliance (e.g. IoT appliance, IoT sensor, IoT camera, microphone etc.) configured to capture and transmit the at least one lifestyle information. In some embodiments, the at least one lifestyle information source may be a database server configured to collect and provision the at least one at least one lifestyle information.

In some embodiments, the communication device 10002 may be further configured for receiving at least one consumer criteria from the at least one electronic device. Further, the generating of the at least one utility recommendation may be based further on the at least one consumer criteria.

Further, the at least one utility recommendation may include indication of a plurality of utility providers and a plurality of ranks associated with the plurality of utility providers. Further, the generating of the at least one utility recommendation may include determining the plurality of ranks based on the at least one consumer criteria.

Further, the at least one consumer criteria may include a plurality of consumer criteria and a plurality of importance levels associated with the plurality of consumer criteria. Further, the generating of the at least one utility recommendation may include determining a plurality of scores for each utility provider of the plurality of utility providers. Further, the plurality of scores may be based on the plurality of consumer criteria. Further, the generating of the at least one utility recommendation may include determining a plurality of weighted scores corresponding to the plurality of utility providers based on the plurality of scores and the plurality of importance levels. Further, the plurality of ranks may be based on the plurality of weighted scores.

Further, the at least one consumer criteria may include at least one of a cost impact, an environmental impact, a lifestyle impact, a budget, a customer satisfaction rating, a billing variability and a risk factor.

Further, the at least one utility recommendation may include indication of a projected utility consumption information associated with a future time period and indication of a plurality of alternative utility cost information associated with the future time period. Further, the generating of the at least one utility recommendation may include determining the projected utility consumption information. Further, the generating of the at least one utility recommendation may include determining the plurality of alternative utility cost information.

Further, the at least one utility recommendation may include indication of a plurality of alternative environmental impacts corresponding to the plurality of utility providers. Further, the generating of the at least one utility recommendation further may include determining the plurality of alternative environmental impacts.

In some embodiments, the at least one utility recommendation may include indication of a utility consumption information associated with a historical time period and indication of a plurality of alternative utility consumption information associated with the historical time period. Further, the utility consumption information may include a quantity of the utility consumed and a utility cost associated with quantity. Further, the plurality of alternative utility consumption information may include a plurality of alternative utility cost information. Further, the generating of the at least one utility recommendation may include determining the plurality of alternative utility cost information associated with the historical time period based on pricing information associated with at least one of the plurality of utility providers and a plurality of utility plans. Further, the plurality of utility provider information may include the pricing information.

Further, the at least one utility consumption information may include a first utility consumption information corresponding to a first time period and a second utility consumption information corresponding to a second time period. Further, the at least one lifestyle information may include a first lifestyle information associated with the first time period and a second lifestyle information associated with the second time period, wherein the second time period is later than the first time period. Further, the analyzing may include determining a utility consumption variation based on comparing the first utility consumption information and the second utility consumption information and determining a lifestyle variation based on comparing the first lifestyle information and the second lifestyle information. Further, at least one utility fingerprint may include each of the utility consumption variation and the lifestyle variation. In further embodiments, the determining the projected utility consumption information may be based on the lifestyle variation.

In an instance, the first time period may include duration of 12 months (or any other duration sufficient for capturing all periodic variations (e.g. seasonal variations with regards to environmental conditions, behavioral variations with regard to the at least one lifestyle information, maintenance variations with regard to the at least one premises information and so on.) of the at least one premises. Further, the first utility consumption information may correspond to a baseline utility consumption, which may be derived, for instance, by averaging utility consumption over a period of, for example, 12 months.

The at least one utility fingerprint may be associated with consumption of at least one utility at the at least one premises. Further, in some embodiments, the at least one utility fingerprint be associated with an actual consumption of the at least one utility. In some embodiments, the at least one utility fingerprint be associated with a projected consumption of the at least one utility.

In general, the at least one utility may include any consumable that is distributable by at least one utility provider to a plurality of consumers. Examples of the at least one utility may include, but are not limited to, energy utility, such as, for example, electricity, gas, heating and cooling etc. Other such examples of the at least one utility, include, without limitation, pressurizing, de-pressurizing, humidifying, de-humidifying, sanitizing and so on.

Further, in some embodiments, the at least one utility may include a non-energy utility such as, for example, water, air, oxygen and so on. Additionally, and/or alternatively, in some embodiments, the at least one utility may include a non-energy utility including a consumable substance, such as for example, water, a biological nutrient and so on. Further, in some embodiments, the at least one utility may include a communication service, such as for example, network connectivity (e.g. Internet connectivity).

In some embodiments, the utility fingerprint may include an energy fingerprint. Further, the at least one utility may include an energy utility. In general, the energy utility may include any utility facilitating an exchange of energy between a utility provider and a consumer.

In further embodiments, the communication device 10002 may be configured for receiving at least one schedule information from a schedule information source. Further, the processing device 10004 may be configured for determining the at least one activity and the at least one-time period based on the at least one schedule information.

In some embodiments, the schedule information source may include a user device (e.g. a desktop computer, a tablet computer, a smartphone, a mobile phone, a wearable computer, etc.) configured to receive the at least one at least one schedule information manually entered by a user (e.g. by way of touch inputs, voice commands, gestures etc.) and transmit the at least one schedule information over a network (e.g. the Internet). In some embodiments, the schedule information source may include a calendar application configured to automatically transmit the at least one schedule information. In some embodiments, the at least one schedule information source may be an appliance capable of capturing and transmitting the at least one schedule information. For instance, the at least the at least one schedule information source may be an IoT appliance (e.g. IoT appliance, IoT sensor, IoT camera, microphone, etc.) configured to capture and transmit the at least one schedule information. In some embodiments, the at least one schedule information source may be a database server configured to collect and provision the at least one at least one schedule information.

Figure 2:
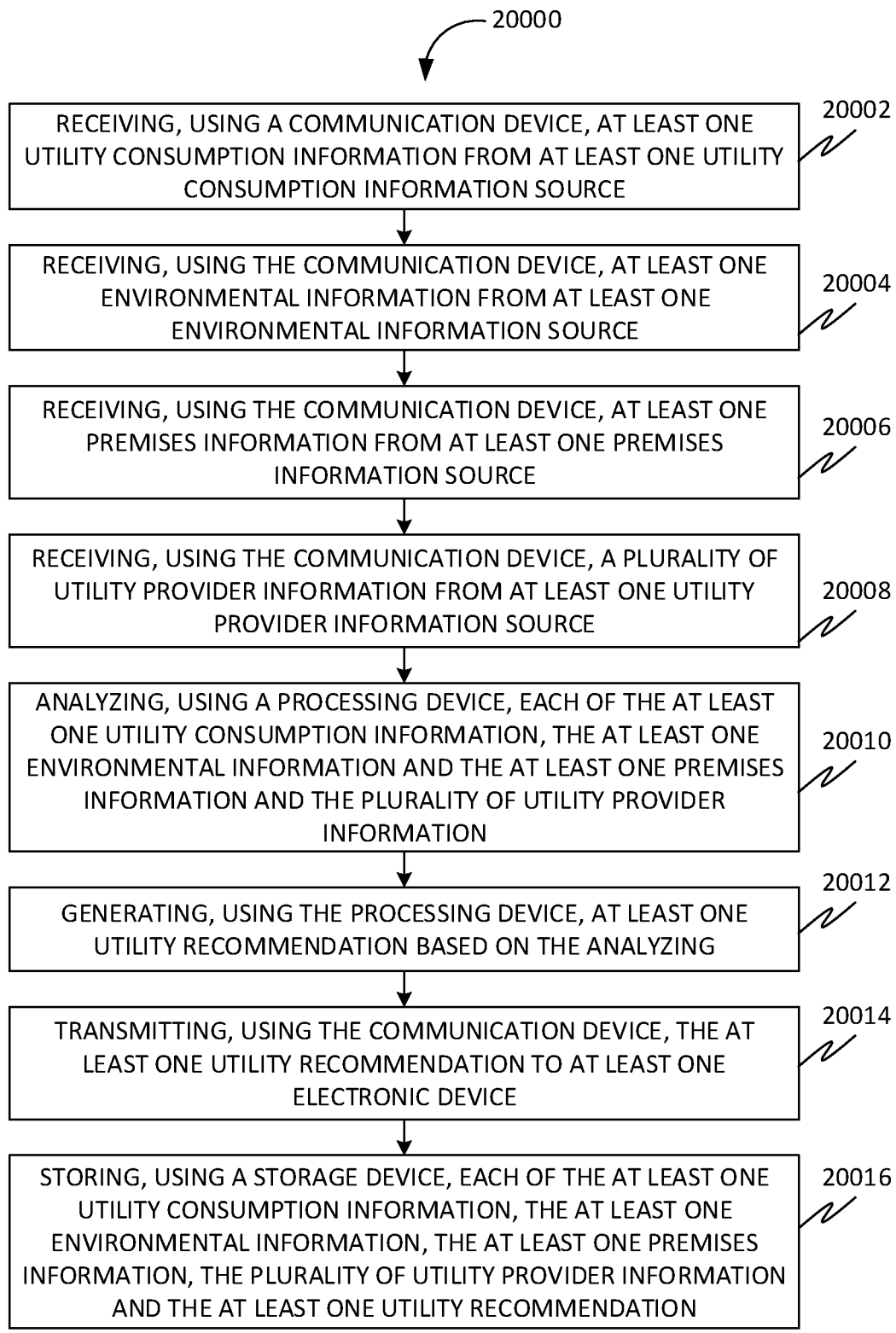
FIG. 2 is a flowchart of a method for matching at least one utility consumer to at least one utility provider, in accordance with some embodiments.

FIG. 2 is a flowchart of a method 20000 for matching at least one utility consumer to at least one utility provider, in accordance with some embodiments.

At 20002, the method 20000 may include receiving, using a communication device, at least one utility consumption information from at least one utility consumption information source. Further, the at least one utility consumption information may be associated with at least one premises associated with the at least one utility consumer.

Further, the at least one utility consumption information source may include a utility consumption meter associated with the at least one premises, a consumer device communicatively coupled to the utility consumption meter, a utility consuming appliance comprising the utility consumption meter and a utility provider database comprising the at least one utility consumption information.

Further, at 20004, the method 20000 may include receiving, using the communication device, at least one environmental information from at least one environmental information source. Further, the at least one environmental information may be associated with the at least one premises. Further, the at least one environmental information may include at least one an indoor environmental information and an outdoor environmental information. Further, the at least one environmental information source may include at least one sensor disposed in the at least one premises. Further, the at least one sensor may be configured to generate at least one sensor data corresponding to at least one environmental variable. Further, the at least one environmental information source may include a weather database. Further, the at least one environmental variable may include at least one of temperature, humidity, pressure, wind, motion, sound, light, vibration, mechanical stress and pollution.

Further, at 20006, the method 20000 may include receiving, using the communication device, at least one premises information from at least one premises information source. Further, the at least one premises information may be associated with the at least one premises.

Further, the at least one premises information may include at least one of a location of the at least one premises, at least one environmental characteristic associated with the at least one premises, at least one structural characteristic associated with the at least one premises, at least one utility consuming appliance information associated with the at least one premises and at least one appliance information associated with the at least one premises.

Further, at 20008, the method 20000 may include receiving, using the communication device, a plurality of utility provider information from at least one utility provider information source. Further, the plurality of utility provider information may include pricing information comprising a plurality of rates corresponding to at least one of a plurality of locations, a plurality of utility providers and a plurality of utility plans.

In some embodiments, the plurality of utility provider information may include indication of a plurality of utility providers. Additionally, and/or alternatively, in some embodiments, the plurality of utility provider information may include indication of a plurality of utility plans.

Further, the plurality of utility provider information may include a current utility provider information associated with a current utility consumption of the at least one premises and at least one alternative utility provider information associated with a potential utility consumption of the at least one premises.

Further, the current utility provider information may include indication of at least one of a current utility provider and a current utility plan associated with the current utility consumption. Further, the at least one alternative utility provider information may include indication of at least one of at least one alternative utility provider and at least one alternative utility plan.

Further, at 20010, the method 20000 may include analyzing, using a processing device, each of the at least one utility consumption information, the at least one environmental information and the at least one premises information and the plurality of utility provider information.

Further, at 20012, the method 20000 may include generating, using the processing device, at least one utility recommendation based on the analyzing.

Further, the at least one utility recommendation may include indication of a plurality of utility plans and a plurality of ranks associated with the plurality of utility plans. Further, the generating of the at least one utility recommendation may include determining the plurality of ranks based on the at least one consumer criteria.

Further, the at least one consumer criteria may include a plurality of consumer criteria and a plurality of importance levels associated with the plurality of consumer criteria. Further, the generating of the at least one utility recommendation may include determining a plurality of scores for each utility plan of the plurality of utility plans. Further, the plurality of scores is based on the plurality of consumer criteria and determining a plurality of weighted scores corresponding to the plurality of utility plans based on the plurality of scores and the plurality of importance levels. Further, the plurality of ranks may be based on the plurality of weighted scores.

Further, the at least one utility recommendation may include at least one of a utility provider and a utility plan. Further, the at least one electronic device may be associated with the at least one utility consumer.

Further, the at least one utility recommendation comprises indication of a plurality of alternative environmental impacts corresponding to at least one of the plurality of utility providers and the plurality of utility plans. Further, the generating of the at least one utility recommendation further comprises determining the plurality of alternative environmental impacts.

Further, at 20014, the method 20000 may include transmitting, using the communication device, the at least one utility recommendation to at least one electronic device.

In some embodiments, the at least one electronic device may include, but is not limited to, at least one of a utility provider device associated with the at least one utility provider and a consumer device associated with the at least one premises.

Further, at 20016, the method 20000 may include storing, using a storage device, each of the at least one utility consumption information, the at least one environmental information, the at least one premises information, the plurality of utility provider information and the at least one utility recommendation.

In further embodiments, the method 20000 may include receiving, using the communication device, at least one consumer criteria from the at least one electronic device. Further, the generating of the at least one utility recommendation may be based further on the at least one consumer criteria.

Further, the at least one utility recommendation may include indication of a plurality of utility providers and a plurality of ranks associated with the plurality of utility providers. Further, the generating of the at least one utility recommendation may include determining the plurality of ranks based on the at least one consumer criteria.

In further embodiments, the method 20000 may include receiving, using the communication device, at least one lifestyle information from at least one lifestyle information source. Further, the at least one lifestyle information may be associated with at least one occupant of the at least one premises. Further, the generating of the at least one utility recommendation may be based further on the at least one lifestyle information.

Further, the at least one utility consumption information may include a first utility consumption information corresponding to a first time period and a second utility consumption information corresponding to a second time period. Further, the at least one lifestyle information may include a first lifestyle information associated with the first time period and a second lifestyle information associated with the second time period, wherein the second time period is later than the first time period. Further, the analyzing may include determining a utility consumption variation based on comparing the first utility consumption information and the second utility consumption information and determining a lifestyle variation based on comparing the first lifestyle information and the second lifestyle information. Further, the at least one utility fingerprint may include each of the utility consumption variation and the lifestyle variation. In further embodiments, the determining the projected utility consumption information may be based on the lifestyle variation.

Figure 3:
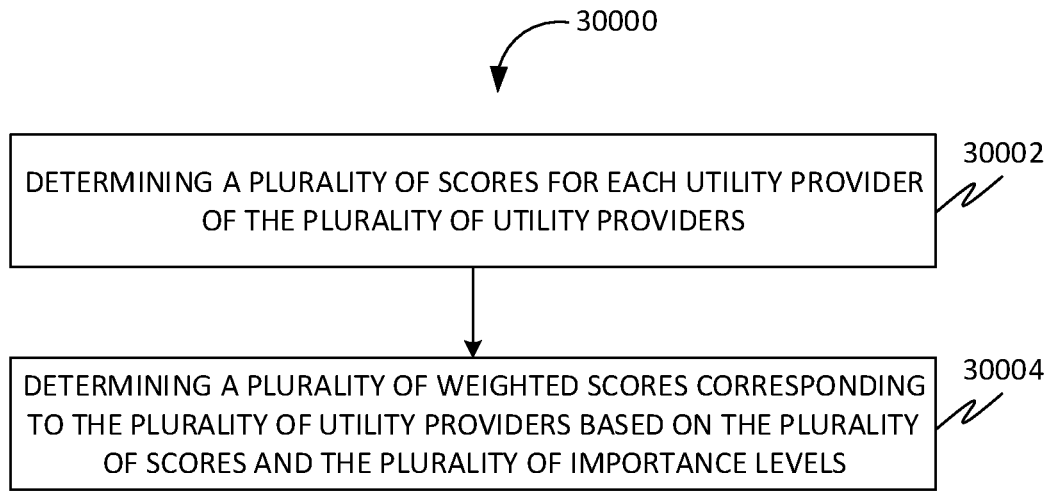
FIG. 3 is a flowchart of a method for obtaining a plurality of weighted scores, in accordance with some embodiments.

FIG. 3 is a flowchart of a method 30000 for obtaining a plurality of weighted scores, in accordance with some embodiments. Further, the at least one consumer criteria may include a plurality of consumer criteria and a plurality of importance levels associated with the plurality of consumer criteria.

At 30002, the method 30000 may include determining a plurality of scores for each utility provider of the plurality of utility providers. Further, the plurality of scores may be based on the plurality of consumer criteria. This step may be a sub-step of the generating step 20012 of method 20000.

Further, at 30004, the method 30000 may include determining the plurality of weighted scores corresponding to the plurality of utility providers based on the plurality of scores and the plurality of importance levels. Further, the plurality of ranks may be based on the plurality of weighted scores. This step may be a sub-step of the generating step 20012 of method 20000.

Figure 4:
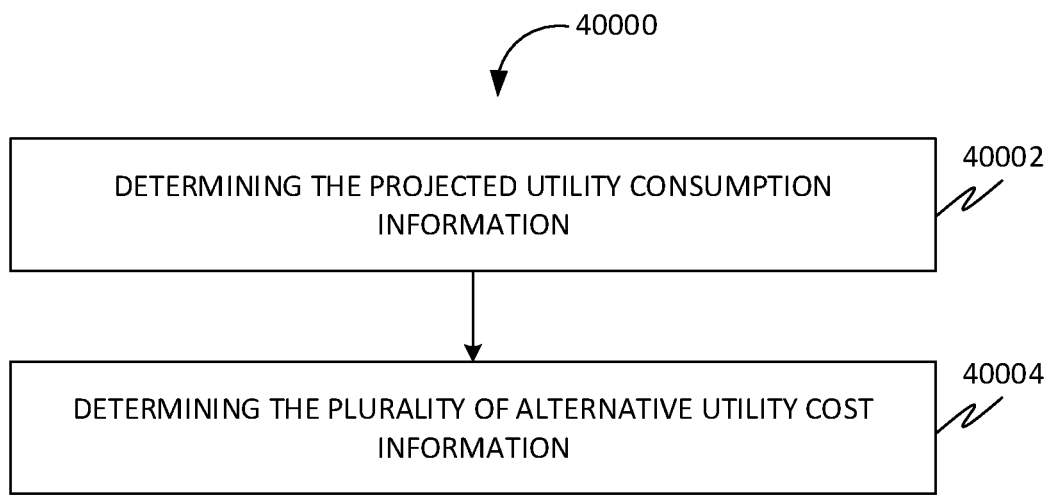
FIG. 4 is a flowchart of a method for obtaining a projected utility consumption information and a plurality of alternative utility cost information, in accordance with some embodiments.

FIG. 4 is a flowchart of a method 40000 for obtaining a projected utility consumption information and a plurality of alternative utility cost information, in accordance with some embodiments. Further, the at least one consumer criteria may include at least one of a cost impact, an environmental impact, a lifestyle impact, a budget, a customer satisfaction rating, a billing variability and a risk factor.

Further, the at least one utility recommendation may include indication of a projected utility consumption information associated with a future time period and indication of a plurality of alternative utility cost information associated with the future time period.

At 40002, the method 40000 may include determining the projected utility consumption information. This step may be a sub-step of the generating step 20012 of method 20000.

Further, at 40004, the method 40000 may include determining the plurality of alternative utility cost information. This step may be a sub-step of the generating step 20012 of method 20000.

In some embodiments, the at least one utility recommendation may include indication of a plurality of alternative environmental impacts corresponding to the plurality of utility providers. Further, the generating of the at least one utility recommendation further may include determining the plurality of alternative environmental impacts.

Further, the at least one utility recommendation may include indication of a utility consumption information associated with a historical time period and indication of a plurality of alternative utility consumption information associated with the historical time period. Further, the utility consumption information may include a quantity of the utility consumed and a utility cost associated with quantity. Further, the plurality of alternative utility consumption information may include a plurality of alternative utility cost information. Further, the generating of the at least one utility recommendation may include determining the plurality of alternative utility cost information associated with the historical time period based on pricing information associated with at least one of the plurality of utility providers and a plurality of utility plans. Further, the plurality of utility provider information may include the pricing information.

Figure 5:
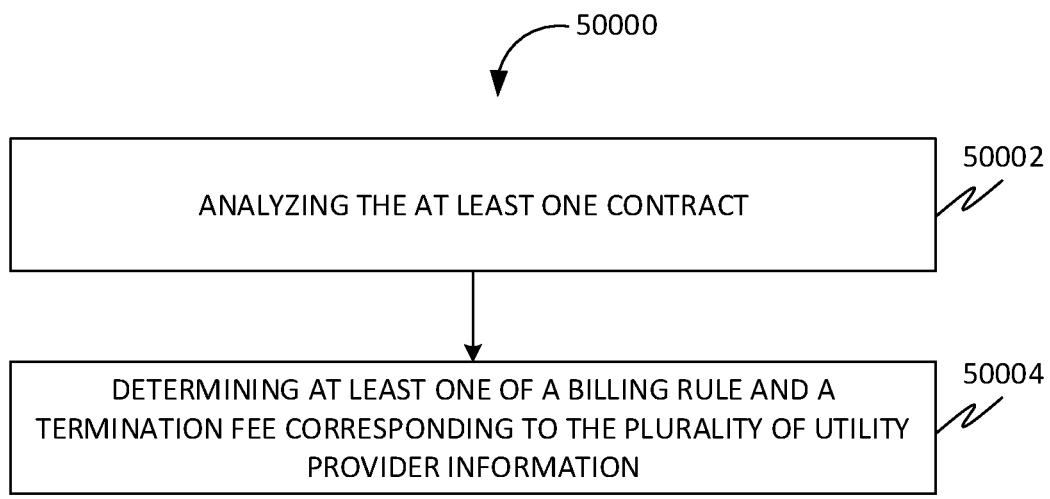
FIG. 5 is a flowchart of a method for obtaining at least one of a billing rule and a termination fee, in accordance with some embodiments.

FIG. 5 is a flowchart of a method 50000 for obtaining at least one of a billing rule and a termination fee, in accordance with some embodiments. Further, the plurality of utility provider information may include at least one contract.

At 50002, the method 50000 may include analyzing the at least one contract. This step may be a sub-step of the analyzing step 20010 of method 20000.

Further, at 50004, the method 50000 may include determining at least one of a billing rule and a termination fee corresponding to the plurality of utility provider information. Further, the at least one utility recommendation may include at least one of the billing rule and the termination fee. This step may be a sub-step of the analyzing step 20010 of method 20000.

Figure 6:
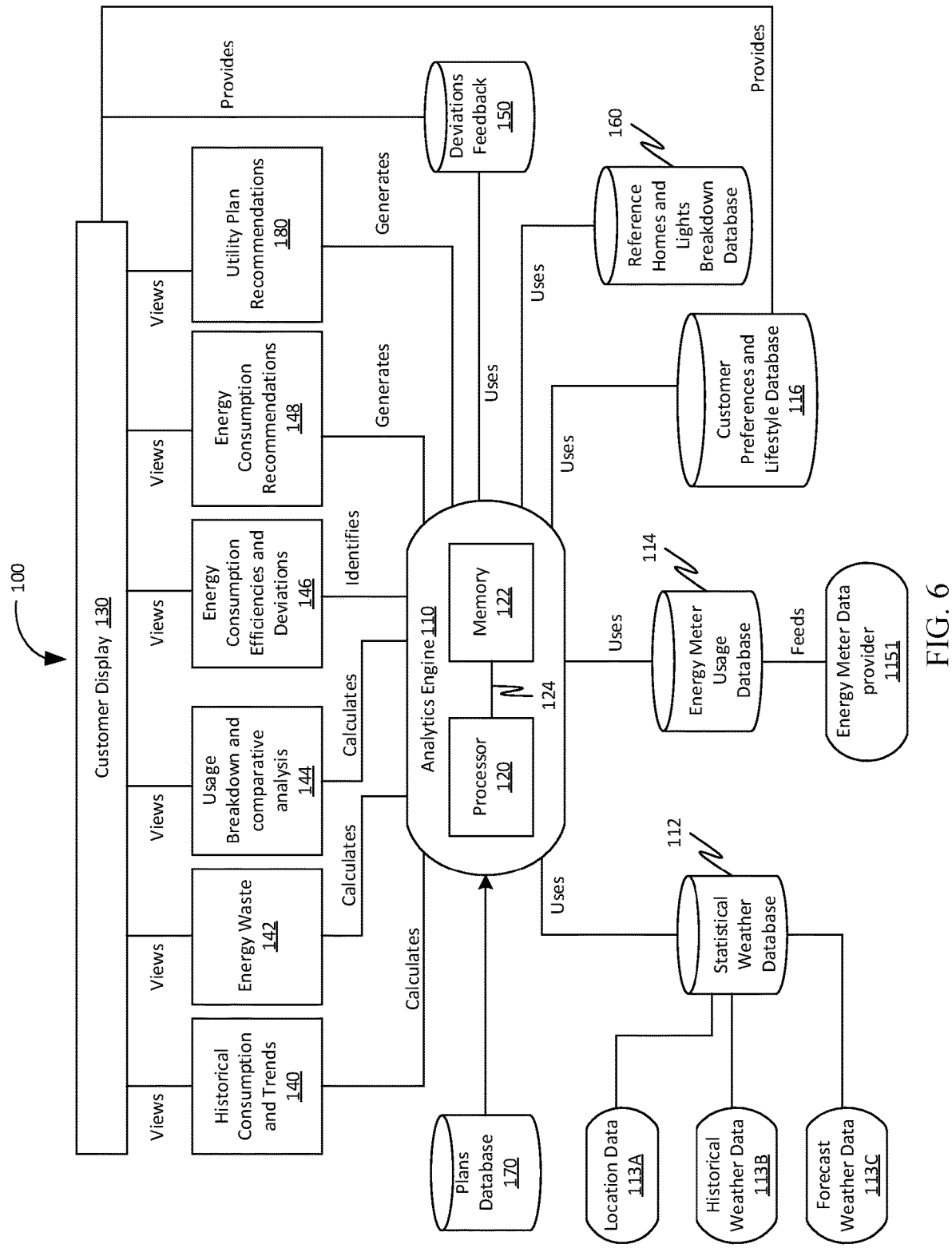
FIG. 6 is a simplified system block diagram for end-use analytics and optimization of energy consumption and smart matching, in accordance with some embodiments.

FIG. 6 depicts a simplified system block diagram for end-use analytics and optimization of energy consumption and smart matching.

Figure 7:
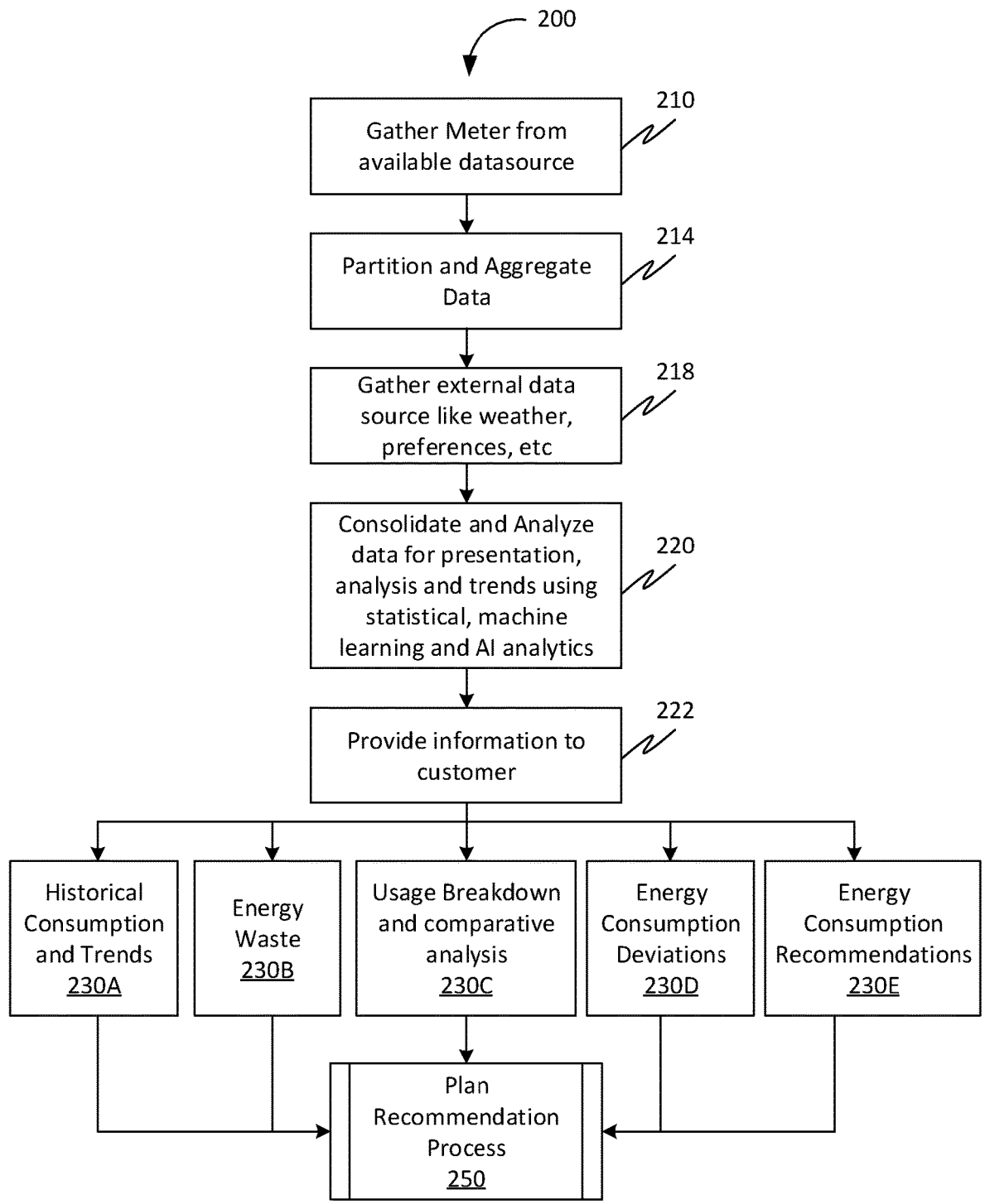
FIG. 7 is a flow diagrams of a method that the system of FIG. 6 may employ to receive and analyze the various data from the plurality of databases, in accordance with some embodiments.
Figure 8:
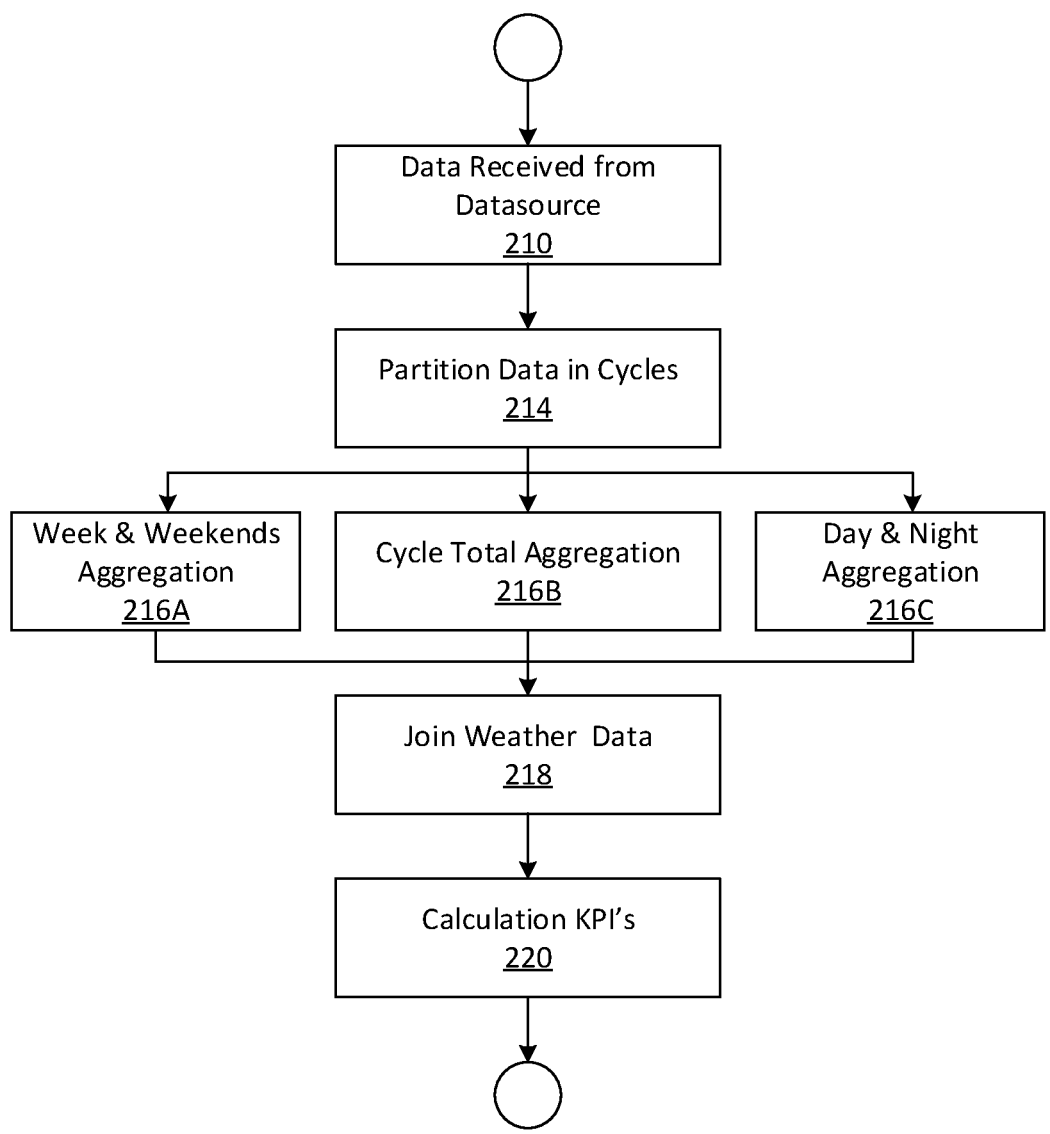
FIG. 8 is a flow diagrams of a method that the system of FIG. 6 may employ to receive and analyze the various data from the plurality of databases, in accordance with some embodiments.
Figure 9:
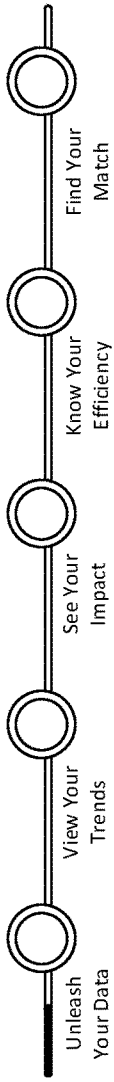
FIG. 9 is representative GUI for user communications with the system, in accordance with some embodiments.

FIGS. 7-8 depict simplified block diagrams of the major processing steps that the platform of FIG. 6 may employ to receive and analyze the various data from the plurality of databases.

FIGS. 9-12 depict representative GUIs for user communications with the system.

FIG. 13 depicts representative GUIs for system communications with the user.

Figure 14:
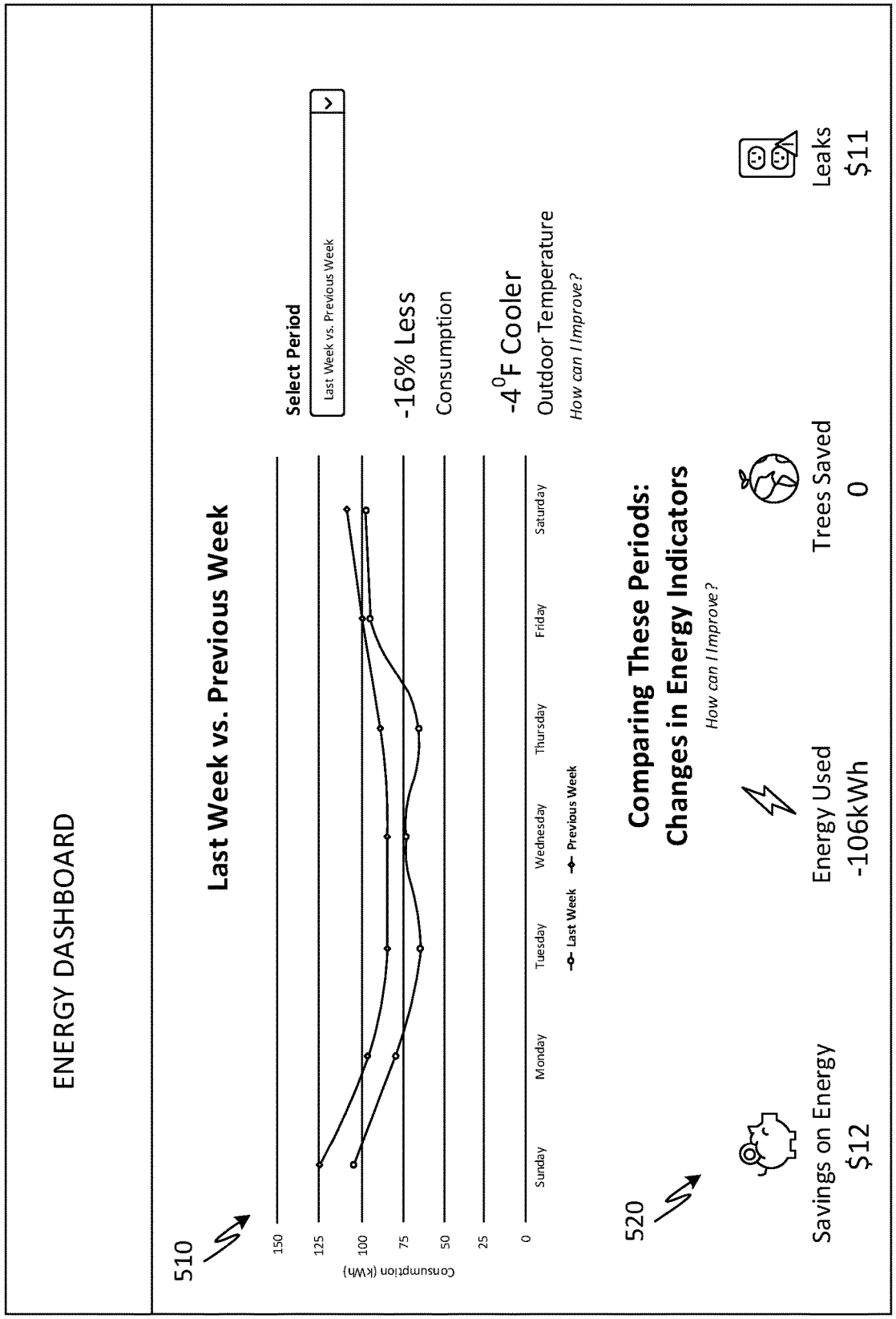
FIG. 14 is representative GUI for system communications with the user, in accordance with some embodiments.

FIG. 14 depicts representative GUIs for system communications with the user.

FIGS. 15-20 depict representative GUIs for system communications with the user.

Figure 21:
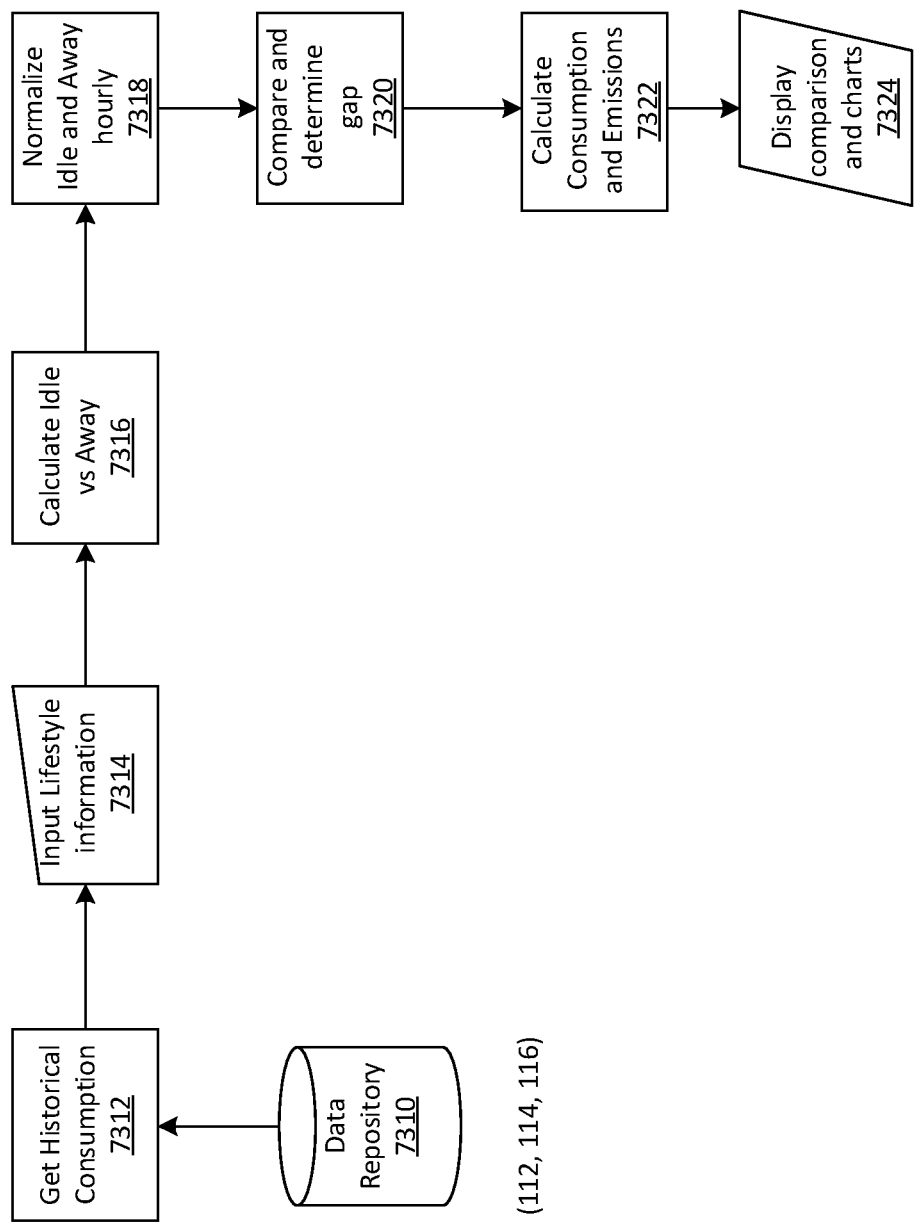
FIG. 21 is a simplified block diagram for calculating energy leakage, in accordance with some embodiments.

FIG. 21 depicts a simplified block diagram for calculating energy leakage.

Figure 22:
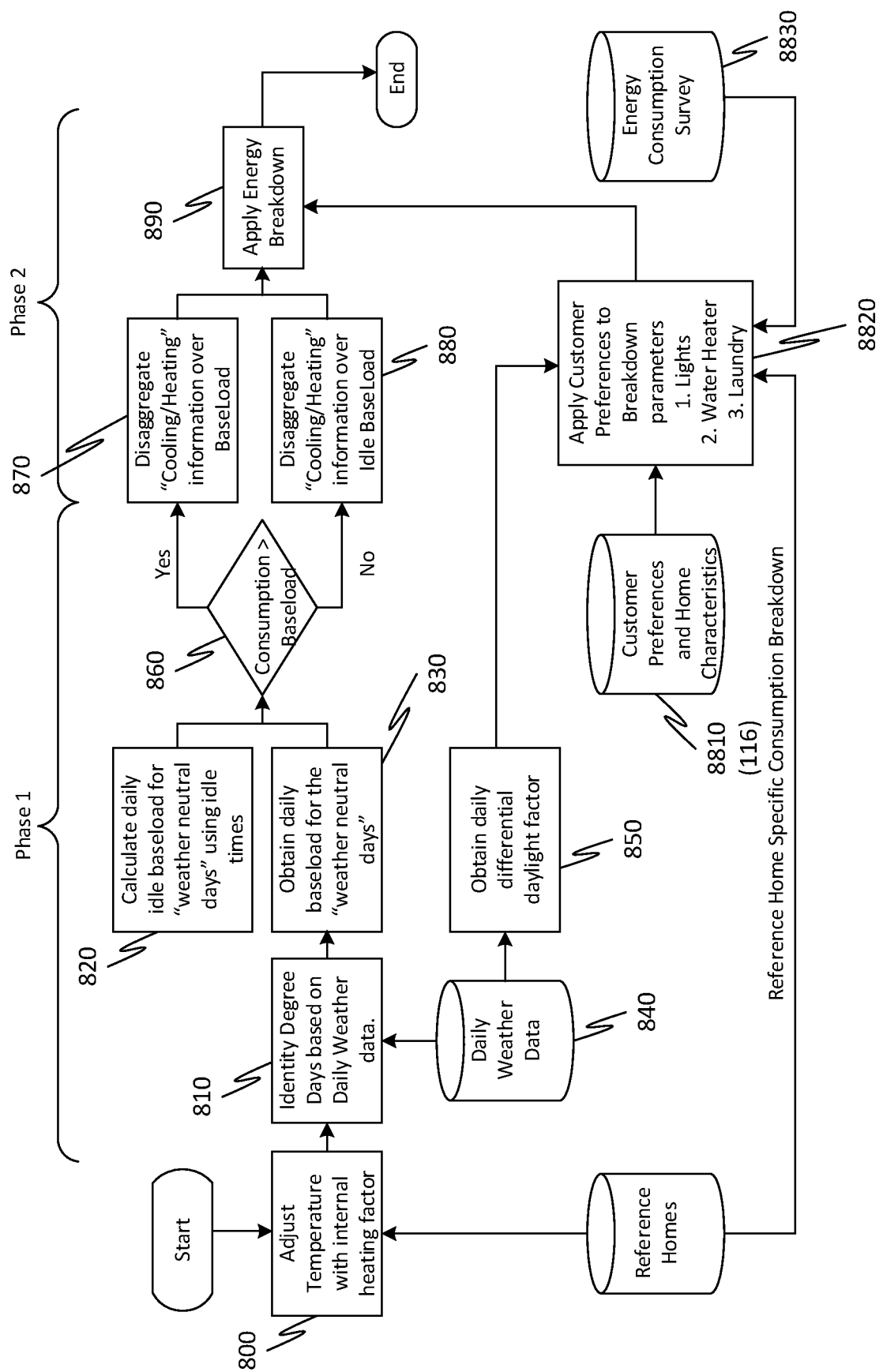
FIG. 22 is a more detailed block diagram of a portion of the block diagram of FIG. 21.

FIG. 22 depicts a more detailed block diagram of a portion of the block diagram of FIG. 21.

Figure 23:
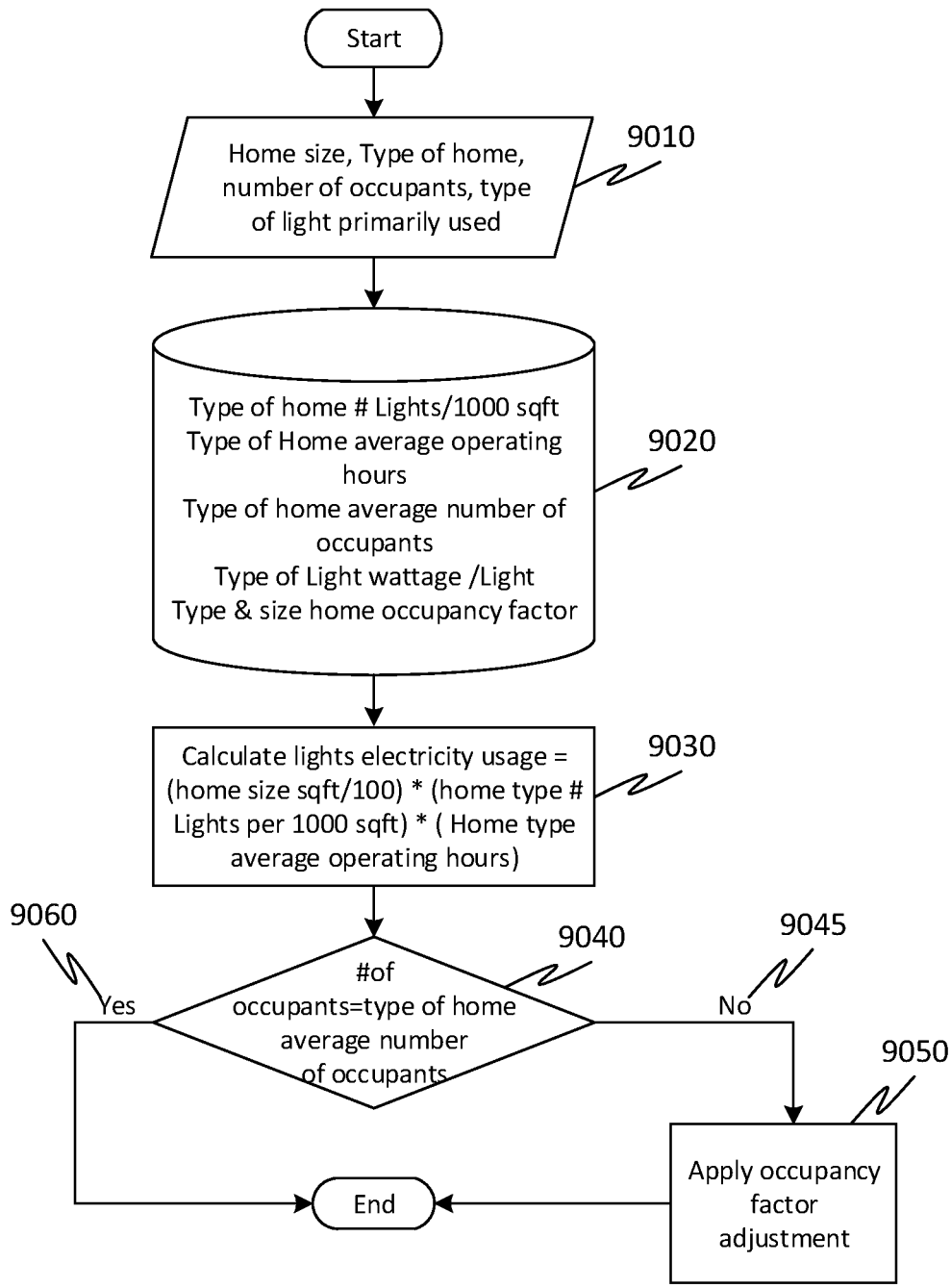
FIG. 23 is a simplified block diagram for calculating lighting energy consumption, in accordance with some embodiments.

FIG. 23 depicts a simplified block diagram for calculating lighting energy consumption.

Figure 24:
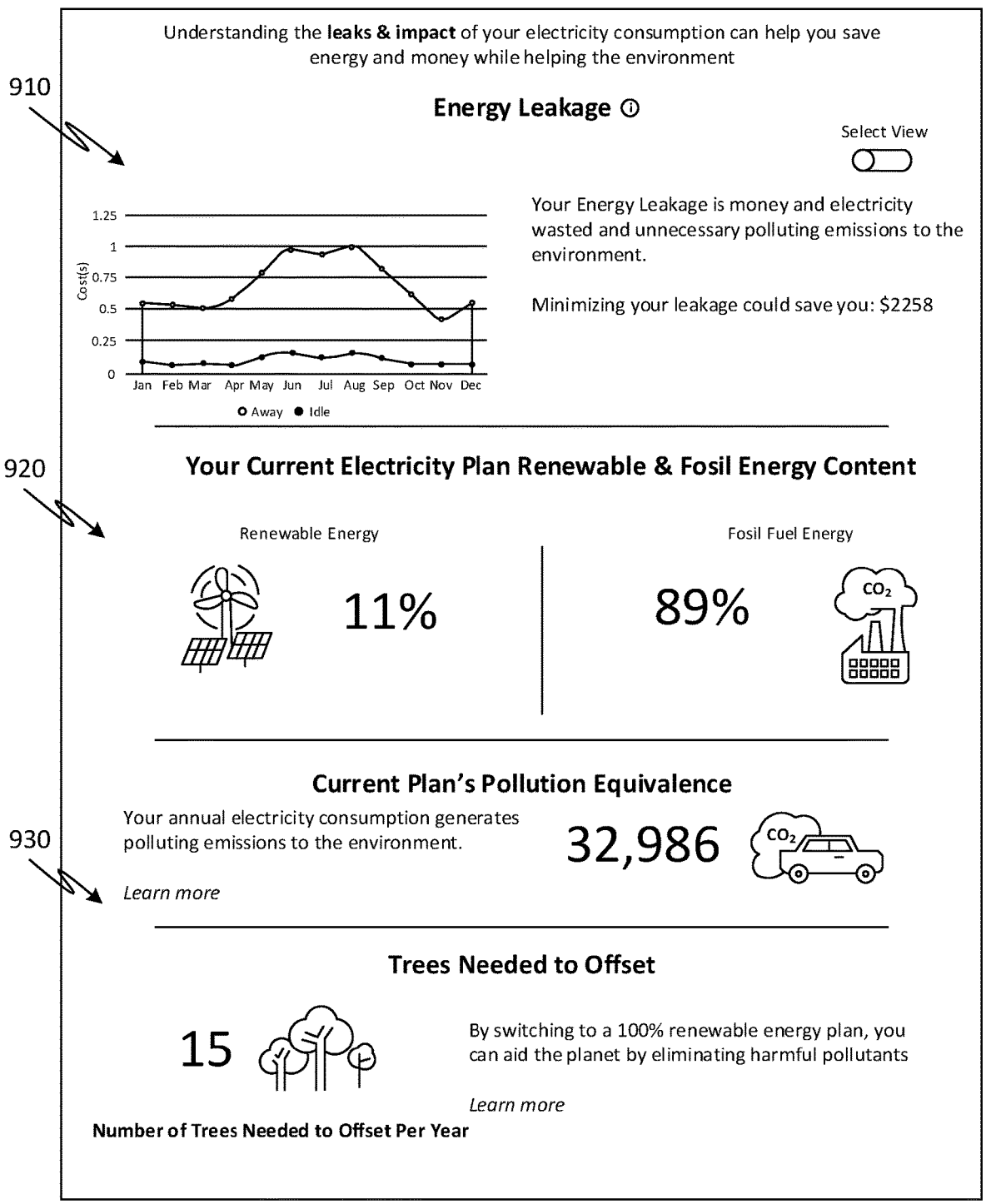
FIG. 24 is a representative GUI for system communications with the user regarding energy leakage, in accordance with some embodiments.

FIG. 24 depicts a representative GUI for system communications with the user regarding energy leakage.

Figure 25:
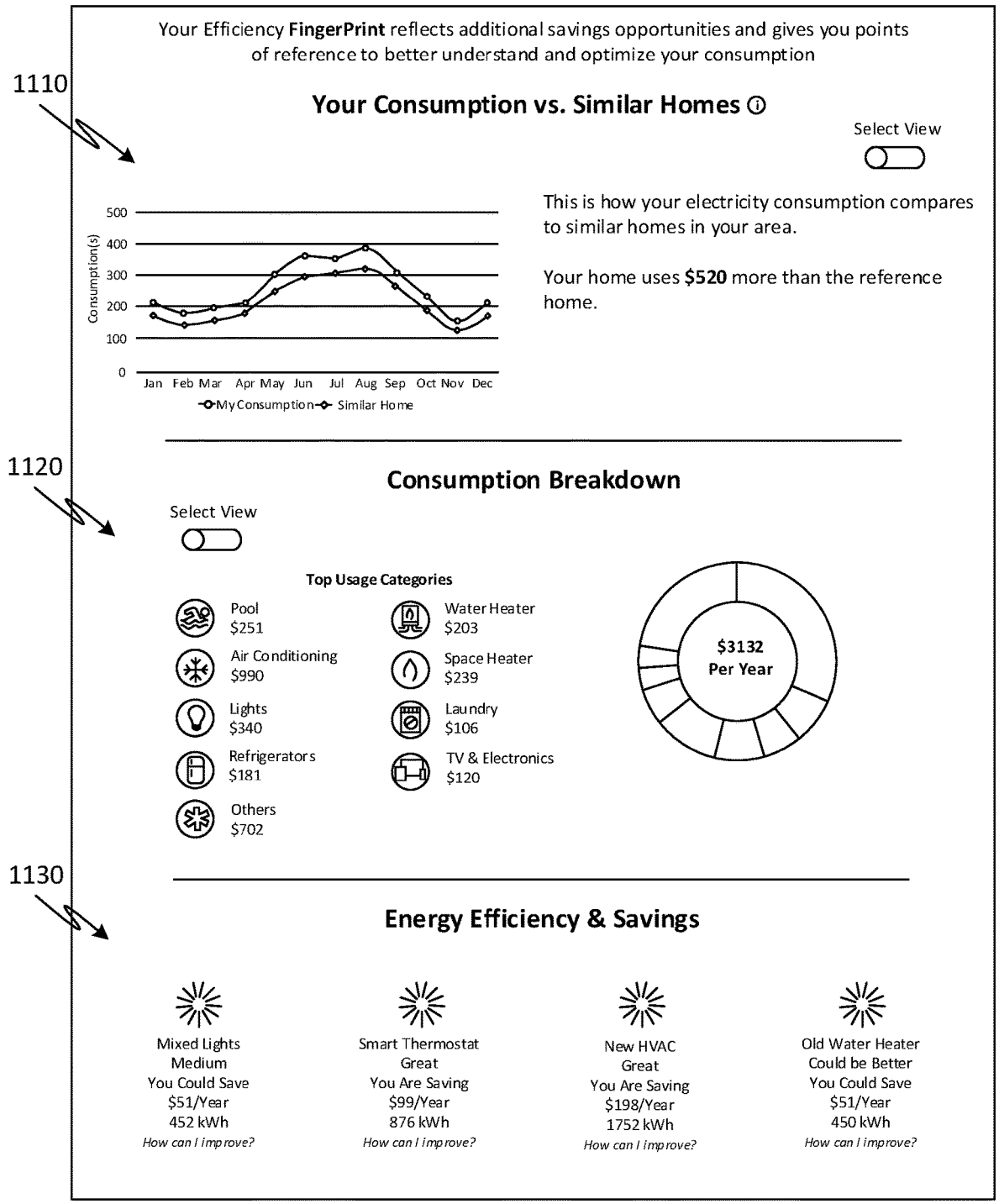
FIG. 25 is a representative GUI for available system comparisons, in accordance with some embodiments.

FIG. 25 depict a representative GUI for available system comparisons.

Figure 26:
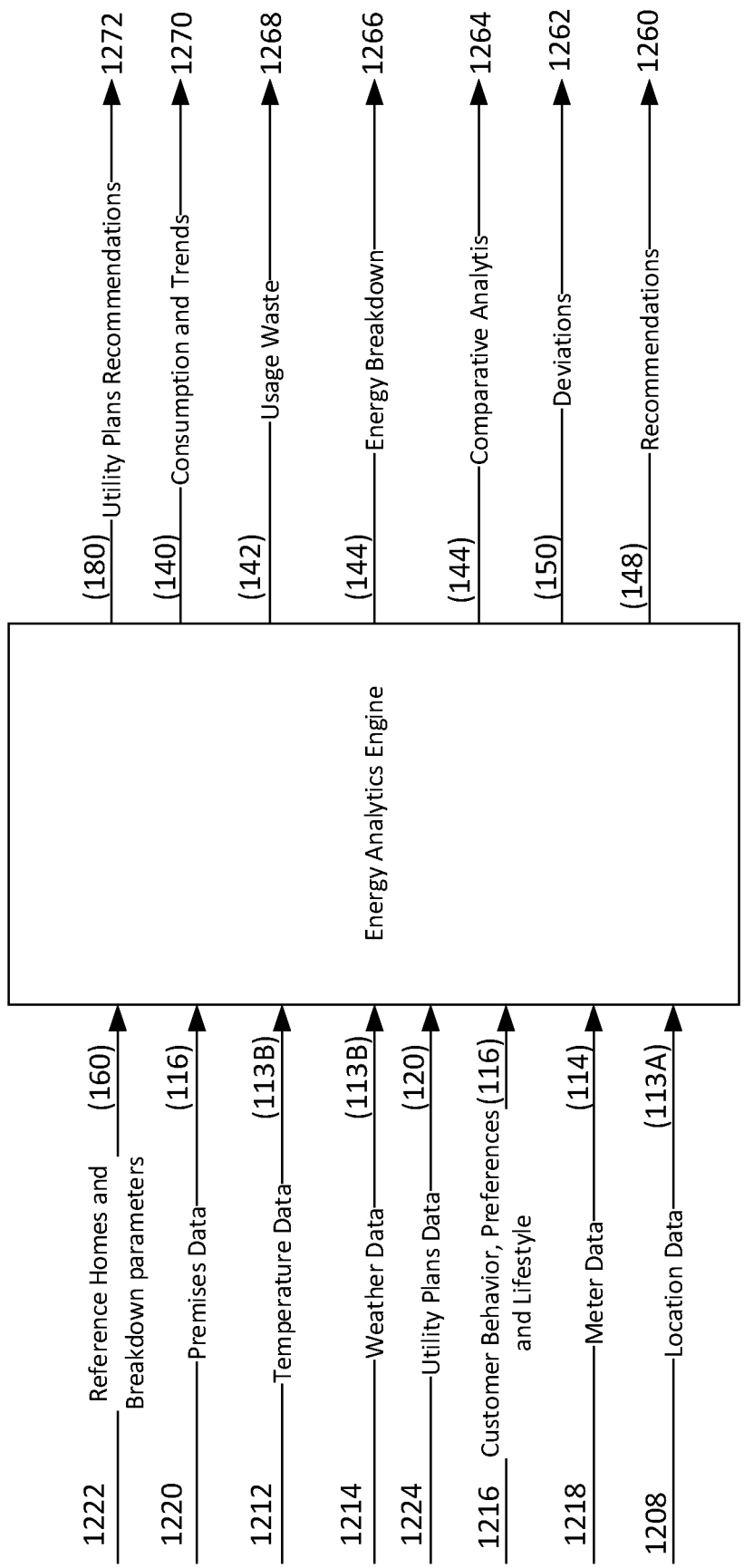
FIG. 26 is a simplified representation of inputs and outputs for the analytics engine, in accordance with some embodiments.

FIG. 26 depicts a simplified representation of inputs and outputs for the analytics engine.

Figure 27:
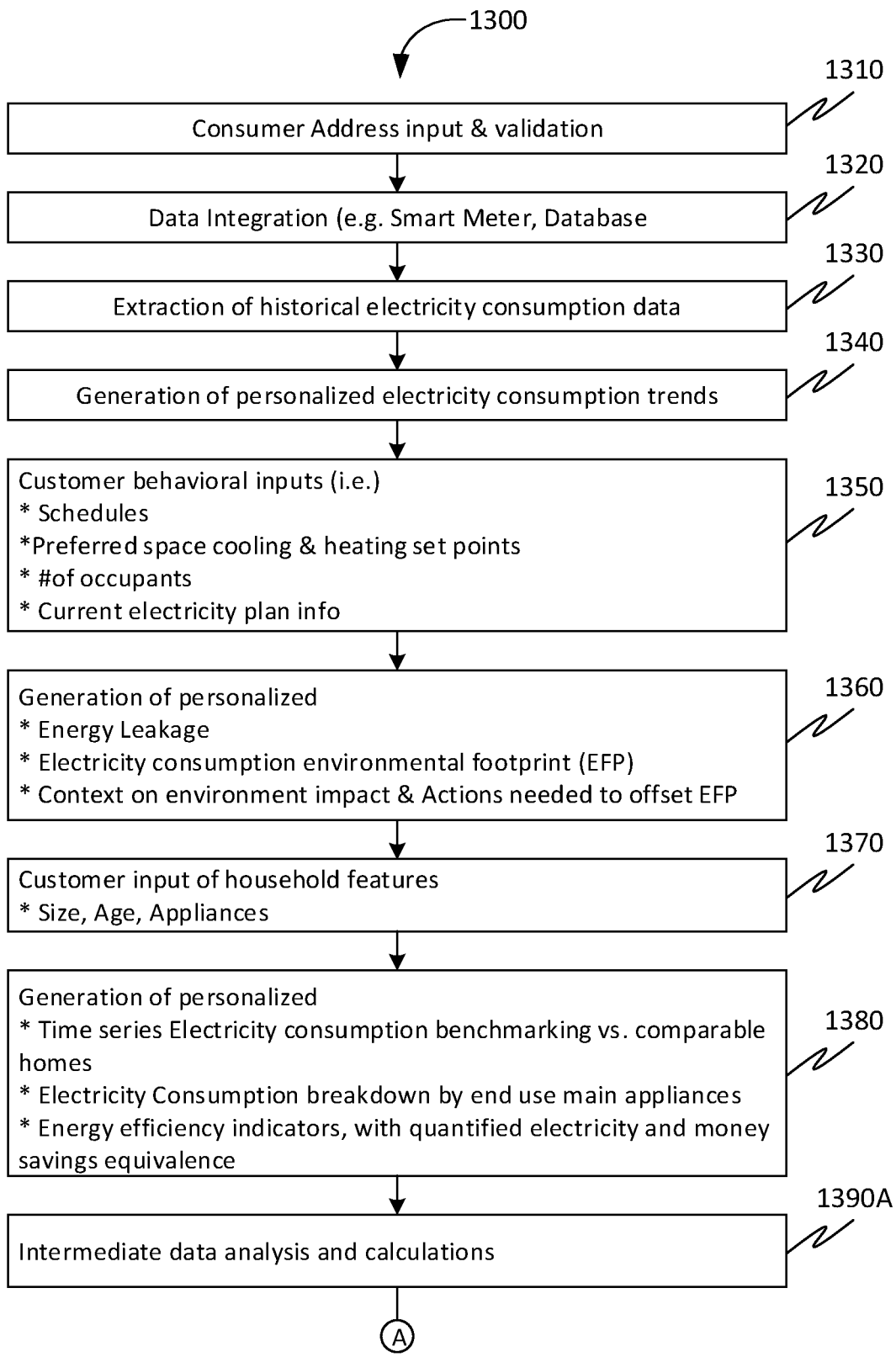
FIG. 27 depict a simplified block diagram of a method of the present disclosure.
Figure 28:
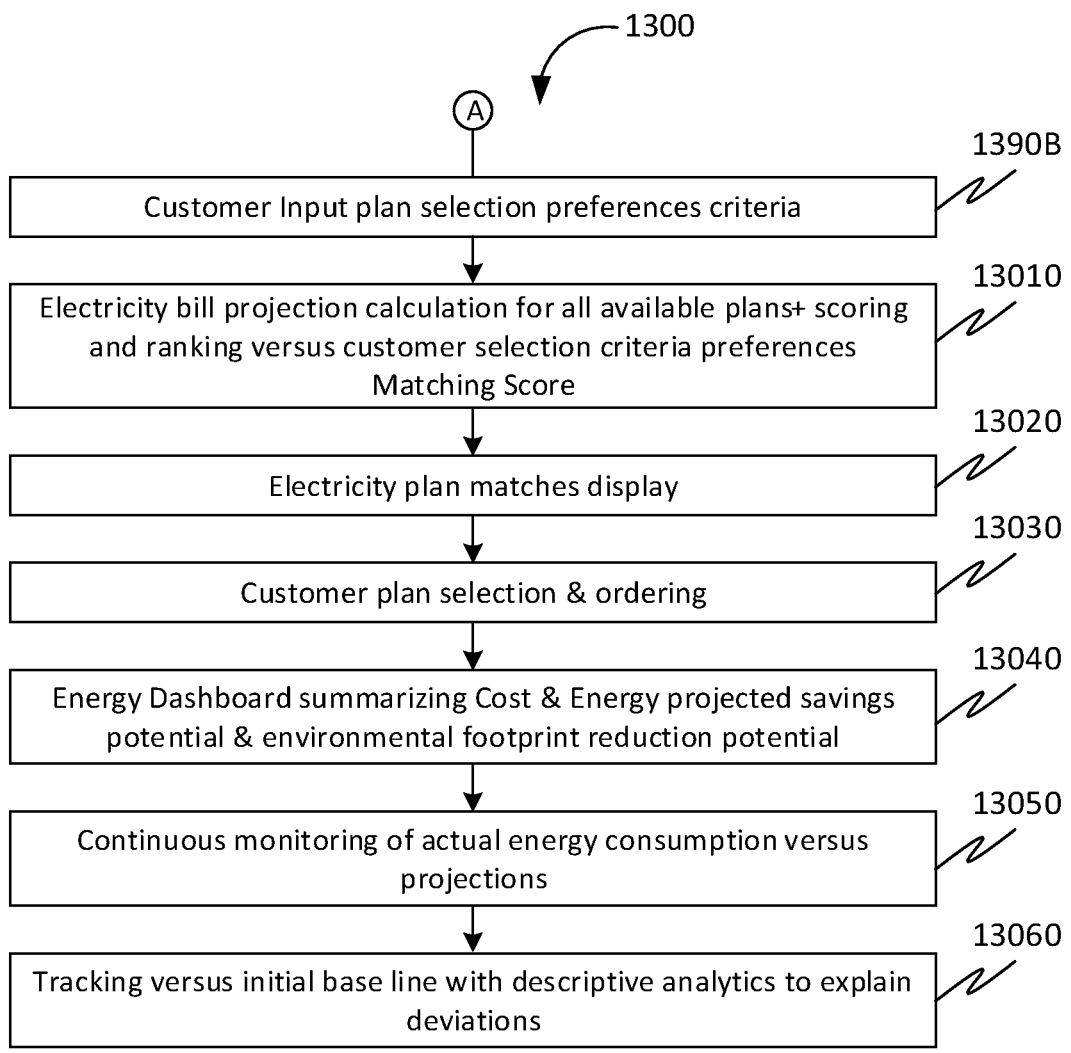
FIG. 28 depict a simplified block diagram of a method of the present disclosure.

FIGS. 27-28 depict a simplified block diagram of a method of the present disclosure.

FIGS. 29-32 depict representative GUIs for system communications with the user regarding a selected portion of results from the system.

Figure 33:
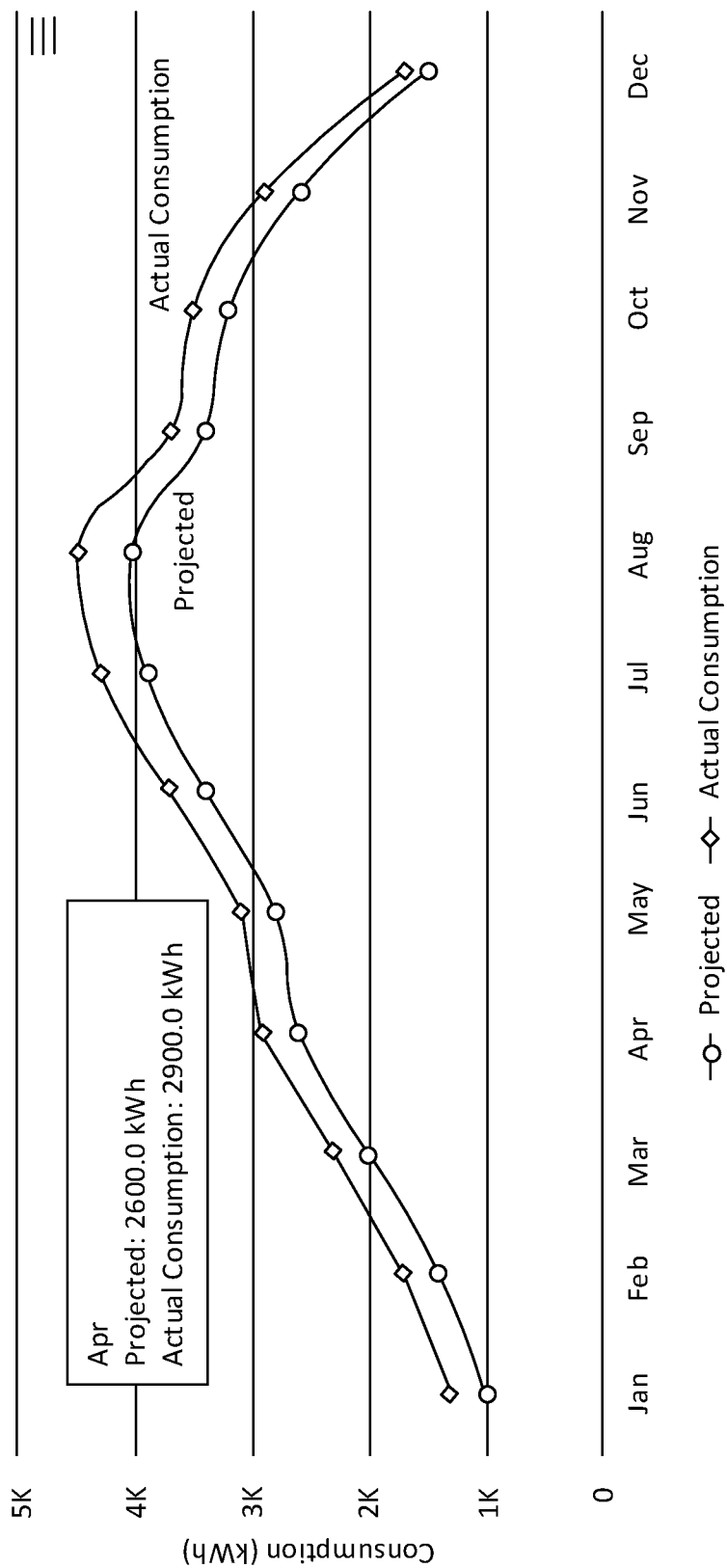
FIG. 33 is a projection of the annual baseline electricity consumption using the method and system of the present disclosure.

FIG. 33 depicts a projection of the annual baseline electricity consumption using the method and system of the present disclosure.

Figure 34:
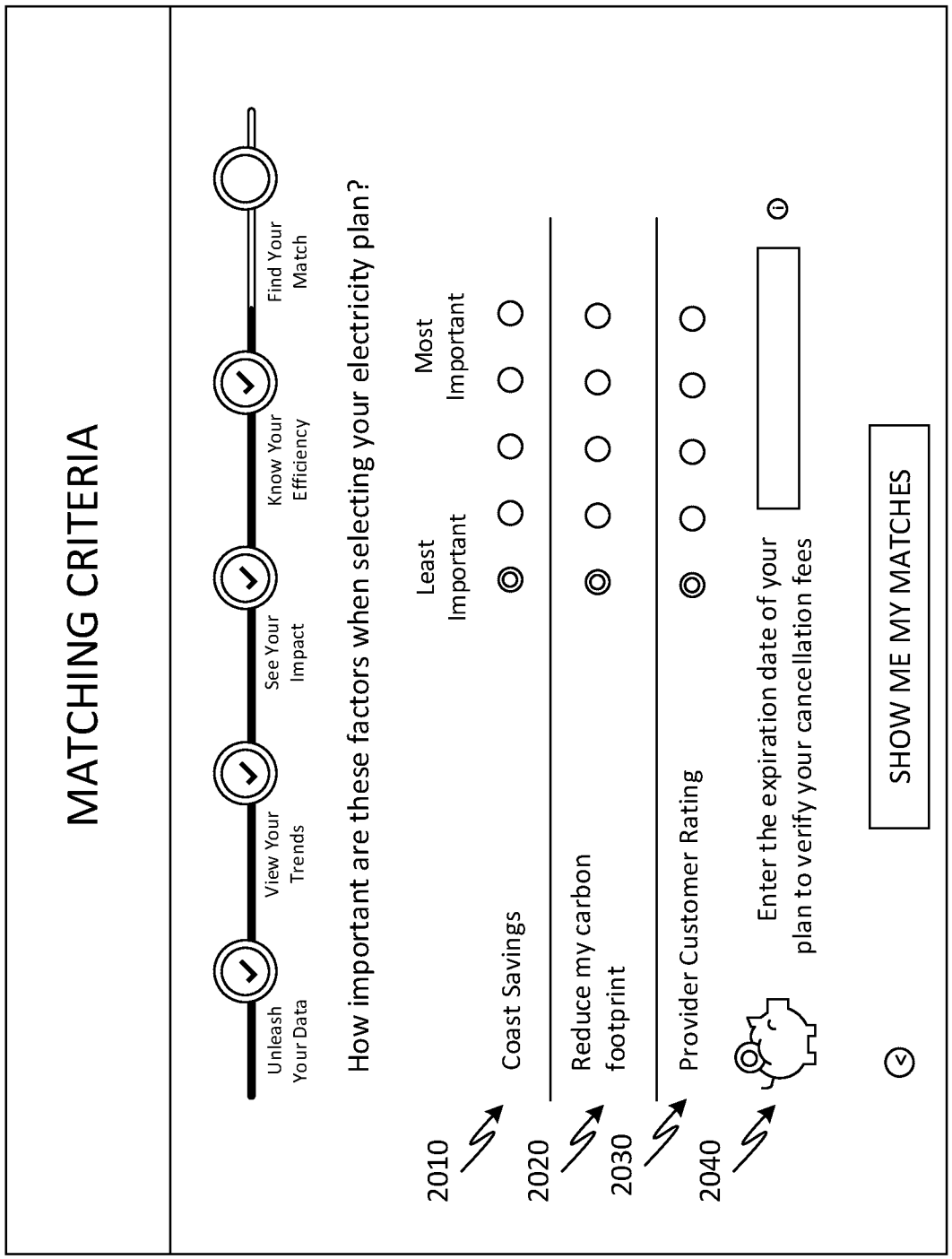
FIG. 34 is a GUI for plan matching criteria of the present disclosure.

FIG. 34 depicts a GUI for plan matching criteria of the present disclosure.

Figure 35:
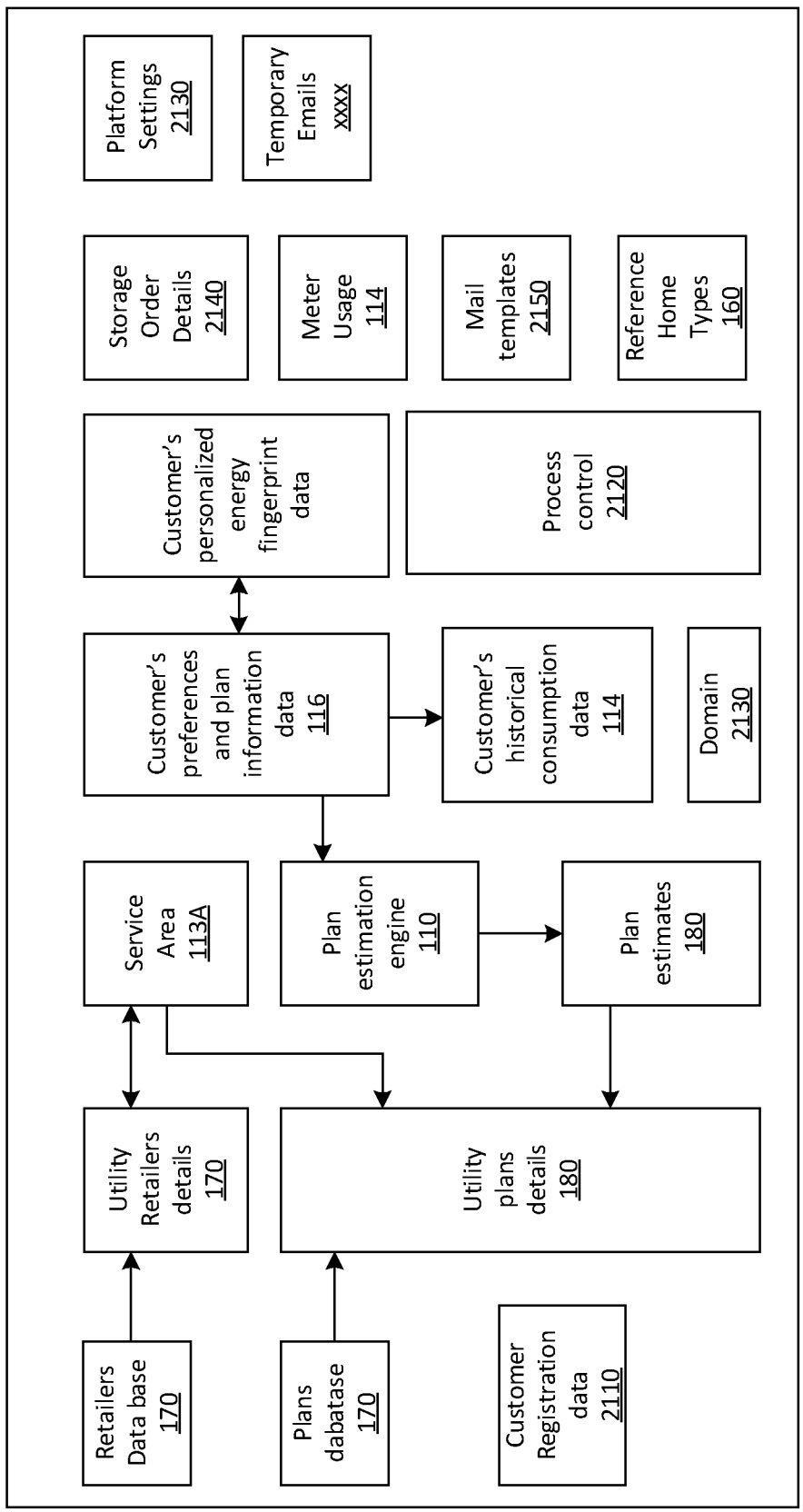
FIG. 35 is a representative example of a data base for a method and system of the present disclosure.

FIG. 35 depicts a representative example of a data base for a method and system of the present disclosure.

Figure 36:
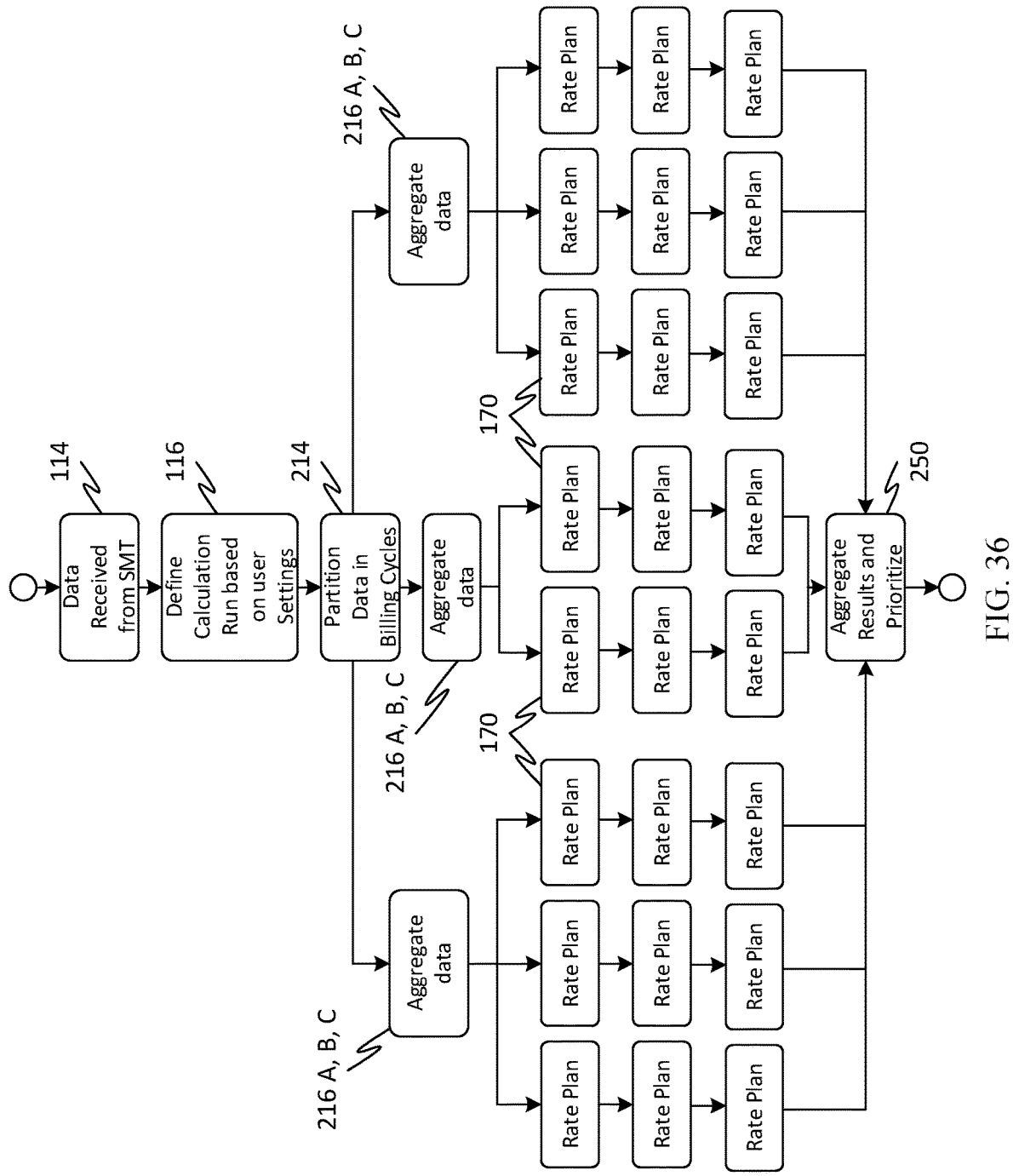
FIG. 36 is representative data analysis for a method and system of the present disclosure.

FIG. 36 depicts representative data analysis for a method and system of the present disclosure.

FIGS. 37-39 depict representative example GUI displays of top plan matches.

FIG. 40 depicts a representative example GUI display of ranked plan recommendations.

FIG. 41 depicts a representative example GUI display showing matching score and highlights for a given recommended plan.

FIG. 42 depicts a representative example GUI showing interactive interface that allows customers to adjust selection criteria and recalculate matching scores.

Figure 43:
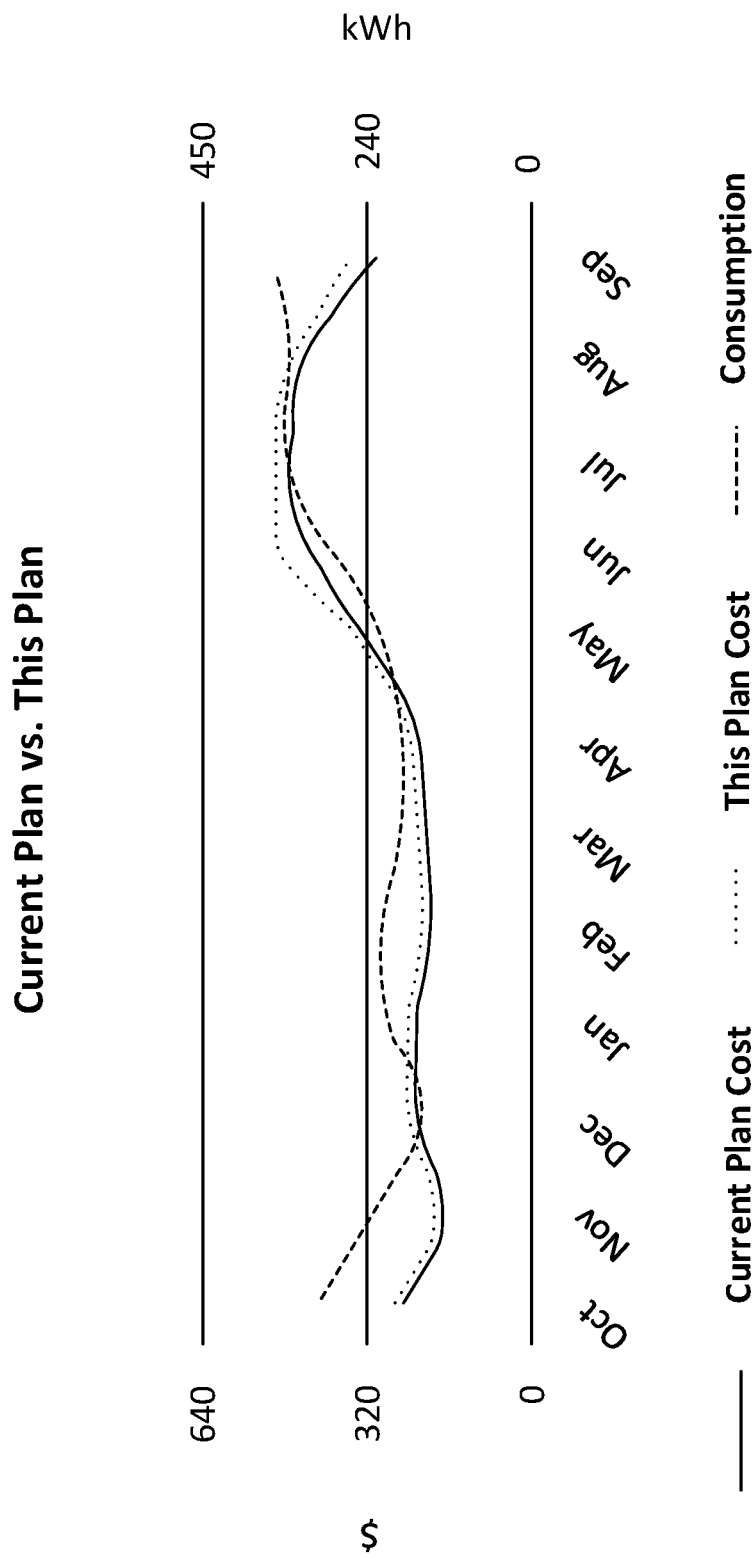
FIG. 43 is a representative example GUI display of historical electricity and cost projections consumption and the cost b, in accordance with some embodiments.
Figure 44:
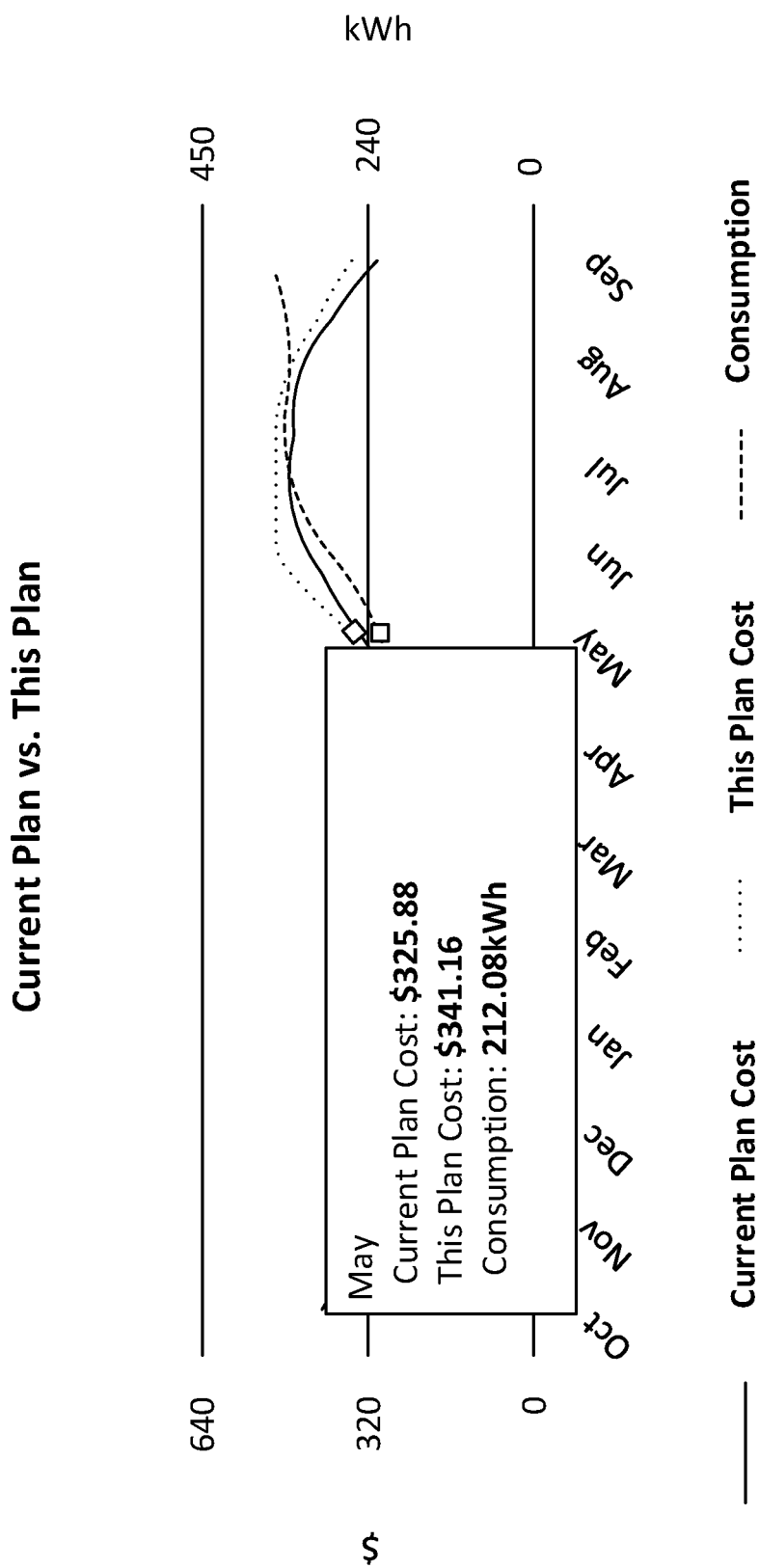
FIG. 44 is a representative example GUI display of cost and consumption projection values by hovering over displayed curves, in accordance with some embodiments.

FIG. 43 depicts a representative example GUI display of historical electricity and cost projections consumption and the cost b FIG. 44 depicts a representative example GUI display of cost and consumption projection values by hovering over displayed curves.

Figure 45:
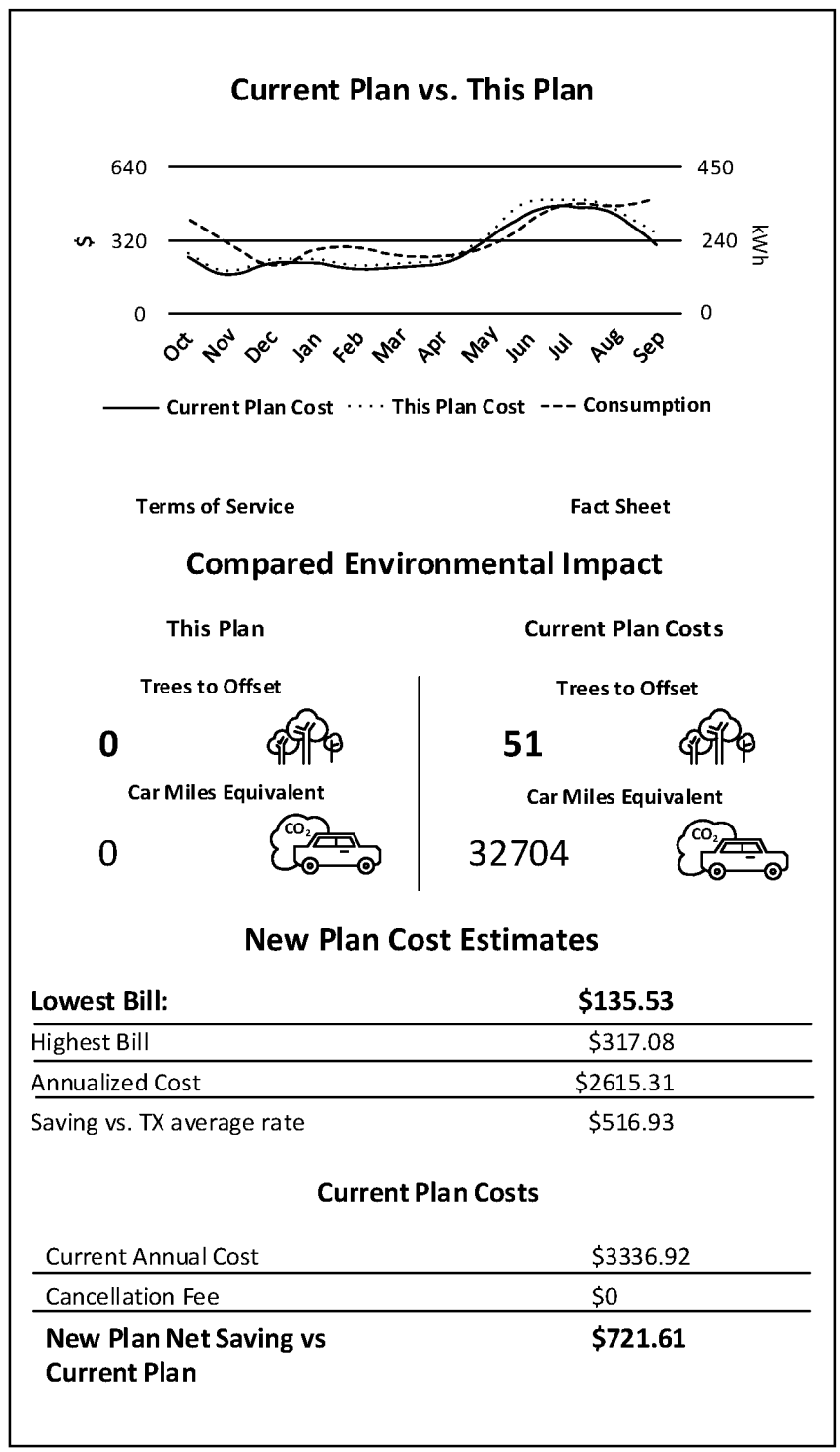
FIG. 45 is a representative example GUI display of quantified cost and environmental impact for each plan compared, in accordance with some embodiments.

FIG. 45 depicts a representative example GUI display of quantified cost and environmental impact for each plan compared.

Figure 46:
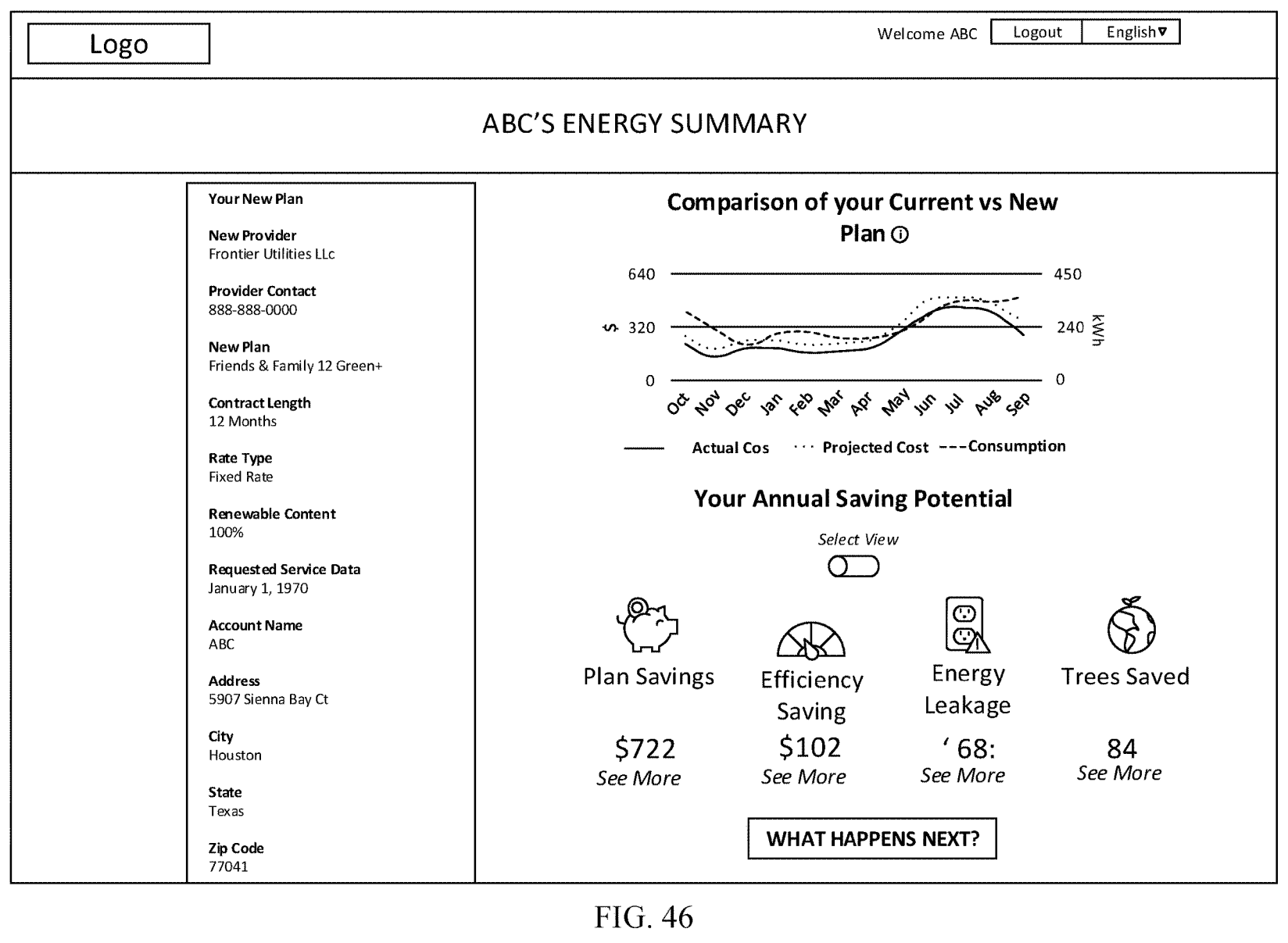

FIG. 46 depicts a representative example GUI display of an Order Summary Dashboard.

Figure 47:
FIG. 47 is a representative example GUI display of behavioral reinforcement elements, in accordance with some embodiments.

FIG. 47 depicts a representative example GUI display of behavioral reinforcement elements including promo codes to participate in drawings and contests with prizes for achieving energy and environmental savings goals with integration with social media platforms (e.g. Facebook, Twitter, Instagram, LinkedIn, WhatsApp) to share progress and invite friends to join.

The present disclosure provides a system for energy analysis that may be implemented using a wide variety and range of technologies, for example, but not limited to web based, cloud, IoT devices, and traditional digital computing devices, or non-traditional computing edge devices. In one embodiment the system may include data and information collection and integration, data analysis and comparisons, data disaggregation and aggregation, summaries of analysis, generate alerts, reports, and recommended or corrective actions. After initialization and analysis, the system may be used to provide continuous or periodic monitoring and continue to recommend options to optimize energy consumption. As used herein "customer", "consumer", "occupant", "user" and "end user" may be used interchangeably, similarly for "premises", "residence", "structure" and "dwelling", they may be used interchangeably. This system may then be used to calculate and rank available electric utility or supplier plans using an end-user's selection criteria for choosing a supplier, in addition to providing intermediary results that are useful for consumer awareness of their energy use and consumption.

FIG. 6 depicts a simplified block diagram of one embodiment or configuration of the platform or system 100 for end-use analytics and optimization of energy consumption of the present disclosure (hereinafter referred to as "platform" or "system"). The system 100 includes an analytics and statistical analysis component, which may include an analytics engine 110 and one or more databases 112, 114, 116, 160, 170, as discussed in more detail herein below. The analytics engine 110 may include a processor 120 and a memory 122 that can communicate via a bus or any other appropriate communication means 124. Although depicted as a single block representing a processor and a single block representing a memory in FIG. 6, a processor 120 of the system of the present disclosure may be one or more processors and similarly for the memory 122, a memory may be one or more memories.

Any memory, as used herein, may be operable to store instructions executable by a processor and may include one or more programs for one or more processors. The functions, acts or tasks illustrated in the figures or described herein may be performed by a properly programmed processor executing the instructions stored in a memory.

The functions, acts or tasks may be independent of the particular type of instruction set, storage media, processor or processing strategy and may be performed by software, hardware, integrated circuits, firm-ware, micro-code and the like, operating alone or in combination. Any processor may utilize processing strategies that may include but are not limited to multiprocessing, multitasking, parallel processing and the like.

The analytics engine 110 may further have associated therewith, or include, at least one display 130 for a user, such as but not limited to a liquid crystal display (LCD), an organic light emitting diode (OLED), a flat panel display, a solid-state display, a cathode ray tube (CRT), a projector, a printer or other now known or later-developed display device for selectively providing organized historical base data, processed data or other calculated and/or generated information to a user. Any display 130 is an interface for the user to see the functioning of a processor, the results of the functioning of a processor, or specifically as an interface with the software stored in a memory or a drive unit. The system may use a display to request permission from a user for permission to access that user's historical energy usage data, regardless of where or how stored or by whom it is stored. Historical energy usage data is useful for performing some of the analysis as described later herein.

Additionally, although not depicted, the analytics engine 110 may have associated therewith, or include, an input device configured to allow a user to interact with any of the components of system. The input device may be a number pad, a keyboard, or a cursor control device, such as a mouse, or a joystick, touch screen display, remote control, voice activated control, or any other device operative to interact with the system. An input device allows the system to obtain information from the user/consumer that is useful in performing some of the analysis as described later herein.

The analytics engine 110 may also include a disk or optical drive unit as a memory 122. The disk drive unit may include a computer-readable medium in which one or more sets of instructions, e.g., software, may be stored. Further, the instructions may be used to perform one or more of the methods or types of analysis as described herein. During execution by a processor of the operations and functions of the analytics engine, the instructions may reside completely, or at least partially, within a memory and/or within a processor having an attached or associated memory. The memory and the processor also may include various types of computer-readable media as discussed above. Thus, a computer implemented system and method are part of the present disclosure.

The present disclosure contemplates a computer-readable medium 122 that includes instructions for execution by a processor(s) 120, or a processor that receives and executes instructions responsive to a propagated signal. The instructions may be implemented with hardware, software and/or firmware, or any combination thereof. Further, the instructions may be transmitted or received over an external or internal network via an appropriate communication interface 124. The communication interface may be included as a part of a processor or may be a separate component. The communication interface 124 may be created in software, may be a physical connection in hardware, or a combination of both. The communication interface 124 may be configured to connect with a network, the cloud, the web, external media, the display, or any other components in the system, or combinations thereof. The connection with a network may be a physical connection, such as a wired Ethernet connection or may be established wirelessly. Likewise, the additional connections with other components of the system may be physical connections or may be established wirelessly or may be combinations thereof.

For example, the instructions to perform the actions described below may be included in a memory 122. The processor 120 may execute the programs in a memory 122 and may receive inputs and send outputs via I/O to various other components or devices of the system.

Again, FIG. 6 is a simplified block diagram of one embodiment or configuration of the platform or system 100 of the present disclosure and the interaction of a customer with that system or platform. The system manages the analytics engine 110 using analytics and statistical functions and uses as part of its inputs a customer database 116 and an energy meter database 114, which may be available from a third-party supplier of energy meter data 1151. The analytics and statistical functions of the analytics engine may be periodically updated to add to or improve functionality of the analytics engine. Moreover, the energy meter database 114 may receive data directly from energy meters. Energy meter data may also be data received from sensors resident at a customer premises but may be forwarded to the system for processing and analysis. Alternatively, the data sent from sensors may be sent directly to an energy meter database 114. Further, the analytics engine 110 may access data related to a customer residence or customer premises (such as a customer profile in the customer database 116). As discussed in more detail below, the customer profile may include data specific to the customer that may be used by the analytics engine 110 for end-use analytics and statistical methods and optimization for energy consumption. The display 130 may display information received from a deviations feedback database 150.

The analytics engine 110, using selected analytics and/or statistical functions using various data bases such as, for example, but not limited to, the energy meter database, the customer database, weather database, and temperature database, may generate calculations, comparisons and recommendations 148 for a customer. For example, the analytics engine may receive historical energy usage data and then arrange and display historical and current energy consumption data and calculate desired consumption characteristics and trends, as discussed in more detail later herein. In addition, the analytics engine may receive data regarding reference buildings and historical statistical data regarding lighting and appliance energy consumption 160, as more fully described later herein. There may also be seen a database of "plans" from available electric utilities or suppliers; these plans are used to help determine which of the available electric utilities or suppliers will be selected for supplying energy to an end-user's premises, as more fully described later herein. The customer may view the current energy consumption 140, 144 via an input/output device 130 (such as a display) dedicated to communication with, or periodically in communication with, the system or platform of the present disclosure. Or, the customer may view the current energy consumption via a computer, a PDA, and/or a mobile telephone. In addition, the analytics engine may generate energy consumption statistics and/or recommendations 148 to "save energy", as discussed in more detail later herein. The system 100 may provide the results of any analysis for display to various devices, such as, for example, but not limited to, a cell phone, a tablet, laptop, etc.

More particularly, the present disclosure preferably provides a cloud or web-based platform 100 that includes the analytics and computational engine 110, and that will when initially accessed by a user, provide that user with a unique account identification for registration using a communication device 130, and then the platform 100 will use a cloud or web based graphical interface for communicating with that user on that user device. These communications may be for information flowing to the user in the way of selected displays, or for a user to provide information to the platform for use in energy usage analysis for that user, as described more fully later herein. The device for communications with and use with the system may be portable and may be located on any type of computer, tablet, laptop, smart phone, or other smart device with communications abilities.

The platform of the system, using a cloud or web based graphical user interface (GUI) when accessed by a user, initially launches a user sign-up display, or a sign-in display, if the user already has an account with the system, and registers the user's device with the system and sets up network connectivity with that user device. In addition, once set up, in one embodiment a user may be asked, via an electronic release form displayed by the GUI, for electronic confirmation allowing for access to selected user data, like for example, but not limited to, access to a database of historical energy consumption by that user from an external database 1151 maintained by some third party, and other protected historical or other personal data. Access to a user's historical energy consumption is needed in order for the system to perform analysis of the historical data for future energy use optimization and recommendations for reduced consumption. Personal information for a user may be encrypted when stored by the system.

Continuing to refer to FIG. 6, the platform 110 of the system 100, using one of many different formats of the web based graphical user interface (GUI), may ask the user to provide non-intrusive information regarding user lifestyle information and residence or premises information and properties, as described more particularly later herein. In addition, the GUI may ask the user to provide recommended or selected criteria values for a set of preselected criteria for rating electric utilities and suppliers as part of their ranking (and may be used to display plan recommendations 180), as more fully described later herein. This user information is stored by the system in a user/customer database 116 and may be changed or updated at any time using that same GUI format. When changes are made, the system 100 may provide a display that may be altered and in some cases the analysis and results may be performed again with the new analysis and results being provided to the user.

The platform 110 of the system 100, after analysis of selected data, and using several different formats of the web based graphical user interface (GUI), may display on the user communication device (or display) 130 different energy consumption and utilization charts and reports from the information gathered from a smart meter database (and any other smart building appliances and devices) or a database of historical energy consumption by that user. Other GUI formats may be employed by the system to obtain additional data and/or information regarding the user or the user's premises.

Referring now to FIG. 7 there may be seen a simplified flow diagram of the overall major processing steps (method 200) that the platform 110 may employ to receive and analyze the various data from the plurality of databases. More particularly, the analytics engine (or calculation engine) generates a unique energy profile that integrates as much energy usage data as is available, but preferably at least twelve months of energy usage data 210, user profile data (lifestyle information and schedules, premises properties, location and schedules), user preferences 218, and weather and external temperature data 218. Further, at 220, the method 200 includes consolidating and analyzing data for presentation, analysis and trends using statistical, machine learning and AI analytics. Further, at 222, the method 200 includes providing information to customer. In addition, although not depicted in FIG. 7, this analytics engine (or calculation engine) may be used to calculate and rank available electric utility or supplier plans 250 using an end-user's selection criteria for choosing a supplier, as more fully described later herein.

FIG. 8 illustrates in more detail a portion of the steps of the analysis steps and pre-processing of data before analysis as depicted in FIG. 7, but in a slightly different sequence. This illustrates that certain steps may rearranged and still provide the desired analysis and processing for the desired key performance indicators (KPIs) 220 of the present disclosure. FIG. 8 illustrates that historical energy usage data 210 may disaggregated 214 into a plurality of different categories 216 a, b, c for analysis and comparative purposes. Those categories may include, and typically do include, those categories needed to calculate energy costs based on the various billing rules employed by energy suppliers; representative categories are for example, but not limited to, total aggregated usage amount 216b, daily aggregated usage amount 216c, time of use usage amount for each day of the week 216a, and other aggregated usage amounts based on scripted logic categories.

Continuing to refer to FIGS. 7-8, and also to FIG. 6, it may be seen that the Cloud or web based platform 110 of the present disclosure receives and integrates all the information and data gathered through the GUI, as well as all of the other data gathered from other data sources (external databases for weather, meter data, external database data regarding reference buildings and historical statistical data regarding lighting and appliance energy consumption, etc. which is then used for comparisons, analysis, disaggregation and aggregation). The platform 110 conditions and converts all data in their respective various native storage formats from all the various data sources into one single and common interoperable database storage format for the system, using a data storage format. And that system databased format enables two-way communication between a system database and the original database providing the data to allow for periodic data updates.

The Cloud or web based platform 110 of the present disclosure receives and integrates weather information 218 (112) and generates significant weather or other types of events to evaluate certain consumption responses, and provides a display of and storage of enhanced historical energy usage data 230a (140, 144) that has been analyzed and disaggregated for main electrical consumption categories (HVAC, pump pools, clothes drying, etc.) based on selected disaggregation or partitioning methods or algorithms 230c, and for some embodiments, integration of actual measurements from smart devices. The historical energy usage data 230a may be partitioned (or disaggregated) into different time periods or "cycles" such as for, example, but not limited to week and weekend aggregation, total usage aggregation, day and night aggregation, etc. These various cycles are useful for later analysis and may also be displayed for comparative and analytic tending purposes.

More particularly, the Cloud or web based platform 110 of the present disclosure provides a calculation and analytics engine capable of initially generating a unique customer multidimensional energy profile (Energy Fingerprint) that uses as much energy usage data as is available, but preferably at least 12 months of historical energy consumption 210 and in addition integrates household lifestyle activities and user preferences 218 (116) to create a multidimensional envelope providing a more accurate model (e.g., digital twin) of the user's consumption based on a user's premises and its devices, and the user's priorities, behaviors, and activities.

Figure 12:
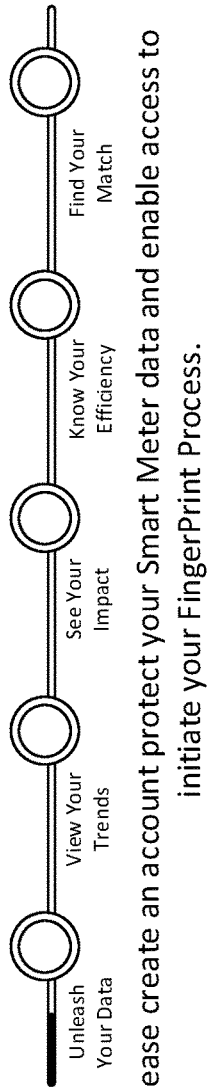
FIG. 12 is representative GUI for user communications with the system, in accordance with some embodiments.

The platform of the present disclosure preferably provides a responsive web-based interface to provide a user with a way to initially sign up and then later sign into the system, and to capture user information, such as, for example, but not limited to lifestyle information and schedules, residence properties and information, and consent for accessing historical energy consumption data. A representative GUI for the initial communications with the system 100 is depicted in FIG. 12. Moreover, FIG. 12 is the initial GUI used to create an account using a customer name 3500, 3504, email address 3506 and password 3508/3512. In addition, a check box may be used to confirm authorization to use the address and to access usage data for that address. As may be seen from FIG. 9, the information requested may include, but is not limited to, type of housing 310, address 320, city 330, state 340, zip code 350. It may also include the user energy supplier 360, and electricity meter number 370, as well as asking for permission to retrieve historical energy usage data for that user, not depicted. Although, once a user is registered with the system, a user may later access the system using any other device, using at least a user logon identification and a password, which is depicted in FIG. 12, but is not depicted in FIG. 9.

The Cloud or web-based platform 110 of the present disclosure also combines household information from a user (dwelling type and size, number of rooms, appliances, number of occupants, etc.), lifestyle behaviors 116 and uses a basic disaggregation algorithm that provides a general split of historical energy consumption into buckets (e.g., A/C, heating, pool, clothes dryers, etc.). Referring now to FIGS. 10-11 there may be seen representative GUI's for obtaining lifestyle information from a user and other aspects regarding the use of energy and their premises. FIG. 10 is used to initially gather information from the user on lifestyle information and preferences, like for example, but not limited to boxes for indicating when the user workday occurs (day or night) 3310, as well as periods of sleep, work, and being at the premises for a twenty-four-hour period for weekdays and weekends 3320, 3330, how many people live in the house 3360, how many are in the house during the day 3350, preferred heating and cooling set points 3340, 3350, normal working hours 3310, energy supplier plan 3370, etc. While FIG. 11 may be used to gather information from the user on the user's premises, such as for example, but not limited to age and/or year built 3410, size 3480, heating system type 3420, A/C cooling system age 3430 and/or type, hot water heater age 3440 and/or type, number of refrigerators and freezers 3530, type of light bulbs used 3440, age of heating/ cooling system 3430, presence of smart devices 3520, swimming pool 3450, electric car(s) 3540, back up electricity generators or batteries, solar panels 3470, etc. The information from a GUI like that of FIG. 11 is needed for more detailed analysis of historical usage data and for analysis and presentations for potential recommendations to decrease energy consumption, as described more fully later herein. This type of data may and other data in the system may be encrypted or otherwise provide with appropriate data security.

The Cloud or web-based platform 110 of the present disclosure provides a calculation and analytics engine capable of generating a unique customer multidimensional energy profile (also known as an Energy Fingerprint) integrating the available historical (for example: 12-24 months) electricity consumption 210, user profile (lifestyle & dwelling properties), customer preferences 218, and for calculating a carbon footprint (current, projected and any delta in carbon footprints). The platform 110 may also provide automated initial and on-going periodic reports 230c capability, for example, but not limited to comparison of the current period's energy consumption vs. consumption (1) in previous/last time period, (2) in same time period last year, (3) by other users in same zip code or area, (4) by other periods or time frames. FIGS. 13-17 are described later herein and illustrate representative GUI formats for these types of comparisons.

In more detail, the Cloud or web-based platform 110 of the present disclosure downloads available historical energy consumption 210 from a depository for historical storage of energy usage data stored at some sampled rate (like, for example, but not limited to, every 5 or 15 minutes). From this time series for energy usage data, the platform extracts by disaggregation and aggregation consumption and lifestyle behaviors (including times of use—e.g., day/night, peak/off-peak, weekday/weekend).

Referring now to FIGS. 13-17 there may be seen representative figures generated by the platform from the downloaded historical usage data regarding the historical use of energy and associated lifestyle behaviors for a user's premises. The types of aggregation that may be performed on the historical usage data, may be for example, but not limited to total consumption (cycle total), daily consumption (aggregates consumption per day), and hourly and day of week consumption (to provide energy consumption trends over time periods, including, but not limited to, days, nights, weeks, weekdays weekends, months, seasons, etc.), etc. This aggregated data is stored in a system memory in a replicated distributed database with controlled replication settings to reduce data loss from any processor (or node) issues.

Figure 15:
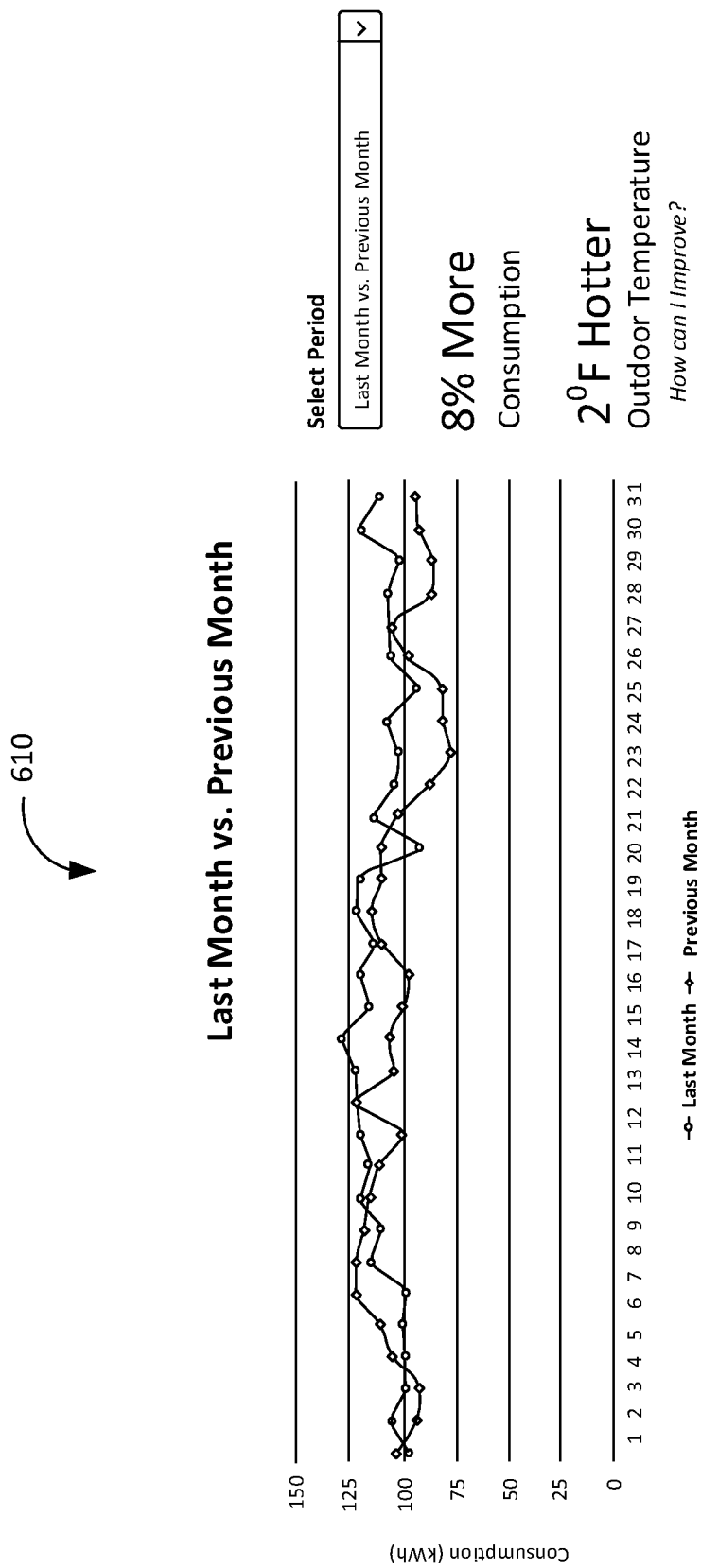
FIG. 15 is representative GUI for system communications with the user, in accordance with some embodiments.
Figure 16:
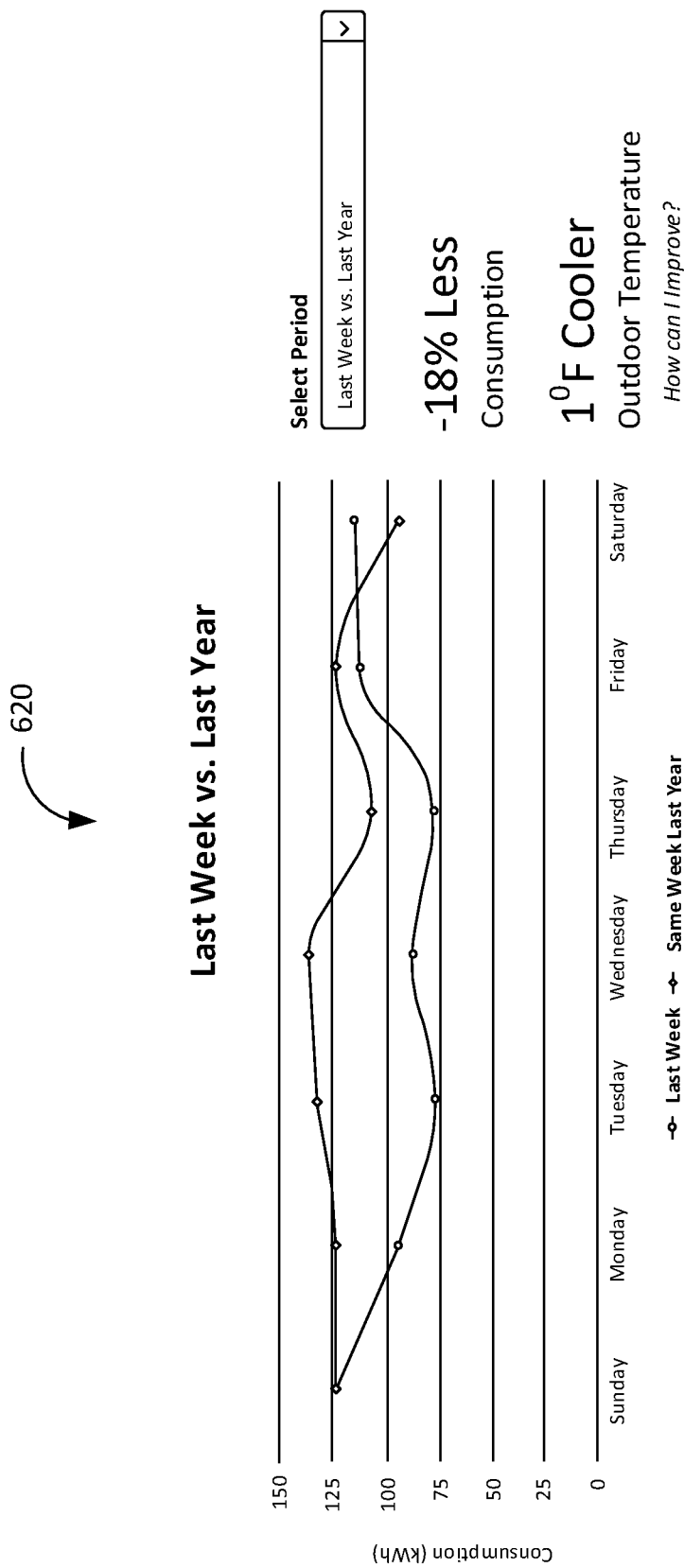
FIG. 16 is representative GUI for system communications with the user, in accordance with some embodiments.
Figure 17:
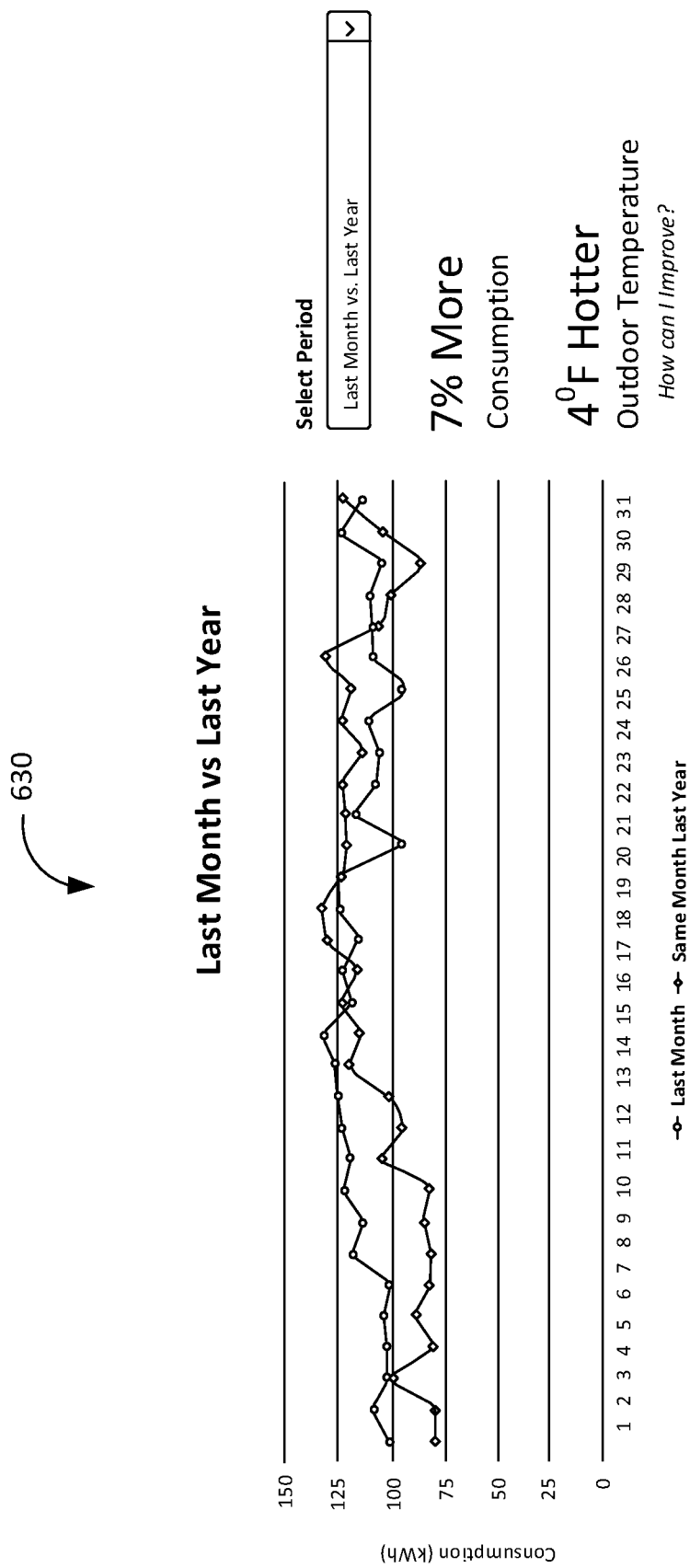
FIG. 17 is representative GUI for system communications with the user, in accordance with some embodiments.

Referring now to FIG. 13, there may be seen a set of representative GUIs for total historical consumption 410, day and night comparisons (which period of time may be defined by the energy supplier or provider) 420, and weekday and weekend comparisons 430. That is comparisons for energy consumption in total 410 and in unique adjacent time periods 420, 430. Similarly, FIG. 14 illustrates a representative GUI for last week and previous week comparisons 510, and associated differences 520 between the two. That is comparisons for energy consumption in the same time periods (a week) for different times. This display is part of a series of energy "dashboards" that my used to display various results from the system and methods of the present disclosure, like those in other figures discussed herein. While FIGS. 15-17 illustrate three representative GUIs for last week and same week from last year comparisons 620, and last month and same month from last year comparisons 630 and last month and previous month comparisons 610. That is comparisons for energy consumption in the same time periods (a month) for different times 610, 630. This type of information and data may be used for trending and analysis for reasons why the comparisons are different.

Figure 19:
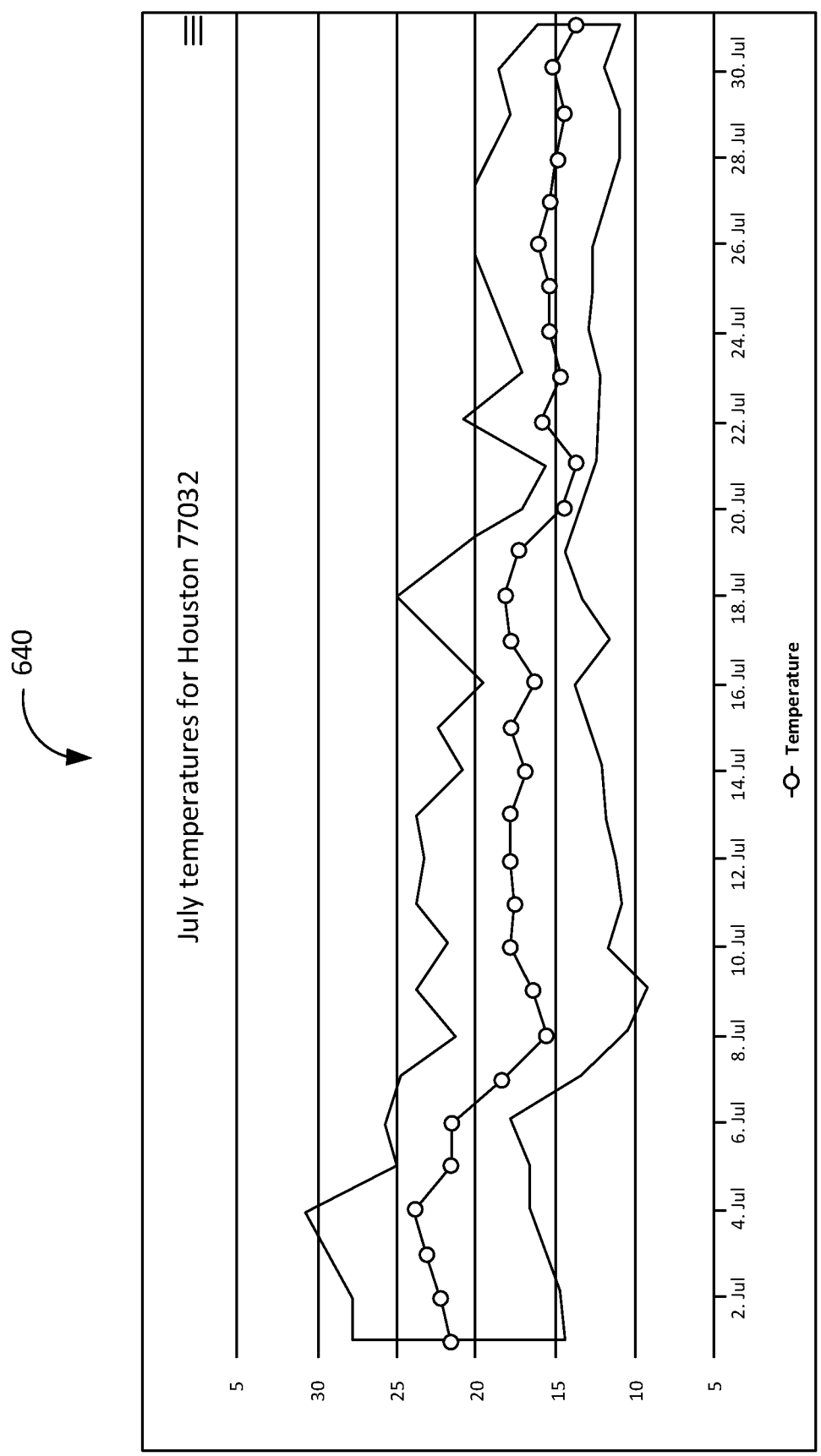
FIG. 19 is representative GUI for system communications with the user, in accordance with some embodiments.
Figure 20:
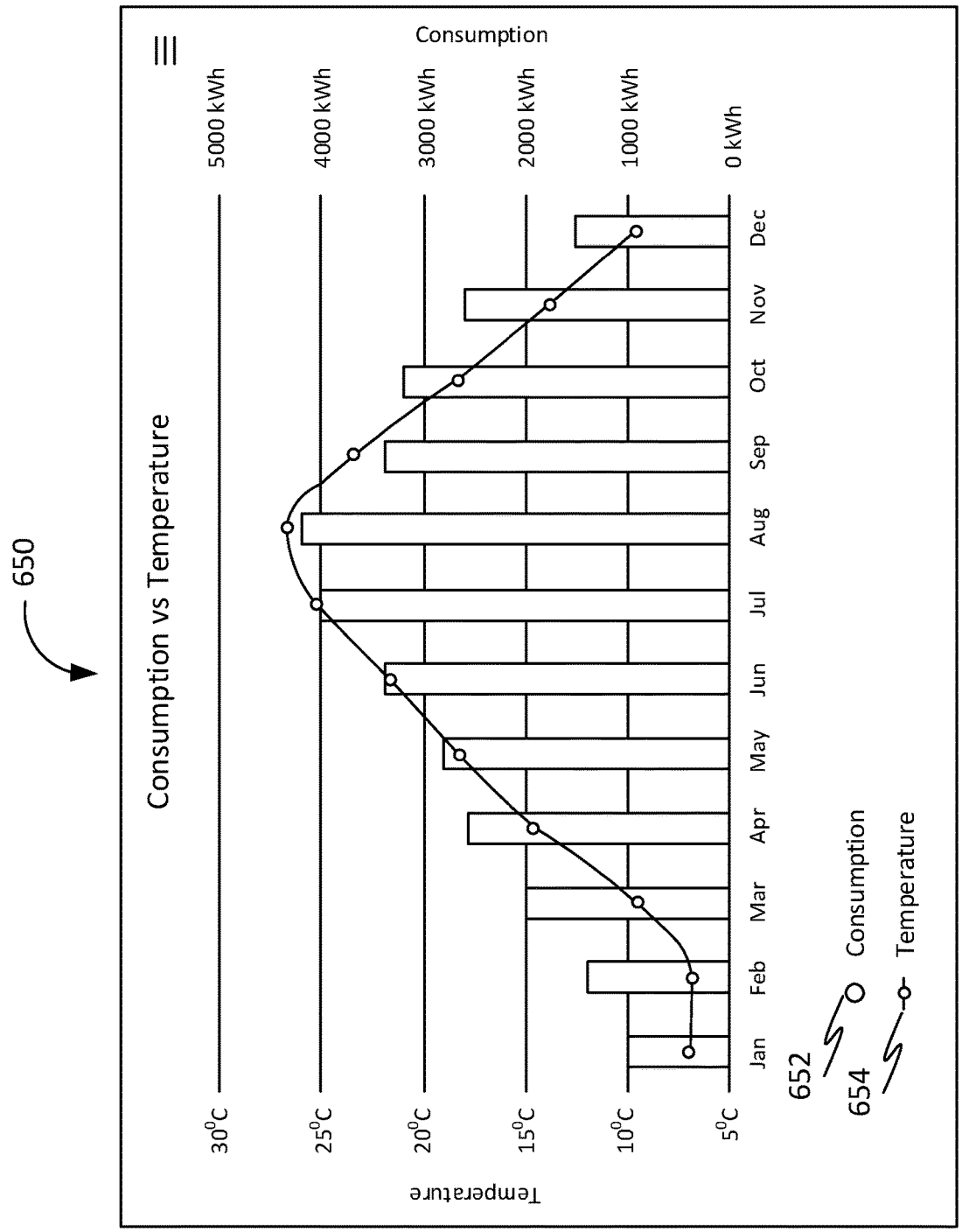
FIG. 20 is representative GUI for system communications with the user, in accordance with some embodiments.

FIGS. 18-19 depicts a historical baseline 630 from the previous historical usage data 114 along with some descriptive text and small figures explaining this data and a chart 640 representing mean temperatures with variances in Houston in the area of zip code 77032 from the temperature data 112. FIG. 20 depicts a graph 650 showing average monthly temperatures 654 along with average monthly consumption 652. Again, this type of information and data may be used for trending and for educating a consumer about annual usage (or other periods) and analysis for reasons as to why comparisons may be different.

Continuing to refer to FIG. 6, the Cloud or web-based platform 110 of the present disclosure also uses historical weather data 113b for the physical geographical location 113a of the premises and forecast weather data 113c to normalize energy consumption based on weather and temperatures. Note that the resulting energy fingerprint is dynamic and changes over time based on adjustments in lifestyle, behaviors, preferences and consumption.

The Cloud or web-based platform 110 of the present disclosure may use each monthly historical consumption as a reference to project the consumption and cost for each individual month and may be adjusted for seasonal effects (e.g., 2017 had Harvey effects in some areas in Texas that didn't repeat in 2018 and might have impacted electricity consumption). The system will recognize weather events (like Harvey) and its impact on consumption and make suitable adjustments in its calculations. Other types of events may also impact consumption (a power outage) and suitable adjustments may be made in the systems analysis and calculations.

Continuing to refer to FIG. 6, the energy fingerprint is the unique digital model/twin from which are determined, for example, but not limited to the following reports and analysis, historical consumption and trends 140, energy waste 142, usage breakdown and comparative analysis 144, energy consumption efficiencies and deviations 146, energy consumption recommendations 148, as described later herein the ranking of energy suppliers for selection by a consumer. The system 100 may display information in GUI's, like for example, but not limited to the consumption statistics for monthly consumption, Day vs Night consumption 420, Week vs Weekend consumption 430, and Seasonal Consumption; a carbon footprint based on the current energy plan for energy supplier; efficiency factor information 116 defined as, for example, but not limited to Idle vs Away consumption comparison, and Idle vs Away Seasonal Indexes; efficiency indicators, such as for example, but not limited to LED lights usage, cooling temperature set point vs National Average Cooling Temperature, heating temperature set point vs National Average Heating Temperature; comparative premises analysis from a monthly consumption vs reference building consumption; and consumption breakdown by device and appliance, and other similar GUIs like those illustrated in FIGS. 13-17.

The energy leakage consumption calculation of the present disclosure identifies quantities of electricity unintendedly consumed during time periods in which there are no occupants in a given premise ("away" time) compared to the electricity consumed during times in which the premises occupants are not actively using electricity (e.g., sleeping periods, a.k.a. "idle" time).

The energy leakage starts with the identification of the idle and away energy consumption periods. As noted earlier in FIG. 10 the customer provides inputs about schedules including but not limited to number of occupants, time to go to bed, and wake up time, and may also include information about time at which the occupants leave the premises, and the time at which the occupants return.

Most existing platforms for determining a base and consumption load use sub-metering and/or data science techniques to determine periods and amounts of electricity usage but focus on monitoring and quantifying how much electricity is consumed when the household is actively engaged in activities that use electricity which are part of their daily routines and lifestyles. While there are energy saving opportunities from that knowledge, and almost all electricity consumers are interested in saving electricity and money, there is no significant interest in sacrificing comfort or making changes to lifestyle and habits in order to achieve that goal.

The objective of the energy leakage calculation of the present disclosure is to identify ways to save electricity in non-intrusive ways that do not interfere with or limit a consumer's intentional engagement in activities that utilize electricity (e.g., watching TV, using computers, cooking, doing laundry, etc.).

The energy leakage calculation of the present disclosure directly links customer historical usage, lifestyle schedules, preferences, and settings through analysis, comparisons and simplified pragmatic methods to identify non-intrusive ways to save energy without requiring efforts by the customer to change any regular activities in which electricity is actively consumed in the household. This integration of a plurality of customer inputs, data and behavioral science brings visibility to previously unknown wasted electricity, quantify its associated cost and environmental impact, and equally important provides a non-intrusive way to save energy. This energy leakage calculation offers a cue rich, pain free path to positive action for reducing energy consumption.

To mitigate for potential user input bias or errors in the schedules that users input to the system, the idle time is also determined using a method based on clustering analytics for unsupervised learning, as described herein below. Clustering is a method for unsupervised machine learning algorithms. Typically, unsupervised algorithms make inferences from datasets using only input vectors without referring to known, or labelled, outcomes. The objective of clustering methods is simple; group similar data points together and discover any underlying patterns. To achieve this objective, clustering techniques such as K-Means, X-means, or Probability Methods (e.g., Gaussian Mixture Models or non-Gaussian models) look for a fixed number (k) of clusters in a dataset. The clustering method allows for the classification and visualization of period usage data into "k" number of clusters. Each cluster may then be identified as a period of high, low, or nominal usage.

The clustering analytics process used may be a straight forward k-means method or a Gaussian approach with the use of probability to help classify the data. Further, the results of a Gaussian mixture model on actual energy usage data may be plotted along the y-axis for a specific one-week period for a specific premise and along the x-axis represents energy usage during fixed times (timestamps?) during each day.

The classification cluster that contains the energy usage and timestamp of lowest usage 1110 may be employed as the electricity consumed during times in which premise occupants are not actively using electricity (e.g., sleeping periods, lowest usage, a.k.a. "idle" time). See, for example data points in clusters 1120, 1130, and 1140. Once all points are assigned to a cluster using the Gaussian distribution, then statistical inferences (e.g., mean and variance) may be determined for that cluster; these statistical inferences may then be used for analysis, forecasting and other related uses.

However, the non-probabilistic nature of k-means and its use of simple distance-from-cluster-center to assign cluster membership leads to poor performance for many real-world situations. Given simple, well-separated data, k-means finds suitable clustering results. From an intuitive standpoint, any clustering assignment for some points is probably more certain than for others; for example, if there appears to be a very slight overlap between the two middle clusters, the assignment between which of the two choices may be ambiguous in the cluster assignment of points between them. The k-means model has no intrinsic measure of probability or uncertainty regarding assignment of data as part of cluster assignments. Probability based methods (e.g., Gaussian mixture model (GMM)) attempt to find a mixture of multi-dimensional Gaussian probability distributions that best model any input dataset. In the simplest case, probability methods such GMMs can be used for finding clusters in the same manner as k-means. However, the two disadvantages of k-means—its lack of flexibility in cluster shape and lack of probabilistic cluster assignment—mean that for many datasets (especially low-dimensional datasets) it may not perform as well. However, the use of such methods (e.g., GMM) overcomes these limitations, and provides for a more accurate analysis of energy usage idle time data. For example, A Gaussian mixture model (GMM) has soft boundaries and may have a single point assigned to two different clusters but with different degrees of belief (e.g., 60% in one cluster and 40% in the other cluster). Once all points are assigned to a cluster using the Gaussian distribution, then statistical inferences (e.g., mean and variance) may be determined for that cluster; these statistical inferences may then be used for analysis, forecasting and other related uses. These Gaussian methods (mixture model cluster classification techniques) may be further developed to identify, in real or near-real time, outliers and anomalies through statistical techniques using a mean, standard deviation, and other estimators against each individually computed cluster value. The determination of the assignment of a new data point or set of data points to its classification may be achieved via Euclidean geometry as well, as an alternative.

Referring to FIG. 21, the basic calculation steps for energy leakage consumption are as follows, historical energy consumption information 7312 is retrieved from a data repository 7310 (e.g., cloud, server, data lake, etc.) along with customer input of lifestyle information 7314 regarding activities and schedules using a web browser GUI user interface (as depicted in FIGS. 10-11). More particularly, the calculation steps are as follows, idle and away periods 7316 are initially determined by using and combining multiple methods, like inputs from a customer, combined with use of machine learning algorithms including machine learning clustering techniques for unsupervised learning, like for example but not limited to, a Gaussian mixture model for classification of data, as described earlier herein. Next the energy consumption during idle and away periods is normalized 7318 to adjust for outdoor temperature differences, followed by normalization of energy consumption during idle and away periods accounting for scheduled operation of appliances (e.g., pump pools running during away periods, etc.). Idle and away period data are then compared to generate the leakage 7320. And, if desired, then a calculation and comparison of average hourly electricity usage during idle and away periods may be made, followed by an estimation of the resulting associated cost and emissions 7322 to the environment. The results from these calculation and comparison steps may then be displayed 7324 as descriptive analytics in formats such as for example, but not limited to idle and away electricity consumption and associated energy leakage, cost and emissions over a period of time (e.g., annual, monthly, weekly, etc.). These steps are briefly summarized hereinbelow regarding FIG. 7.

Referring now to FIG. 22, there may be seen additional details regarding selected steps of FIG. 21. More particularly, it may be seen that more details 810 are provided regarding internal temperature for a residence compared to weather data 840 for outside temperature for each day (or other selected period of time) to determine "weather neutral" days (or "degree days") 820, 830. For those "weather neutral" days, a determination is then made as to whether that day is labelled as an "idle" day 820 or a "baseline" day 830, based on energy consumption for that day. The energy consumption for those days is then disaggregated 870, 880 to remove preselected appliance consumption (for example, but not limited to heating and air conditioning systems, etc.) for energy breakdown. The breakdown data is then displayed in a variety of different formats, along with breakdowns 890 for other appliances, like for example, but not limited to, lighting, washing machines, dryers, etc.

Referring now to FIG. 24 there may be seen a representative figure in a representative GUI format generated by the platform 100 from the analyzed data regarding the energy leakage (or unnecessarily consumed or used energy) for a user's premises 910 and its renewable content and environmental impacts 920, 930 in easy to understand language. The energy leakage consumption calculation of the present disclosure identifies quantities of electricity consumed unintendedly during time periods in which there are no occupants in the given premises (away time) compared to the electricity consumed during times in which premises occupants are not actively using electricity (e.g., sleeping periods, a.k.a. Idle time).

The energy consumption breakdown starts with the identification of the energy consumption base load. As noted in FIGS. 21 and 22, the consumption base load is calculated using at least the historical weather information 840. The weather information used by the system is stored in a weather database 113b for a specific location or area 113a and used in calculations based on, for example, hourly historical weather and temperature data. This weather data is then used to identify the days when the external temperature does not impact the energy usage associated with cooling or heating of a premises 810 using as reference the personal preferences of the user regarding heating and cooling set points for residence temperatures 800. The base load calculation also takes into account the hours of daylight to adjust for the consumption related to lights, in addition to the effects of the weather's daily hourly temperatures 8820.

In more detail, the energy consumption analysis breakdown depicted in FIG. 22, is a hybrid method to determine the electricity consumption by end-use appliances to assist in understanding the contribution of specific appliances usage to the total electricity consumption of a given premises. It may also assist in assessing the performance of such appliances and in identifying replacement savings opportunities.

As noted earlier herein with regard to the discussions of FIGS. 21-22, the analysis starts with an analysis of as much historical energy usage data as is available, but preferably at least 12 months of electricity usage data in, for example, but not limited to an electricity consumption time series using a pre-processing step that, aligns in time and unifies the sampling rate of the electricity consumption time series with the sampling rate of data from any other source. Thus, usage data can come from many different sources and with many different uniform or non-uniform sampling rates. The data may be collected not only by smart meters but any other hardware or databases. Furthermore, it can come from any single source with a non-uniform sampling rate After the usage data sampling rate is pre-processed to a consistent sampling rate, the location and historical outdoor temperature information over the same period for a given premises associated at that location (which may be estimated) 840, and the customer input about the premises characteristics, schedules and preferred space heating and cooling setting preferences 8810, 8820. Further, information is obtained from energy consumption survey 8830.

The method used by the system of the present disclosure may use and integrate or compare three approaches:

a) First, a set of physical methods are used to determine the amount of electricity used for air conditioning, space heating and lighting.

i) The determination of electricity usage related to air conditioning and space heating starts with the base load calculation using as much energy usage data as is available, but preferably at least 12 months of historical electricity consumption data, along with the consumer's preferences for cooling and heating set points, and the outdoor weather information at the user's location. The method determines a base load.

This method is a variation of the well-known "degree days" 810 approach to mitigate the potential effects of unusual or non-uniform electricity consumption patterns and behaviors. The first step is the correlation and aggregation of the energy consumption to account for outdoor temperatures 820, 830. The calculation starts by analyzing the historical hourly weather information (such as outdoor temperature, humidity, UV index, etc.) using as much energy usage data as is available, but preferably during at least the last 12 months (depending on time period for which the historical usage data is available) for the given premise location and identifying the dates in which the mean outdoor temperature is close to the preferred space heating and cooling set points adjusted for internal premises use heat generation and has a standard deviation within a predefined range.

The electricity consumption associated with those "Weather Neutral" dates is then calculated considering that given such outdoor temperature range there should be no electricity consumption associated with indoor space cooling or heating 860. That amount of electricity consumption is established as the given premises electricity base load comprising the use of electricity by all end-use appliances with the exception of electrical space heating or cooling 870, 880.

In addition, the idle energy consumption during the "Weather Neutral" dates is calculated for the premises considering only a range of time when the premises is mostly idle (for example, during sleeping hours). This idle energy consumption is used for the case where the actual energy consumption falls below the base load as determined hereinabove.

The delta between total electricity consumption and the determined base load consumption is assumed to be the electricity usage by electrical space heating and/or cooling.

The flowchart of FIG. 22 illustrates the main steps for the method just described.

ii) The determination of the electricity usage related to lighting uses a hybrid method integrating physical and statistical data and modelling. As illustrated in FIG. 23, the first step consists of gathering the following inputs 9010 regarding a premise: Building (residential, commercial, industrial) size, type of building (commercial, industrial, residential: single family home, apartment, or mobile home), number of building occupants, and the primary type of lights used. The historical database 9020 employed should contain statistical and physical information related to the number of lights per 1,000 sq. ft. for each type of building, the average wattage per type of primary lights, the statistical number of effective hours of lights usage per type of building, the average number of occupants per type and size of building and the type and amount of building occupancy. Second, using statistical information from the historical database 9020 about the number of lights per 1,000 sq. ft. for the given type of building entered, the total number of lights in the given building is calculated. Third, the electricity consumption per hour for all the lights in the building is calculated multiplying the average wattage per type of primary lights used by the total number of lights 9030. Fourth, the statistical number of effective hours of lights usage per type of building is multiplied by the electricity consumption per hour previously calculated 9040. Fifth, an occupancy adjustment "factor" 9050 is calculated based on the number of occupants and the size of the building. Finally, the occupancy adjustment factor is applied to the electricity consumption for lights usage calculated using the previous steps resulting on the electricity consumption related to lights usage in the given premise. Again, FIG. 23 illustrates the steps for the method just described.

Publicly available data sources for this statistical light energy consumption information include but are not limited to the USA Census databases and statistics, the USA Energy Information Administration surveys and statistics.

b) As additional data sets in the database become available, the traditional "degree days" method may be applied to the data on an aggregated basis to mitigate/normalize for unusual or non-uniform electricity consumption patterns and behaviors within individual data sets. Based on this analysis the predefined number of degrees that account for internal building use of heat generation is fine-tuned and may be correlated to particular premises features including, but not limited to, premises age, size, number of occupants, etc.

c) Lastly the physical model for the calculation of the amount of electricity used for air conditioning, space heating, and lighting explained above is coupled with statistical modeling of end-appliance building electricity consumption (this can be done using among others a database of actual historical electricity consumption measurements by end appliance-sub-metering-, disaggregation of high frequency electricity consumption total loads, or public data sources including Information Energy Agency (IEA) end use appliances consumption survey).

Statistical modeling is also used based on an Information Energy Agency (IEA) end-appliance building electricity consumption survey.

This statistical analysis is used as the baseline for determining the percentage of end use electricity consumption by main end-use appliances taking into account the particular premise features such as weather zone, type of building, building size, age, type of appliances existing and used in the given premise, fuel type used by main appliances, and number of occupants, etc.

This statistical analysis also helps to calibrate (double check the reasonableness) the amount of electricity usage calculated using the base load calculation methods described above.

The calculation of the actual consumption breakdown percentages is then adjusted on a monthly basis to account for factors that indicate usage or lack of use or whether related appliances like electrical space heaters and air conditioning are being used, and the variation in the number of hours of daylight throughout the year is used to adjust the percentage of electricity consumption related to lights in the given premises.

Again, FIG. 25 is a representative figure in a representative GUI format generated by the platform 100 from the analyzed data regarding the energy comparisons 1110 and energy consumption 1120. Again, the energy leakage consumption calculation of the present disclosure identifies quantities of electricity consumed unintendedly during time periods in which there are no occupants in the given premises (away time) compared to the electricity consumed during times in which premises occupants are not actively using electricity (e.g., sleeping periods, a.k.a. Idle time).

FIG. 25 is a comparison of user consumption with a reference house, discussed later herein.

FIG. 26 illustrates in a summary manner a portion of the various inputs needed for analysis and outputs that are then supplied by the analytics engine 1210 (110) after analysis of the supplied data. These inputs and outputs have been discussed earlier herein. The inputs are for example, but not limited to reference buildings and breakdown parameters 1222, premises data 1220, temperature data 1212, weather data 1214, utility plan data 1224, customer behaviors 1216, preferences and lifestyle data, meter data 1218, and location data 1208. The outputs are for example, but not limited to utility plan comparisons and recommendations 1272, consumption and trends 1270, leakage (waste) 1268, energy usage breakdown 1266, comparative analysis 1264, deviations 1262, and recommendations 1260.

Thus, it may be seen that the present disclosure provides a system 100 for end-user energy analytics and optimization that is useful for selecting a utility energy supplier, having at least one processor and an associated instruction memory; at least one memory storage device configured to store: (i) historical energy usage data for a premises (facility), (ii) historical weather data for the zone associated with the premises (facility), (iii) data for unique and variable premises energy characteristics, (iv) electricity utility or supplier plan data and associated billing rules, and (v) end-user provided data regarding said premises and plan criteria; an analytics and computation engine executed by said at least one processor using a first portion of instructions stored in said associated instruction memory for performing: (i) conversion of and storing of historical energy usage data for a premises, (ii) statistical analysis of, aggregation of and disaggregation of said historical energy usage data, (iii) statistical analysis of historical weather data associated with historical energy usage data, (iv) machine learning and employing artificial intelligence models to identify data clustering, outliers and other data driven insights and incorporate ongoing feedback to the analysis, (v) time slice synchronization of selected portions of said data stored in said at least one memory storage device, (vi) analyzing said data for energy consumption by one or more energy devices associated with said premises, (vii) computation of energy costs using said converted and stored historical energy usage data, (viii) computation of energy costs for each electricity utility or supplier plan data using said converted and stored historical energy usage data, (ix) calculating rankings of computed electricity utility or supplier plans, (x) providing alternative representations of energy usage data associated with a source of energy for said premises, and (xi) determining/providing recommendations for available energy reduction choices; a display engine executed by said at least one processor using a second portion of instructions stored in said associated instruction memory for: (i) receiving end-user goals, lifestyle behaviors, and premises information and occupation data, (ii) displaying synchronized time slice data in one or more pre-selected formats, (iii) displaying alternative representations of energy usage data associated with a source of energy for said premises, (iv) displaying recommendations for available energy reduction choices, (v) displaying energy consumption for said energy devices associated with said premises, (vi) displaying rankings of computed electricity utility or supplier plans, and (vii) displaying and alerting an end-user of variances in energy use based on one or more of selected set points, excessive usage, and unintentional usage.

Figure 29:
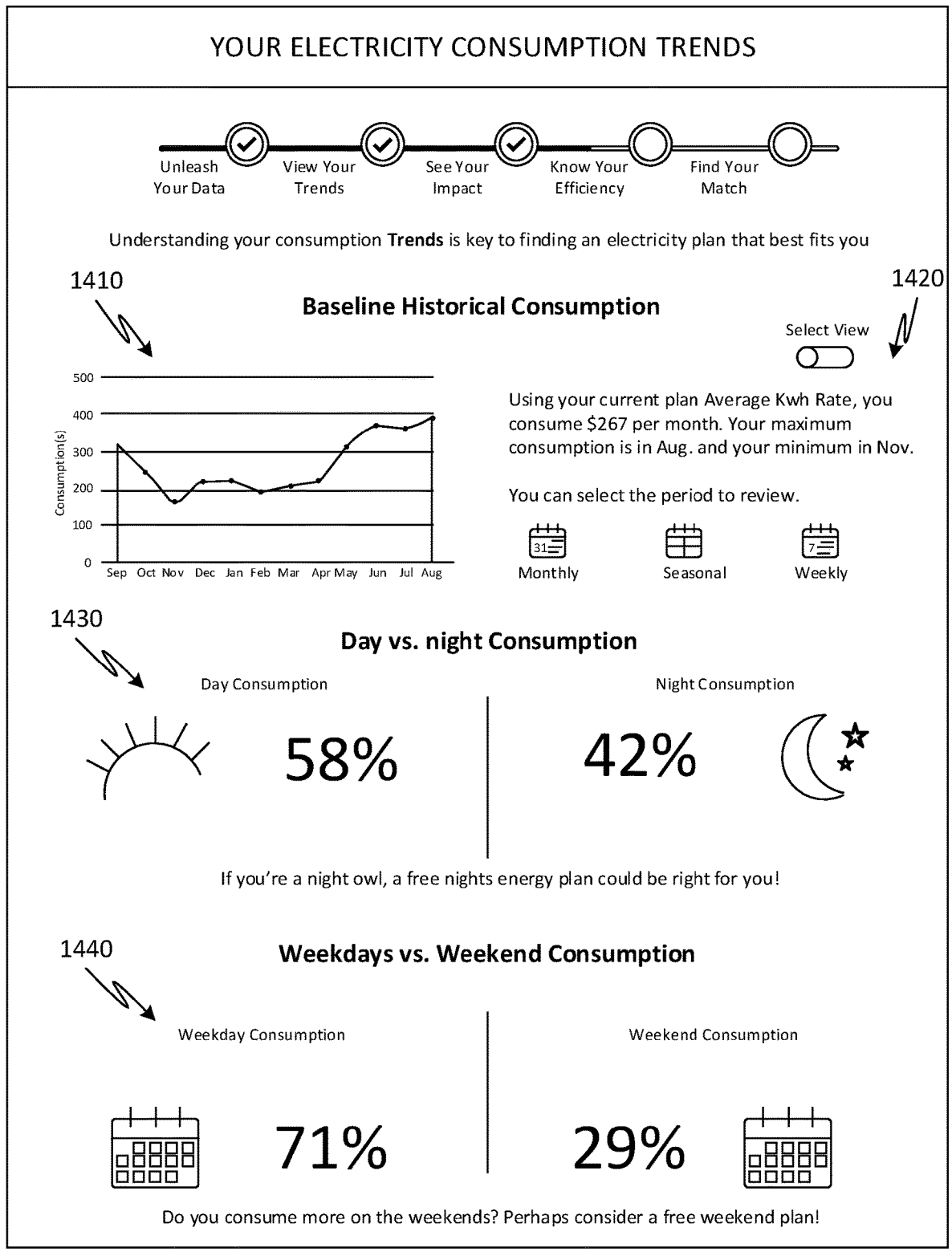
FIG. 29 is representative GUI for system communications with the user regarding a selected portion of results from the system, in accordance with some embodiments.
Figure 31:
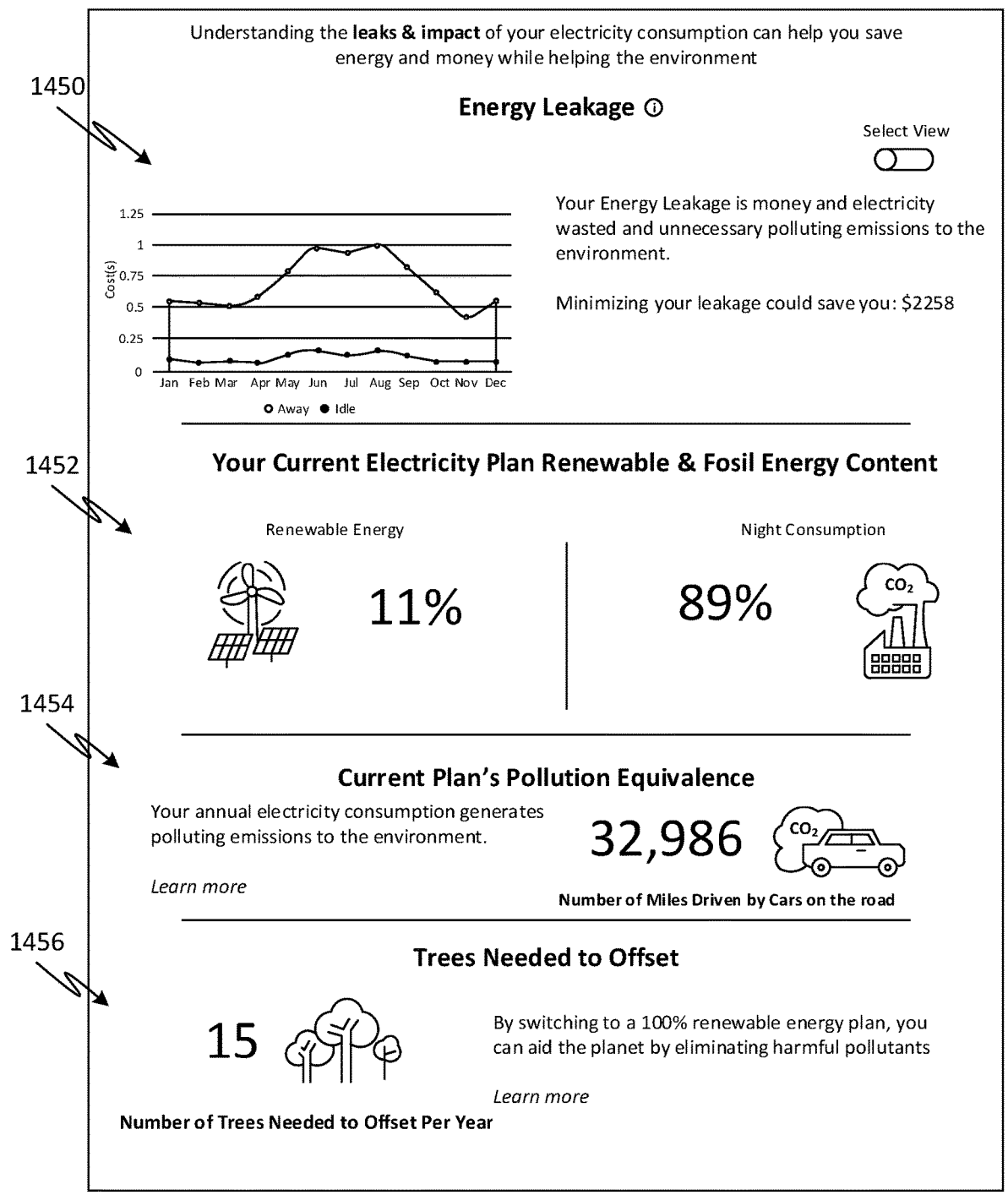
FIG. 31 is representative GUI for system communications with the user regarding a selected portion of results from the system, in accordance with some embodiments.
Figure 32:
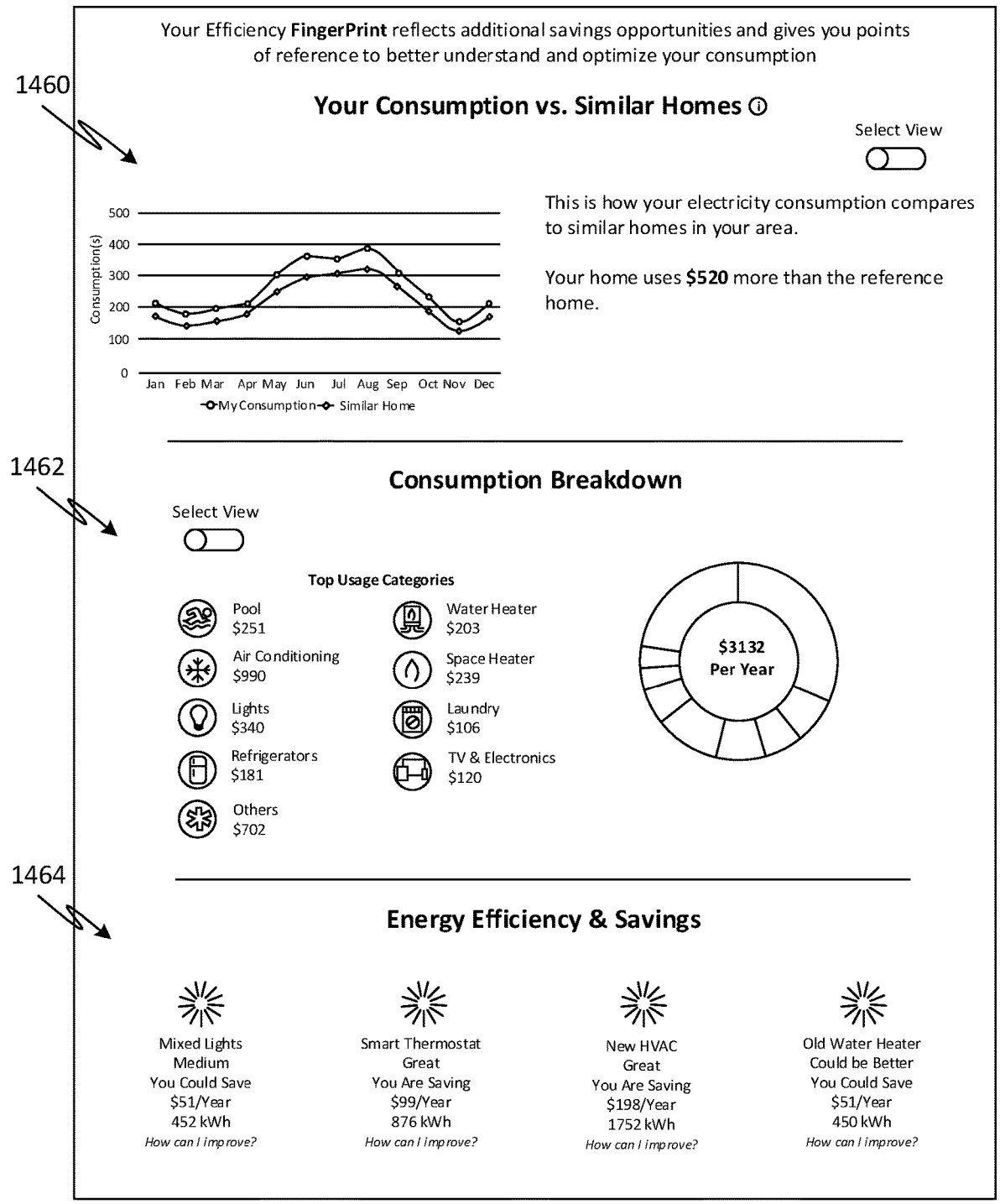
FIG. 32 is representative GUI for system communications with the user regarding a selected portion of results from the system, in accordance with some embodiments.

One representative example of a display of one portion of the results from the system is depicted in FIG. 29. This example is representative of a portion of the results that are collectively referred to as the energy fingerprint of the present disclosure. That is, a unique energy fingerprint for each customer is one that integrates personalized, historical energy consumption data with locational information, building characteristics, lifestyle behaviors, and personal preferences to create a multidimensional model of the time varying energy consumption for a customer's residence. Although many different results may be displayed in a User GUI, FIG. 29 displays consumption trends 1410, 1420 selector of view in electricity consumption units (e.g. kWh) or monetized (e.g. dollars), for a preselected time period (e.g. weekly, seasonal, monthly) 1420, day versus night consumption 1430, and weekend versus weekday consumption 1440. Other results, as illustrated by FIGS. 30-32, may be placed in a GIU at the option of a user. FIG. 30 depicts baseline historical consumption 1405, day versus night consumption 1415, and weekday versus weekend consumption 1425. FIG. 31 depicts energy leakage 1450, renewable content 1452, pollution equivalence 1454, trees need to offset your consumption based on supplier provided data 1456. FIG. 32 depicts consumption comparisons 1460, consumption breakdown 1462, and energy efficiencies and savings 1464. The present disclosure also provides a method for the generation of an environmental impact component as part of the "Energy Fingerprint" with a matching representation of the environment impact with a calculation of possible actions needed to offset the consumer's consumption impact.

FIGS. 27-28 illustrates a simplified method or workflow and the unique calculations and results ascertainable from using the energy fingerprint process flow to also provide for a way for a user to calculate and rank available electric utility or supplier plans using an end-user's selection criteria for choosing a supplier. In summary, the method of the present disclosure creates a web-based platform with a web-based user interface (GUI) for user sign up and sign in and for enabling a user device to interface with that platform and use it to rank and then select the electric utility or supplier plan that best fits historical consumption.

More particularly, the method of the present disclosure starts with a customer interfacing with the system to register and commence a customer consumption portfolio using a distinct visualization dashboard GUI, as previously depicted in FIG. 12. This initial registration enables a user to interface with the system using any user device 1310. For one embodiment, after this initial setup of an account for the customer, again with a user identification and password, and the customer authorizing the use of historical energy data for the customer's premises, then the system will automatically locate the appropriate meter usage data based on the meter number associated with the user's premises 1320. The method then extracts whatever data is available but preferably at least 12 months of historical energy use (for example, but not limited to, smart meter data) from the appropriate meter usage database 1330. Such databases may be maintained by an individual utility, or at a state level or at a regional level by a third party.

Automated Machine Learning (AML) may be used to generate a personalized fitting of electricity consumption for each customer based on weather and other feature parameters determined by an ensemble of machine learning models 1340. AML is the process of automating end-to-end the process of applying machine learning algorithms to real-world problems. In a typical machine learning application, a dataset consisting of input data points is used to train the models. The raw/unfiltered uncleansed data is pre-processed via extraction, selection, imputation, and application of feature set that make the dataset amenable for machine learning. Following those pre-processing steps, an algorithm selection and hyper parameter optimization is performed to maximize the predictive performance of their final machine learning model. Automating the process of applying machine learning end-to-end offers the advantages of producing simpler solutions, faster creation of those solutions, and models that often outperform models that were designed by intuition.

The method of the present disclosure starts by extracting historical energy use (for example, but not limited to, smart meter data) from the appropriate meter usage database. After the time series usage data is downloaded, then the system performs multiple iterations on preloaded algorithms and optimizes the number and selection of hyper parameters. Optimization maximizes the predictive performance and can help minimize computational expense. The parameters evaluated in this process can include but are not limited to historical variations in weather factors (for example Outdoor temperature, humidity, UV index, cloudiness, etc.), premises occupancy, occupants' lifestyles and preferences including premises schedules/utilization, and appliances set points (including thermostats, water heaters, lights schedule and intensity, etc.), and premises features (for example size, thermal and insulation properties, appliances, etc.).

Once the number and optimum parameters are identified, the system runs the preloaded machine learning algorithms (including but not limited to Rain Forest, KNN, etc. than can be obtained from any standard Python Library) generating the personalized model that best describes the electricity consumption as a function of the features selected. Normally this process is run using at least 12 months of historical electricity consumption to train and test the model to account for changes related to seasonality. When there are not 12 months of historical electricity consumption available, the process utilizes the data available to generate a model that will have the lowest degree of uncertainty and potentially highest prediction accuracy. To account for this increased uncertainty and potentially greater variations, the mean and standard deviation for the model generated with the known data are calculated and used to project "an acceptable working envelope/boundary" for the values generated by the predictive model.

The resulting personalize model 1340 has many uses including but not limited to the projection of the annual baseline electricity consumption FIG. 33, but especially when only partial or incomplete information is available. As time goes by and additional electricity consumption data becomes available, the model is recalibrated replacing the projected given data with the newly available actual data. As the process continues, the model uncertainty decreases progressively over time, and the prediction accuracy increases. Another use of this personalized model includes the forecast of energy consumption to evaluate actual consumption values and perform prescriptive and diagnostics analytics to determine if actual usage falls within an "expected" range within x number of standard deviations (sigma) or if an alarm or further evaluation needs to be triggered After the usage data is downloaded then the system performs disaggregation and aggregation on this data and the data is also converted into a unique and specific database format and stored by the system. The method next uses this disaggregated and aggregated data in specific combinations and summaries to generate personalized energy consumption trends 1340. Examples of these types of trends were previously depicted in FIGS. 13-17.

The method also solicits from the selected customer behavioral inputs 1350 that are unique to their household, such as for example, but not limited to time schedules, number of occupants, interior temperature set points for heating and cooling, current electricity provider and plan, number of occupants and activities within the household, and usage of electrical appliances and devices, etc. FIG. 10 is one representative example of a GUI for obtaining this information from a customer.

Following this, the method may next generates personalized energy consumption 1360 based on customer behavioral inputs above that leads to additional analysis and results in personalized energy consumption such as for example, but not limited to a unique consumer calculation characteristic coined "energy leakage" representing inadvertently used electricity during periods in which the customer is not present, a determination of a unique energy consumer environmental impact fingerprint, a representation of the consumer's environmental impact through a simple determination of the number of trees saved or needed to offset the CEI (consumer environmental impact).

Following this, the method may next solicit from the customer additional inputs 1370 related to the household's attributes such as for example, but not limited to size and age, installed appliances, current provider and electricity plan, etc. FIG. 11 is one representative example of a GUI for obtaining this information from a customer.

Following this additional data input, the method may next generate personalized and customizable actionable information 1380 such as, for example, but not limited to visualization of time-series usage data for comparison against localized and regional locations (benchmarking), unique energy usage breakdown by appliances (interior and exterior), unique energy efficiency indicators for cost savings, energy reduction, and consequently the environmental impact savings by the consumer. This information may then be used to calculate and rank available electric utility or supplier plans 13010 using an end-user's selection criteria 1390b for choosing a supplier.

FIGS. 27-28 is a simplified block diagram for the main steps for a method of the present disclosure that may be implemented by the components of the system of FIG. 6 for choosing an available electric utility or supplier. As depicted in FIGS. 27-28, the present disclosure also provides a method 1300 for generating personalized energy analytics to rank and then select the electric utility or supplier plan that best fits historical consumption, consisting of the integration of at least 12 months of historical electricity consumption in a data series (for example sampled at 15 minutes intervals) for a given premises (residential, commercial or industrial), with behavioral aspects, lifestyle behaviors and preferences including schedules, number of occupants, preferred heating and cooling settings, locational, and weather related information to create a personalized multidimensional overlay to more accurately model the unique energy consumption in such given premises and its dependency with variations over time in lifestyle, behaviors, preferences and premise features and appliances.

The method of the present disclosure creates and uses a multidimensional model that includes the integration of multiple functions related to or detailing or dealing with energy consumption, all with variations over or in time, but aligned with each other along common time slices. The components of the energy analytics, as depicted in FIG. 7, may include, but are not limited to:

Electricity consumption over time (and energy generation using solar panels, batteries, etc.) 210

Lifestyle behaviors over time (schedules, number of occupants, etc.) 218 Preference variations over time (heating and cooling set points, hot water heater set point, cost reductions, windows, insulation, etc.) 218

Building/premises feature efficiency over time (new A/C unit, new lights, aging appliances, maintenance, etc.) 218

Electric Utility and Supplier plan data including billing rules and termination charges 218

Location specific variations over time (outdoor temperatures, weather, etc.) 218

The personalized analytics in the so-called "energy fingerprint" 1390a for a user provides a comprehensive model intended to provide actionable insights to help end-use energy consumers understand their energy consumption, identify saving opportunities and make smarter energy delivery and consumption choices. It includes quantified energy consumption and savings in terms of kWh, equivalent cost and environmental impact, and the model may be used to calculate and rank available electric utility or supplier plans using an end-user's selection criteria for choosing a supplier.

The components of these personalized energy analytics may include, but are not limited to the following KPIs:

Historical energy consumption trends 230a (140) that vary over time organized and aggregated by:
Monthly, seasonal & weekly Consumption
Breakdown of Day vs Night consumption
Breakdown of Week Vs Weekend consumption
Grid On-peak versus Off-peak consumption Energy leakage 230*b* (142) defined as unintendedly consumed electricity during time periods in which there are no occupants in the given premises (away) for a base-load compared to the electricity consumed during times in which premises occupants are not actively using electricity (e.g., sleeping periods, a.k.a. Idle time)

Quantification of polluting emissions to the environment (e.g., carbon dioxide, sulfur dioxide, nitrogen oxides, methane, etc.) as a result of electricity consumption given the renewable content provided in the currently utilized electricity plan User friendly visualization and contextualization of the environmental implications of the emissions in everyday life terms to facilitate user understanding. For example: Greenhouse effect, Particles in the atmosphere, Equivalence in vehicle driving miles, Equivalence of the number of trees required to be planted to offset such environmental footprint if a switch to a 100% renewable plan is unsuitable Benchmarking of electricity consumption 230*d* (146) based on integrated multivariable time series data sets for comparable premises for a uniform sampling rate (for example, but not limited to being sampled at 15-minute intervals and stored in a memory, being measured and stored in real time, or being sampled in near real time). Comparing electricity consumption of the given premises compared to the electricity consumption of reference premises using the same sampling rate, and with equivalent characteristics such as, for example, but not limited to the same weather for an area of interest, similar building size, age, fuel type used by main appliances, and number of occupants.

Total energy consumption 230*c* (144) breakdown by main end-use appliances in a premises.

Energy Efficiency (148?) indicators based on features such as, for example, but not limited to the type of light bulbs used, age of appliances, use of smart learning thermostats, use of smart or IoT appliances or devices, etc. Thus, it may be seen that the method of the present disclosure provides a user with, for example, but not limited to the following key performance indictor (KPI) information:
Consumption Statistics
Monthly Consumption
Day vs Night consumption
Week vs Weekend consumption
Seasonal Consumption
Carbon Footprint of current plan and possible actions to offset it
Energy Leakage
Idle vs Away consumption comparison
Idle vs Away Seasonal Indexes
Efficiency Factor
Efficiency indicators including but not limited to:
  LED lights usage
  Age of appliances
  Heating and Cooling Temperature Vs National Average Cooling set points
  Use of smart learning thermostats
Comparative Premises Energy Consumption analysis
Monthly consumption vs reference building consumption
Consumption Breakdown by end-use appliance At 13010, the method 1300 may include performing electricity bill projection calculation for all available plans+ scoring and ranking versus customer selection criteria preferences Matching Score. Further, at 13020, the method 1300 may include displaying Electricity plan matches. Further, at 13030, the method 1300 may include performing Customer plan selection & ordering. Further, at 13040, the method 1300 may include performing energy Dashboard Summarizing Cost & Energy projected savings potential & environmental footprint reduction potential. Further, at 13050, the method 1300 may include performing Continuous monitoring of actual energy consumption versus projections. Further, at 13060, the method 1300 may include performing Tracking versus initial base line with descriptive analytics to explain deviations.

The foregoing method is used to calculate the energy fingerprint for a given building or residence. FIGS. 29-31 provide representative examples of the types of results that are available from the system and methods of the present disclosure after an energy fingerprint has been determined. Once determined the results of the method (energy fingerprint) may then be used to calculate and rank available electric utility or supplier plans using an end-user's selection criteria for choosing a supplier. The goal is to best match the building or residence consumption with a plan that best matches that consumption and usage. This involves obtaining at least plan details with supporting billing rules and any termination charges for all available plans for all available utilities or suppliers. In general, this involves using the plan information to calculate bills for all the available plans using the historical consumption, as modeled by the energy fingerprint model, and as weighted by the end-user's selected criteria. This process is termed matching and scoring the plans and then making recommendations using the end-user's selected criteria. In more detail, those steps are as follows:

1. The electricity plans details 170 (e.g., the Electricity Plan Label details, rates, billing, fees, discounts, billing and rating rules) are loaded into the system grouped in a hierarchical structured database illustrated in FIG. 35. Moreover, FIG. 35 illustrates a portion of the database architecture for storing and calculating and ranking the various available plans. Major components have been previously identified by an item number from a prior figure. Referring now to FIG. 35, there may be seen the calculation engine 110 that receives customer information, including intermediary results like fingerprint, as well as customer plan information 116. The plan data in data base 170 is provided to the utility data and the plan details 180. Each plan is uniquely identified with an ID. The information for comparison buildings 160, as discussed later herein, is also include as part of the data base. Other items are also included as part of the data base as depicted in FIG. 35.

2. The historical electricity consumption information for the said premise 114 is retrieved from data repository 1151 (e.g., cloud, server, data lake). Historical electricity consumption trends and environmental impact are computed, visualized and displayed as components of the energy fingerprint through a GUI for a user.

3. The customer provides input regarding the degree of importance of multiple ranking criteria in the selection of an electricity plan (such for example, but not limited to cost 2010, environmental footprint 2020, provider rating by customers 2030, billing variability, risk, etc.). FIG. 34 illustrates one representative example of a User Interface (UI} for inputting a customer's selection of criteria and importance, as well as expiration date of existing plan 2040.

4. The calculation engine (or analytics engine 110) calculates billing projections for all plans using the billing and rating rules stored in the plan database 170. The calculation engine uses a common partitioning and aggregation processes to apply the particular rating and billing characteristics of each plan to the customers' historical electricity time series usage data. The electricity cost projection calculations for all plans are performed in parallel, taking advantage of the work distribution capabilities of the architecture. The calculation engine follows the steps illustrated in FIG. 36. Major components have been previously identified by an item number from a prior figure. FIG. 36 depicts in more detail portions of the calculations illustrated in FIGS. 7-8. Moreover, FIG. 36 depicts that the historical usage data is disaggregated and re-aggregated into the time periods (or "cycle" categories) needed to match up with rate plan categories 170 for the calculations of a bill for each plan. User criteria are employed as part of the calculations associated with ranking.

5. The matching billing projections ("scores") are calculated for each plan available in the database as weighted scores based on each given's plan total cost projections and the match between each plan's details (e.g., renewable energy content, provider customer satisfaction rating, etc.) and the preferences entered by the customer as selection criteria.

6. The plans available in the database are ranked and sorted based on matching scores A given number (e.g., 3, 6, 10, etc., that is selected by the user) of recommended plans is displayed showing the top rankings based on matching scores. FIGS. 37-39 and FIG. 40 each depict a GUI illustrating these types of displays. FIGS. 37-39 are representative example GUI displays of three top matches by displaying a comparison of the various plan elements. FIG. 40 is a representative example GUI display of six plan recommendations ranked by matching scores and page elements (matching criteria, filters, sorting capability).

7. The user interface depicted in FIG. 42 provides the customer the ability to modify the inputs for the matching criteria to recalculate the matching scores until satisfied. FIG. 41 depicts some details for a given recommended plan including matching score and highlights.

The GUI (graphical User Interface) for the system 100 includes:
  Display of the matching score for each plan based on consumer preferences
  Interface to adjust selection criteria and recalculate matching scores/re-rank plan recommendations
  Interface to filter plans by multiple criteria (e.g., provider, type of rate, contract duration, renewable energy content, etc.)
  Side by side comparison of top plan recommendations identified based on matching scores
  Graphical comparison of the current and recommended plan projected costs based on baseline historical consumption
  Comparison of environmental impact of the current and recommended plan based on baseline historical consumption and the renewable energy content of each plan
  Display of a preselected number of top plan recommendations displaying their respective matching scores which is calculated based on the customer's selection criteria
  Interactive interface that allows customers to adjust selection criteria and recalculate matches until satisfied
  Graphical display of historical electricity and cost projections consumption and the cost comparisons
  Display of cost and consumption projection values by hovering over curves
  Display of quantified cost and environmental impact for each plan compared A brief summary of energy matchmaker method steps is provided:

1. The electricity plans information (e.g., the electricity plan label details, rates, billing, fees, discounts, billing and rating rules) are loaded into the database (e.g., system grouped in a hierarchical structure, non-structure data, depicted in FIG. 35).

2. The historical electricity consumption information for the said premise is retrieved from data repository (e.g., cloud, server, data lake)

3. The matchmaker method uses the results of the uniquely personalized intermediate energy assessment (called energy fingerprint) which allows the calculation, visualization and display of
  the premises' historical electricity consumption trends
  the environmental impact of the current electricity consumption given the current electricity plan as well as the actions required to offset such impact
  the Energy Leakage savings and
  the Energy Efficiency saving 4. User inputs to the plan matching preference criteria 5. The electricity cost for each electricity plan in the database is projected using the actual historical electricity consumption time series data as the consumption reference for the given premise, and all the billing and rating rules for each given plan.

6. The electricity cost for the current electricity cost used in the said premise is calculated using the actual historical electricity consumption time series data for the given premise, and all the billing and rating rules for the given plan. The current and project electricity costs are comparisons are displayed in multiple formats (e.g., numerical, graphical cost projections, minimum bill, maximum bill, average bill, annualized cost) to facility the customer evaluation of the options available 7. Based on the current plan expiration date and the customer input regarding the reason for changing plans (e.g., moving to a new premise or changing plans for the same premise), the applicability of early contract termination fees is determined and taken into account along with current and new plan rebates and fees to calculate the overall net savings between the current plan and each one of the plans in the database.

8. The present disclosure directly links customer historical usage, preferences, and concern for their environmental impact based on their decisions as it relates to energy consumption (e.g., carbon burn, CO2 impact, and energy sustainability). User friendly visualization and contextualization of the environmental implications of the emissions in every-day life terms to facilitate user understanding. The carbon footprint for the current plan and each one of the plans in the database is calculated using the actual historical electricity consumption time series data for the given premise, and all the renewable energy content information of the plans stored in the database. The carbon footprint of the current and other plans in the database is compared and used to calculate the delta in carbon footprint.

9. The matching scores for each plan in the database is calculated based on the match between the plan costs and details and the customer's preference criteria).
10. All plans available in the database are ranked based on matching scores and energy plans (ranked) are displayed via a GUI (graphical user interface). FIGS. 37-46 illustrate different representative example GUI representations of plan matches and multiple different comparisons and representations of individual plan components. More particularly, each figure is noted herein below.

FIGS. 37-39 are representative example GUI displays of top matches by displaying a comparison of the various plan elements.

FIG. 40 is a representative example GUI display of plan commendations ranked by matching scores and page elements (matching criteria, filters, sorting capability).

FIG. 41 is a representative example GUI display showing matching score and highlights for a given recommended plan.

FIG. 42 is a representative example GUI showing interactive interface that allows customers to adjust selection criteria and recalculate matching scores.

FIG. 43 is a representative example GUI display of historical electricity and cost projections consumption and the cost comparisons.

FIG. 44 is a representative example GUI display of cost and consumption projection values by hovering over curves.

FIG. 45 is a representative example GUI display of quantified cost and environmental impact for each plan compared.

FIG. 46 is a representative example GUI display of an Order Summary Dashboard including new retailer and plan selected details, comparison or previous and new plan cost, and projected energy, monetary and environmental savings.

FIG. 47 is a representative example GUI display of behavioral reinforcement elements including promo codes to participate in drawings and contests with prizes for achieving energy and environmental savings goals with integration with social media platforms (e.g., Facebook, Twitter, Instagram, LinkedIn, WhatsApp) to share progress and invite friends to join. A user may adjust the matching criteria and filters to recalculate matching scores and the top plans displayed. While the matching score and the filters are applied in a fully unbiased data driven approach, the energy matchmaker (through the intermediary energy fingerprint and current vs. new plans comparisons) provides informational and contextual information that can be used by the user in the making a better-informed selection of the new electricity plan for the given premise that more closely satisfy the customers goals and objectives. Different figures are available to help in the selection process as noted in the following figures. FIG. 43 is a representative example GUI display of historical electricity and cost projections consumption and the cost comparisons. FIG. 44 is a representative example GUI display of cost and consumption projection values by hovering over curves. FIG. 45 is a representative example GUI display of quantified cost and environmental impact for each plan compared.

11. User proceeds to select and order the new electricity plan service. FIG. 46 depicts a summary dashboard for the new plan, including supplier, plan details comparison or old and new plans and projections.
12. The order and start of new service date is used to calculate the remaining duration in the user's new electricity plans contract. This is used to trigger contract expiration and time-to-switch reminders.
13. The energy matchmaker workflow concludes with the generation of a personalized energy dashboard storing and displaying the descriptive analytics in the energy fingerprint and a summary of the multiple savings projections uncovered by the combined energy fingerprint and plan matchmaking process, as depicted in FIG. 46. The multiple savings opportunities identified by the end-to-end energy matchmaker method include, as one example, but not limited to:

Savings based on energy efficiency features existing in the given premise (e.g., type of lights used, age of appliances, use of smart thermostats)

Identification and quantification of the amount of energy leakage/wasted (electricity inadvertently used during idle and away periods)

The selection of the most cost-efficient energy plan available to electrical and gas end consumers through a set of preference criteria and calculation engine, that results in the matching of the most cost-efficient electricity plan based on the analysis of the consumer's historical energy usage time series data (e.g., historical data).

14. The user account provides continuous access to the new plan details information, and to the personalized customer's energy dashboard.

Thus, it may be seen that the present disclosure provides a method for energy analytics and optimization for an end-user selecting a supplier, that includes, storing in at least one memory storage device, at least one or more of the following: historical energy usage data for a premises (facility), historical weather data for the area (zone) associated with said premises (facility), data for unique and variable premises energy characteristics, data regarding selected energy goals for said premises, end-user provided data regarding said premises, and utility energy supplier providers for the area associated with said premises and associated energy plans and billing rules data for each provider, using at least one processor having instructions stored in at least one instruction memory, wherein said at least one processor is configured to implement an analytics and computation engine using a first portion of instructions stored in said associated instruction memory for performing at least one or more of the following:

receiving and performing statistical analysis of, aggregation of and disaggregation of said historical energy usage data, statistically analyzing historical weather data associated with historical energy usage data, using machine learning and employing artificial intelligence models to identify data clustering, outliers and other data driven insights and incorporate ongoing feedback to the analysis of said historical energy usage data, converting and storing said historical energy usage data and computing energy costs based thereon, synchronizing selected portions of said data stored in said at least one memory storage device using common time slice information, analyzing said data for energy consumption by one or more energy devices associated with said premises, determining/providing recommendations for available energy reduction choices, computing energy costs for plans from available utility energy supply providers using said converted and stored historical energy usage data, providing alternative representations of energy usage data associated with a source of energy for said premises, ranking available utility energy supply providers, and using said at least one processor to execute a display engine using a second portion of instructions stored in said associated instruction memory for displaying and performing one or more of the following receiving end-user goals, criteria for energy consumption plans and premises occupation data, displaying synchronized time slice data in one or more pre-selected formats, displaying alternative representations of energy usage data associated with a source of energy for said premises, displaying in ranked order available utility energy supply providers based on user criteria, displaying recommendations for available energy reduction choices, displaying historical energy consumption for said energy devices associated with said premises, displaying and alerting an end user of variances in energy use based on one or more of selected set points, excessive usage, and unintentional usage.

Once a consumer has a multidimensional energy model (energy fingerprint), that model may be employed to benchmark the electricity consumption along with the multiple variables impacting electricity consumption of a consumer premises with the electricity consumption and variables impacting electricity consumption in comparable premises (i.e., residential, commercial, industrial) in the same area, all based on integrated multivariable time series data sets.

Estimation of electricity consumption for a new premise has been based on physical features including size, year built, type of dwelling, etc. and the projected use of energy consumption values. Traditionally, comparison of electricity consumption between premises has been based on physical features and the actual use of average energy consumption values on a monthly, seasonal, or annual basis. While this approach offers a quick approximation, it fails to incorporate multiple factors that impact energy consumption including the occupants' behaviors, preferences, lifestyles, goals and objectives, as well as changes over time in the premises features and appliances set points and operating schedules.

Modeling of electricity consumption for a building has traditionally rested in comprehensive and complex physics-based models which are useful during the design and construction phases. However, during the operational life of the building, the occupants often don't have access to the original energy consumption models that can be used as a reference for determining if energy consumption is within "normal" or "expected" levels, or to flag alerts for adjustments (i.e., adjustment in schedules and set points, maintenance and repairs).

On the other hand, the method of the present disclosure, provides a benchmarking of energy consumption between comparable premises based on each of the given premises Energy Fingerprint model; Energy Fingerprint integrates these multiple variables impacting electricity consumption and their changes over time, whether uniform or non-uniform time series (e.g., 15 minutes intervals) and provides a more precise point of reference to provide insights about consumption patterns, to determine energy optimization opportunities, and to forecast future energy consumption.

This method of the present disclosure comprises benchmarking of time series electricity consumption data and physical and behavioral variables impacting electricity consumption for a given premises (where the time series sampling may be for example, but not limited to, seasonal, 15 minutes 1 minute, 30 second interval) and its occupants with the electricity consumption of reference buildings with equivalent characteristics including but not limited to weather zone, building size, age, fuel type used by main appliances, number of occupants, appliances, schedules.

The method is supported by a database (i.e., library) of each premises Energy Fingerprint (e.g., residential, commercial, industrial) containing their multidimensional modeling comprised of the integration of multiple functions variating over time.

Electricity consumption variations over time

Lifestyle Behaviors variations over time (i.e., schedules, occupants)

Preferences variations over time (i.e., space cooling and heating set points, water heating temperature, cost reduction, environmental footprint reduction, etc.)

Building features efficiency variations over time (i.e., new A/C, new led lights, aging appliance, broken air sealing barriers, maintenance, etc.)

Location specific outdoor temperature variations over time

The method queries for inputs from user or from a data source related to the multiple dimensions listed in the previous paragraph. Based on the inputs, the best matching fingerprint (reference premise) is selected from the system database and used to calculate a set of analytics (e.g., descriptive, prescriptive) comparing the given premises actual energy consumption versus the reference premises consumption. FIG. 25 illustrates a representative GUI depicting the results from such a comparison. The actual comparison of consumption is depicted over a period of a year 1110, but other periods may be selected by a user. A breakdown of consumption is also provided for the year 1120, as is the efficiency and savings comparison 1130.

Aspects of the present disclosure are listed below:

Aspect 1. An energy analytics and optimization control system for use by an end-user for selection of a utility supplier, comprising:

a processor, a first memory for storing programming instructions for the processor, wherein a first set of programming instructions when executed by the processor cause the processor to receive, convert and store in a single common interoperable data format preselected data from multiple sources regarding a plurality of customer premises, and wherein a second set of programming instructions when executed by the processor cause the processor to partition historical data, aggregate, compare and analyze said data using at least common time period and time slice information for each premises of the plurality of premises, calculate a matching score using cost, risk factors, environmental footprint, and customer satisfaction ratings for each utility supplier plan using historical usage data, and recommend a utility supplier plan that best fits the historical usage and user supplied criteria, a second memory for separately storing the preselected data from multiple sources that comprises historical energy usage data for preselected locations for the premises, historical weather data for preselected locations, descriptive information and characteristics data for a plurality of customer premises at the preselected locations, user preference, behavioral and schedule data for respective premises in the plurality of customer premises, utility supplier plans and supporting billing rules for preselected locations, and user criteria preferences regarding plan selection, and a user interface for at least displaying results in a plurality of preselected formats from said processor processing said preselected data and analysis of the preselected data stored in said memories and from comparisons and combinations of those sets of data in common time periods, wherein the results comprise at least one of the following:

comparisons of actual and historical energy usage in the same time period during different times, comparisons of energy usage in adjacent time periods, alternative representations of energy consumption for a preselected time period, energy consumption for preselected energy consumption devices for a preselected time period, determination of unintended energy consumption, efficiency of energy consumption, comparisons of energy usage for similar reference premises at the preselected locations for preselected time periods, recommendations for reduction in energy consumption, recommendations for adjustment in preference and schedule data for a user to control and reduce energy consumption and environmental impact, scoring and ranking of utility suppliers based on at least user criteria, and calculation of costs for each plan using historical usage data and displaying a utility supplier plan that best fits the historical usage and user supplier criteria for selection by a user.

Aspect 2. A computer implemented method for selecting a utility plan for a consumer building, comprising:

Using a web-based application GUI to create a user account for a computer implemented system for monitoring and analyzing energy usage, Entering building and meter data, and agree to downloading usage data from data storage website, Downloading historical usage data using said system, Downloading energy usage plans for utilities in an area containing the building, Calculating energy bills and environmental footprint for building based on downloaded historical usage data for each selected downloaded plan using said system, Applying customer selected weighting criteria to results of calculations for selected downloaded plans, Scoring and ranking plans based on results of weighting calculations for selected downloaded plans and comparing to current plan including any termination charges and fees associated with current plan, and Selecting desired plan from said scored and ranked plans by a customer.

Aspect 3. The method of aspect 2, further comprising, applying a weighting factor to each selection criteria parameter.

Aspect 4. The method of aspect 3, further comprising, calculating a matching score functionally related to each plan and customer supplied criteria.

Aspect 5. The method of aspect 4, further comprising, advising energy utility of desired new plan by customer.

Aspect 6. The method of aspect, further comprising, switching customer to new plan by energy utility.

Aspect 7. The method of aspect 6, further comprising, monitoring actual energy usage for comparison against calculated estimates for new plan.

Aspect 8. The method of aspect 7, further comprising, displaying behavioral reinforcement of customer savings on new plan and progress, and posting behavioral reinforcement on digital social networks.

Aspect 9. The method of aspect 8, further comprising, displaying behavioral reinforcement using competitions, drawings and prizes.

Aspect 10. A computer implemented method for selecting a utility plan for a consumer building, comprising:

Retrieving utility plan data for the service area of said consumer building,

Organizing said retrieved plan data into a data base format suitable for calculating costs based on usage, Retrieving at least historical building usage data and the current plan on which it is based, Calculating a plurality of months of estimated building usage data for each plan in said data base using at least a portion of said historical building usage data as a basis for said calculating, Using customer preselected weighting criteria to create a score and rank said estimated building usage data for each plan in said data base, Comparing said ranked future building usage data for each of said plans to future building usage data for said current plan, Selecting a new plan based on a comparison of said scored and ranked plans and said current plan, Enrolling in that selected new plan, and Monitoring building usage data for said selected new plan based on said estimated future building usage data for said new plan.

Aspect 11. The method of aspect 10, further comprising, customizing building usage data by adding additional building data.

Aspect 12. The method of aspect 11, further comprising, customizing building usage data by adding additional behavioral data for occupants, including at least one of the following, schedules, preferences, and set points.

Aspect 13. The method of aspect 12, further comprising, benchmarking the actual building time series usage data to time series usage data for at least one selected reference building model based on said customized building usage data.

Aspect 14. A computer implemented system using energy analytics and optimizations for end-user selection of an energy supplier, comprising: at least one processor and an associated instruction memory, at least one memory storage device configured to store,
   (i) historical energy usage data for a premises (facility),
   (ii) historical weather data for the zone associated with the premises (facility),
   (iii) data for unique and variable premises energy characteristics,
   (iv) data regarding selected energy goals for said premises,
   (v) end-user provided behavioral data and data regarding said premises,
   (vi) utility energy supply providers for area associated with said premises and associated energy plans and billing rules data for each provider,
   (vii) end-user provided data regarding energy plan selection criteria, an analytics and computation engine executed by said at least one processor using a first portion of instructions stored in said associated instruction memory for performing.
   (i) statistical analysis of, aggregation of and disaggregation of said historical energy usage data,
   (ii) statistical analysis of historical weather data associated with historical energy usage data,
   (iii) machine learning and employing artificial intelligence models to identify data clustering, outliers and other data driven characteristics and incorporating feedback into selected portions of some of the analysis,
   (iv) conversion of and storage of said historical energy usage data,
   (v) time slice synchronization of selected portions of said data stored in said at least one memory storage device, (vi) analyzing said usage data for energy consumption by one or more energy devices associated with said premises,
(vii) computation of energy costs using said converted and stored historical energy usage data,
(viii) providing alternative representations of energy usage data associated with a source of energy for said premises,
(ix) computation of energy costs for each plan for each utility energy supplier using said converted and stored historical energy usage data,
(x) scoring and ranking available utility energy supply providers using at least their plan costs and user selection criteria for one or more supplier,
(xi) determining and providing recommendations for available energy reduction choices,
 a display engine executed by said at least one processor using a second portion of instructions stored in said associated instruction memory for
  (i) receiving end-user goals, criteria for energy supply providers plans and premises occupation and behavioral data,
  (ii) displaying synchronized time slice data in one or more pre-selected formats,
(xii) displaying alternative representations of energy usage data associated with a source of energy for said premises,
(xiii) displaying in ranked order available energy supply providers based on at least user criteria and associated plan bill calculations,
  (iii) displaying recommendations for available energy reduction choices,
  (iv) displaying energy consumption for said energy devices associated with said premises,
  (v) displaying and alerting an end-user of variances in energy use based on unintentional usage, one or more of selected set points, and excessive usage.

Aspect 15. A system for end-user energy analytics and optimization for selecting a supplier, comprising:
 at least one processor and an associated instruction memory containing programming for energy analysis logic for execution by said at least one processor, wherein said energy analysis logic generates a multidimensional model comprised of the storage, analysis, integration and time alignment of historical electricity consumption for a premises, user lifestyle behavior variations for a premises, user preference variations for a premises, building efficiency variations for a premises, weather variations at a specific location where the premises is located, and outdoor temperature variations at that specific location, utility supplier plans and supporting billing rules for area including the specific location, and user criteria preferences regarding plan selection,
 at least one memory storage device configured to store, at least said multidimensional model, intermediary calculations, analysis and comparisons and data for an end-user premises, historical weather and temperatures for said premises location, historical energy usage, end-user preferences, end-user lifestyle and behavioral information and schedules, and
 a graphical user interface for selectively displaying representations of portions of said multidimensional model to a user in user selected formats for recommendations for adjustment in preference and schedule data for a user to reduce energy usage and environmental impact, and scoring and ranking of utility suppliers based on at least user criteria and calculation of costs for each plan using historical usage data, and recommending a utility supplier plan that best fits the historical usage and user criteria.

Aspect 16. A system for end-user energy analytics and optimization for selecting a supplier for a user premises, comprising:
 at least one processor and an associated instruction memory, for storing, using and analyzing data from
 a database configured to store historical weather and temperatures,
 a database configured to store historical energy usage,
 a database configured to store location data,
 a database configured to store utility supplier plan data, a database configured to store end-user lifestyle preferences,
 a database configured to store end-user lifestyle information and schedules,
 a database configured to store end-user utility supplier criteria, and
 a database configured to store end-user premises information, to perform analysis of said data from said databases to construct a multidimensional energy model representative of said analysis of said data in said databases for the user premises using at least time slice information for said data, and
 a graphical user interface for selectively displaying representations of portions of said multidimensional model to a user in user selected formats for recommendations for adjustment in preference and schedule data for a user to reduce energy usage and environmental impact, and for displaying rankings of available scored utility suppliers adjusted based on at least end-user criteria.

Aspect 17. An energy analysis system for selecting a supplier, comprising: a processor, a communication interface coupled to the processor, and a memory coupled to the processor, wherein the memory contains energy analysis logic that is executed by the processor to create an energy analysis system, wherein said energy analysis system communicates to obtain energy usage data, other dynamic data related to energy usage by a user premises, utility supplier data, end-user utility supplier criteria, and dynamic user information related to the user's consumption of energy at a premises, in order to produce personalized analysis results as a multidimensional energy model representative of said analysis of said data for the premises and scoring and ranking of utility suppliers, and generate and display on a user interface selective portions of the analysis results in a format selected by the user, and wherein said results of the analysis may be ranked for further review and action by the user, using a graphical user interface for selectively displaying representations of portions of said multidimensional model to a user in user selected formats for recommendations for adjustment in preference and schedule data for a user to reduce energy usage and environmental impact, scoring and ranking of utility suppliers based on at least the end-user utility supplier criteria, and recommending and selecting a utility supplier plan that best fits the historical usage.

Aspect 18. A computer implemented energy analytics and optimization control system 100 for selecting a utility energy supplier, comprising:
 at least one processor 120 and an associated instruction memory 122, at least one memory storage device 122 configured to store,
  (i) historical energy usage data for a premises 114,
  (ii) historical weather data for the location associated with the premises 112,
  (iii) data for unique and variable premises energy characteristics, (iii) data regarding user selected energy goals for said premises 116,
(iv) data regarding said premises 116 provided by the end-user,
(v) utility energy supplier providers and associated energy plans and billing rules data for each provider,
(vi) end-user provided data regarding energy plan selection criteria,
(vii) an analytics and computation engine 110 executed by said at least one processor using a first portion of programming instructions stored in said associated instruction memory for performing (statistical analysis of, aggregation of and disaggregation of said historical energy usage data,
(viii) statistical analysis of historical weather data associated with historical energy usage data,
(ix) machine learning and employing artificial intelligence models to identify data clustering, outliers and other data driven characteristics and provide feedback and input to selected portions of and types of analysis,
(x) conditioning, conversion of and storage of said historical energy usage and weather data,
(xi) time slice synchronization of selected portions of said data stored in said at least one memory storage device,
(xii) analyzing said data for energy consumption by one or more energy devices associated with said premises,
(xiii) computation of energy costs using said converted and stored historical energy usage data,
(xiv) providing alternative representations of energy usage data associated with a source of energy for said premises,
(xv) determining and providing recommendations for available energy reduction choices,
(xvi) computation of energy costs for each plan for each utility energy supplier using said converted and stored historical energy usage data,
(xvii) ranking available utility energy supply providers using at least their plan costs and user selection criteria, and a display engine 130 executed by said at least one processor using a second portion of programming instructions stored in said associated instruction memory for generating a graphical user interface for
(i) receiving end-user goals, criteria for energy consumption plans and premises occupation data,
(ii) displaying synchronized time slice data in one or more pre-selected formats,
(iii) displaying alternative representations of energy usage data associated with a source of energy for said premises,
(iv) displaying alternative representations of environmental impact associated with the energy consumption and the source of energy for said premises
(v) displaying recommendations for available energy reduction choices, (vi) displaying recommendations and alternative representations for available environmental impact reduction choices,
(vii) displaying energy consumption for said energy devices associated with said premises,
(viii) displaying and alerting an end-user of variances in energy use based on one or more of selected set points, excessive usage, and unintentional usage, and
(ix) displaying in ranked order scored available energy supply providers.

Aspect 19. A computer implemented method for end-user energy analytics and optimization and using that analysis for selecting an energy supplier, comprising:

storing in at least one memory storage device, at least one or more of the following: historical energy usage data for a premises (facility), historical weather data for the area (zone) associated with said premises (facility), data for unique and variable premises energy characteristics, data regarding selected energy goals for said premises, end-user provided data regarding said premises, and utility energy supplier providers for the area associated with said premises and associated energy plans and billing rules data for each provider, using at least one processor having instructions stored in at least one instruction memory, wherein said at least one processor is configured to implement an analytics and computation engine using a first portion of instructions stored in said associated instruction memory for performing at least one or more of the following:

receiving and performing statistical analysis of, aggregation of and disaggregation of said historical energy usage data, statistically analyzing historical weather data associated with historical energy usage data, using machine learning and employing artificial intelligence models to identify data clustering, outliers and other data driven characteristics and incorporate ongoing feedback to the analysis of said historical energy usage data, converting and storing said historical energy usage data and computing energy costs based thereon, synchronizing selected portions of said data stored in said at least one memory storage device using common time slice information, analyzing said data for energy consumption by one or more energy devices associated with said premises, determining/providing recommendations for available energy reduction choices, computing energy costs for each plan for each available utility energy supply provider using said converted and stored historical energy usage data, providing alternative representations of energy usage data associated with a source of energy for said premises, scoring and ranking available utility energy supply providers, adjusting the ranking of ranked scored plans based on at least user selected criteria, and using said at least one processor to execute a display engine using a second portion of instructions stored in said associated instruction memory for displaying and performing one or more of the following receiving end-user goals, criteria for energy consumption plans and premises occupation data, displaying synchronized time slice data in one or more pre-selected formats, displaying alternative representations of energy usage data associated with a source of energy for said premises, displaying in ranked order available scored utility energy supply providers, displaying recommendations for available energy reduction choices, displaying historical energy consumption for said energy devices associated with said premises, displaying and alerting an end user of variances in energy use based on one or more of selected set points, excessive usage, and unintentional usage.

Figure 48:
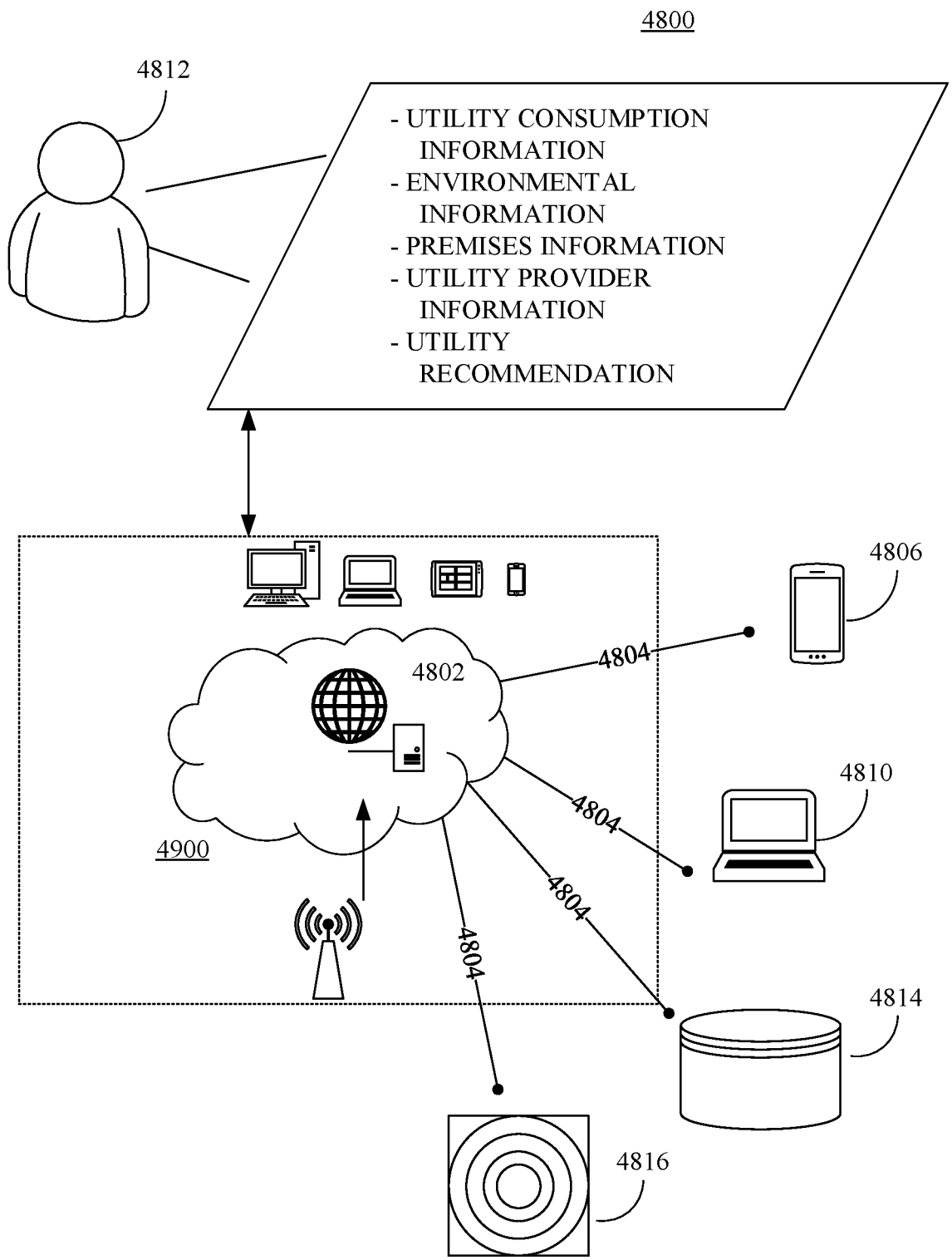
FIG. 48 is an illustration of an online platform consistent with various embodiments of the present disclosure.

FIG. 48 is an illustration of an online platform 4800 consistent with various embodiments of the present disclosure. By way of non-limiting example, the online platform 4800 to facilitate matching at least one utility consumer to at least one utility provider may be hosted on a centralized server 4802, such as, for example, a cloud computing service. The centralized server 4802 may communicate with other network entities, such as, for example, a mobile device 4806 (such as a smartphone, a laptop, a tablet computer etc.), other electronic devices 4810 (such as desktop computers, server computers etc.), databases 4814, and sensors 4816 over a communication network 4804, such as, but not limited to, the Internet. Further, users of the online platform 4800 may include relevant parties such as, but not limited to, end-users, administrators, service providers, service consumers and so on. Accordingly, in some instances, electronic devices operated by the one or more relevant parties may be in communication with the platform.

A user 4812, such as the one or more relevant parties, may access online platform 100 through a web based software application or browser. The web based software application may be embodied as, for example, but not be limited to, a website, a web application, a desktop application, and a mobile application compatible with a computing device 4900.

Figure 49:
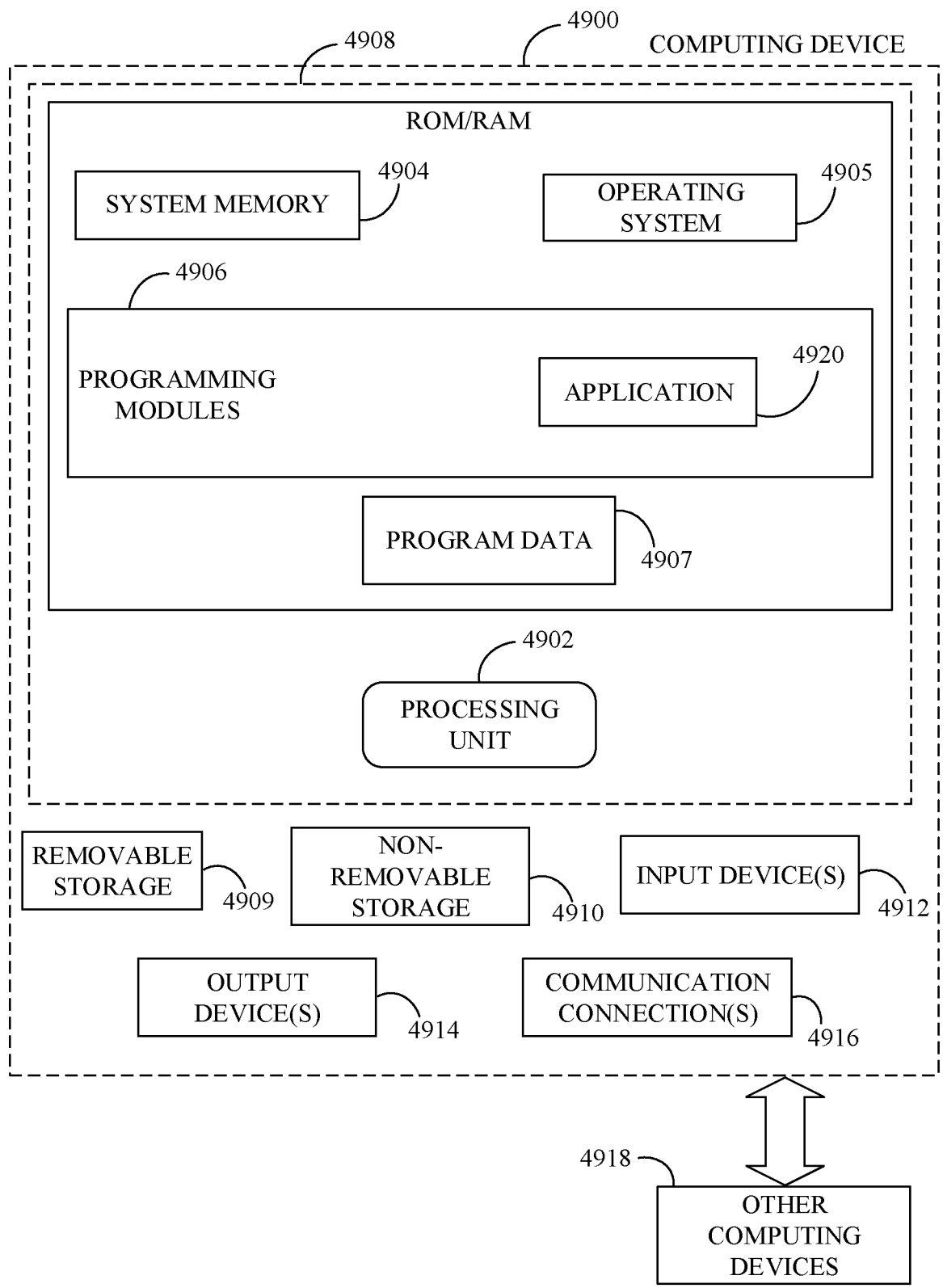
FIG. 49 is a block diagram of a computing device for implementing the methods disclosed herein, in accordance with some embodiments.

With reference to FIG. 49, a system consistent with an embodiment of the disclosure may include a computing device or cloud service, such as computing device 4900. In a basic configuration, computing device 4900 may include at least one processing unit 4902 and a system memory 4904. Depending on the configuration and type of computing device, system memory 4904 may comprise, but is not limited to, volatile (e.g. random-access memory (RAM)), non-volatile (e.g. read-only memory (ROM)), flash memory, or any combination. System memory 4904 may include operating system 4905, one or more programming modules 4906, and may include a program data 4907. Operating system 4905, for example, may be suitable for controlling computing device 4900's operation. Furthermore, embodiments of the disclosure may be practiced in conjunction with a graphics library, other operating systems, or any other application program and is not limited to any particular application or system. This basic configuration is illustrated in FIG. 49 by those components within a dashed line 4908.

Computing device 4900 may have additional features or functionality. For example, computing device 4900 may also include additional data storage devices (removable and/or non-removable) such as, for example, magnetic disks, optical disks, or tape. Such additional storage is illustrated in FIG. 49 by a removable storage 4909 and a non-removable storage 4910. Computer storage media may include volatile and non-volatile, removable and non-removable media implemented in any method or technology for storage of information, such as computer-readable instructions, data structures, program modules, or other data. System memory 4904, removable storage 4909, and non-removable storage 4910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 4900. Any such computer storage media may be part of device 4900. Computing device 4900 may also have input device(s) 4912 such as a keyboard, a mouse, a pen, a sound input device, a touch input device, a location sensor, a camera, a biometric sensor, etc. Output device(s) 4914 such as a display, speakers, a printer, etc. may also be included. The aforementioned devices are examples and others may be used.

Computing device 4900 may also contain a communication connection 4916 that may allow device 4900 to communicate with other computing devices 4918, such as over a network in a distributed computing environment, for example, an intranet or the Internet. Communication connection 4916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 4904, including operating system 4905. While executing on processing unit 4902, programming modules 4906 (e.g., application 4920) may perform processes including, for example, one or more stages of methods, algorithms, systems, applications, servers, databases as described above. The aforementioned process is an example, and processing unit 4902 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A system for matching at least one utility consumer to at least one utility provider, the system comprising:
   a communication device configured for:
      receiving at least one utility consumption information from at least one utility consumption information source, wherein the at least one utility consumption information is associated with at least one premises associated with the at least one utility consumer, and wherein the at least utility consumption information source includes a smart meter configured to capture the at least one utility consumption information and transmit the at least one utility consumption information;
      receiving at least one environmental information from at least one environmental information source, wherein the at least one environmental information is associated with the at least one premises, and wherein the at least one environmental information source includes at least one measurement device disposed in the at least one premises;
      receiving at least one premises information from at least one premises information source, wherein the at least one premises information is associated with the at least one premises;
      receiving a plurality of utility provider information from at least one utility provider information source; and
      transmitting at least one utility recommendation to at least one electronic device;
   a processing device configured for:
      analyzing each of the at least one utility consumption information, the at least one environmental information and the at least one premises information and the plurality of utility provider information; and
      generating the at least one utility recommendation based on the analyzing; and
   a storage device configured for storing each of the at least one utility consumption information, the at least one environmental information, the at least one premises information, the plurality of utility provider information and the at least one utility recommendation.

2. The system of claim 1, wherein the communication device is further configured for receiving at least one consumer criteria from the at least one electronic device, wherein the generating of the at least one utility recommendation is based further on the at least one consumer criteria.

3. The system of claim 2, wherein the at least one utility recommendation comprises indication of a plurality of utility providers and a plurality of ranks associated with the plurality of utility providers, wherein the generating of the at least one utility recommendation comprises determining the plurality of ranks based on the at least one consumer criteria.

4. The system of claim 3, wherein the at least one consumer criteria comprises a plurality of consumer criteria and a plurality of importance levels associated with the plurality of consumer criteria, wherein the generating of the at least one utility recommendation comprises:
   determining a plurality of scores for each utility provider of the plurality of utility providers, wherein the plurality of scores is based on the plurality of consumer criteria; and
   determining a plurality of weighted scores corresponding to the plurality of utility providers based on the plurality of scores and the plurality of importance levels, wherein the plurality of ranks is based on the plurality of weighted scores.

5. The system of claim 3, wherein the at least one consumer criteria comprises at least one of a cost impact, an environmental impact, a lifestyle impact, a budget, a customer satisfaction rating, a billing variability and a risk factor.

6. The system of claim 3, wherein the at least one utility recommendation comprises indication of a projected utility consumption information associated with a future time period and indication of a plurality of alternative utility cost information associated with the future time period, wherein the generating of the at least one utility recommendation comprises:
- determining the projected utility consumption information; and
- determining the plurality of alternative utility cost information.

7. The system of claim 6, wherein the at least one utility recommendation comprises indication of a plurality of alternative environmental impacts corresponding to the plurality of utility providers, wherein the generating of the at least one utility recommendation further comprises determining the plurality of alternative environmental impacts.

8. The system of claim 3, wherein the at least one utility recommendation comprises indication of a utility consumption information associated with a historical time period and indication of a plurality of alternative utility consumption information associated with the historical time period, wherein the utility consumption information comprises a quantity of the utility consumed and a utility cost associated with quantity, wherein the plurality of alternative utility consumption information comprises a plurality of alternative utility cost information, wherein the generating of the at least one utility recommendation comprises determining the plurality of alternative utility cost information associated with the historical time period based on pricing information associated with at least one of the plurality of utility providers and a plurality of utility plans, wherein the plurality of utility provider information comprises the pricing information.

9. The system of claim 1, wherein the communication device is further configured for receiving at least one lifestyle information from at least one lifestyle information source, wherein the at least one lifestyle information is associated with at least one occupant of the at least one premises, wherein the generating of the at least one utility recommendation is based further on the at least one lifestyle information.

10. The system of claim 1, wherein the plurality of utility provider information comprises at least one contract, wherein the analyzing comprises:
- analyzing the at least one contract; and
- determining at least one of a billing rule and a termination fee corresponding to the plurality of utility provider information, wherein the at least one utility recommendation comprises at least one of the billing rule and the termination fee.

11. A method of matching at least one utility consumer to at least one utility provider, the method comprising:
- receiving, using a communication device, at least one utility consumption information from at least one utility consumption information source, wherein the at least one utility consumption information is associated with at least one premises associated with the at least one utility consumer, and wherein the at least utility consumption information source includes a smart meter configured to capture the at least one utility consumption information and transmit the at least one utility consumption information;
- receiving, using the communication device, at least one environmental information from at least one environmental information source, wherein the at least one environmental information is associated with the at least one premises, and wherein the at least one environmental information source includes at least one measurement device disposed in the at least one premises;
- receiving, using the communication device, at least one premises information from at least one premises information source, wherein the at least one premises information is associated with the at least one premises;
- receiving, using the communication device, a plurality of utility provider information from at least one utility provider information source; and
- analyzing, using a processing device, each of the at least one utility consumption information, the at least one environmental information and the at least one premises information and the plurality of utility provider information;
- generating, using the processing device, at least one utility recommendation based on the analyzing;
- transmitting, using the communication device, the at least one utility recommendation to at least one electronic device; and
- storing, using a storage device, each of the at least one utility consumption information, the at least one environmental information, the at least one premises information, the plurality of utility provider information and the at least one utility recommendation.

12. The method of claim 11 further comprising receiving, using the communication device, at least one consumer criteria from the at least one electronic device, wherein the generating of the at least one utility recommendation is based further on the at least one consumer criteria.

13. The method of claim 12, wherein the at least one utility recommendation comprises indication of a plurality of utility providers and a plurality of ranks associated with the plurality of utility providers, wherein the generating of the at least one utility recommendation comprises determining the plurality of ranks based on the at least one consumer criteria.

14. The method of claim 13, wherein the at least one consumer criteria comprises a plurality of consumer criteria and a plurality of importance levels associated with the plurality of consumer criteria, wherein the generating of the at least one utility recommendation comprises:
- determining a plurality of scores for each utility provider of the plurality of utility providers, wherein the plurality of scores is based on the plurality of consumer criteria; and
- determining a plurality of weighted scores corresponding to the plurality of utility providers based on the plurality of scores and the plurality of importance levels, wherein the plurality of ranks is based on the plurality of weighted scores.

15. The method of claim 13, wherein the at least one consumer criteria comprises at least one of a cost impact, an environmental impact, a lifestyle impact, a budget, a customer satisfaction rating, a billing variability and a risk factor.

16. The method of claim 13, wherein the at least one utility recommendation comprises indication of a projected utility consumption information associated with a future time period and indication of a plurality of alternative utility cost information associated with the future time period, wherein the generating of the at least one utility recommendation comprises:
- determining the projected utility consumption information; and determining the plurality of alternative utility cost information.

17. The method of claim 16, wherein the at least one utility recommendation comprises indication of a plurality of alternative environmental impacts corresponding to the plurality of utility providers, wherein the generating of the at least one utility recommendation further comprises determining the plurality of alternative environmental impacts.

18. The method of claim 13, wherein the at least one utility recommendation comprises indication of a utility consumption information associated with a historical time period and indication of a plurality of alternative utility consumption information associated with the historical time period, wherein the utility consumption information comprises a quantity of the utility consumed and a utility cost associated with quantity, wherein the plurality of alternative utility consumption information comprises a plurality of alternative utility cost information, wherein the generating of the at least one utility recommendation comprises determining the plurality of alternative utility cost information associated with the historical time period based on pricing information associated with at least one of the plurality of utility providers and a plurality of utility plans, wherein the plurality of utility provider information comprises the pricing information.

19. The method of claim 11, further comprising receiving, using the communication device, at least one lifestyle information from at least one lifestyle information source, wherein the at least one lifestyle information is associated with at least one occupant of the at least one premises, wherein the generating of the at least one utility recommendation is based further on the at least one lifestyle information.

20. The method of claim 11, wherein the plurality of utility provider information comprises at least one contract, wherein the analyzing comprises:
  analyzing the at least one contract; and
  determining at least one of a billing rule and a termination fee corresponding to the plurality of utility provider information, wherein the at least one utility recommendation comprises at least one of the billing rule and the termination fee.

* * * * *